US007199900B2

(12) United States Patent
Ogatsu et al.

(10) Patent No.: US 7,199,900 B2
(45) Date of Patent: Apr. 3, 2007

(54) COLOR CONVERSION COEFFICIENT PREPARATION APPARATUS, COLOR CONVERSION COEFFICIENT PREPARATION METHOD, STORAGE MEDIUM, AND COLOR CONVERSION SYSTEM

(75) Inventors: Hitoshi Ogatsu, Kanagawa (JP); Ryosuke Higashikata, Kanagawa (JP); Makoto Sasaki, Kanagawa (JP); Yoshiharu Hibi, Kanagawa (JP); Tetsushi Anabuki, Kanagawa (JP); Hiroaki Ikegami, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1011 days.

(21) Appl. No.: 09/941,629

(22) Filed: Aug. 30, 2001

(65) Prior Publication Data

US 2002/0029715 A1 Mar. 14, 2002

(30) Foreign Application Priority Data

| | | |
|---|---|---|
| Aug. 30, 2000 | (JP) | P.2000-261953 |
| Aug. 31, 2000 | (JP) | P.2000-263985 |
| Feb. 26, 2001 | (JP) | P.2001-050720 |
| Feb. 26, 2001 | (JP) | P.2001-051110 |

(51) Int. Cl.
*G06F 15/00* (2006.01)

(52) U.S. Cl. ........................ 358/1.9; 358/2.1; 358/3.23; 358/521; 382/167

(58) Field of Classification Search ................. 358/1.9, 358/2.1, 3.23, 521; 382/167
See application file for complete search history.

(56) References Cited

U.S. PATENT DOCUMENTS 5,162,899 A 11/1992 Naka et al. .................. 358/80

(Continued)

FOREIGN PATENT DOCUMENTS

| | | |
|---|---|---|
| GB | 1 595 122 | 8/1981 |
| JP | 58-16180 | 3/1983 |

(Continued)

OTHER PUBLICATIONS

Ogatsu et al., "An Accurate Color Transformation Algorithm based on Flexible GCR (1) Application to Real Time Image Process," *Japan Hardcopy 94: "The Annual Conference of Japan Hardcopy for the Society of Electrophotography of Japan"* pp. 177-180, Jun. 23, 1994.

*Primary Examiner*—David Moore
*Assistant Examiner*—Michael Burleson
(74) *Attorney, Agent, or Firm*—Morgan Lewis & Bockius LLP

(57) ABSTRACT

An LUT1 preparation section 1 and an LUT2 preparation section 2 prepare an LUT1 and an LUT2 for producing linear output from first raw data or second raw data. Using the LUT1 and LUT2, an LUT1 conversion section 3 and an LUT2 inverse conversion section 4 convert CMYK of the first raw data and C'M'Y'K' of the second raw data into four color values adjusted, and an L matching LUT preparation section 5 prepares an L matching LUT so that the K value of the four color values adjusted becomes equal. A K preservation 4DLUT preparation section 6 prepares a K preservation 4DLUT from the four color values adjusted, the L matching LUT, and the Lab value of the first and second raw data. A 4DLUT reset section 7 resets some of data in the prepared K preservation 4DLUT, whereby partial calorimetric match is intended.

45 Claims, 20 Drawing Sheets

U.S. PATENT DOCUMENTS

| | | | | | |
|---|---|---|---|---|---|
| 5,287,418 | A | * | 2/1994 | Kishida | 382/169 |
| 5,671,344 | A | * | 9/1997 | Stark | 345/419 |
| 5,696,889 | A | * | 12/1997 | Morikawa | 358/1.9 |
| 5,719,956 | A | * | 2/1998 | Ogatsu et al. | 382/167 |
| 6,061,501 | A | | 5/2000 | Decker et al. | 395/109 |
| 6,100,999 | A | | 8/2000 | Ikegami | 358/1.9 |
| 6,281,984 | B1 | | 8/2001 | Decker et al. | 358/1.9 |
| 6,952,288 | B2 | * | 10/2005 | Yamada et al. | 358/1.9 |

FOREIGN PATENT DOCUMENTS

| | | | |
|---|---|---|---|
| JP | 2-241271 | | 9/1990 |
| JP | 10-262157 | | 9/1998 |
| JP | 10-309833 | | 11/1998 |
| JP | 10309833 | * | 11/1998 |
| JP | 10-341354 | | 12/1998 |
| JP | 2000-78419 | | 3/2000 |

* cited by examiner

COLOR CONVERSION COEFFICIENT PREPARATION APPARATUS, COLOR CONVERSION COEFFICIENT PREPARATION METHOD, STORAGE MEDIUM, AND COLOR CONVERSION SYSTEM

BACKGROUND OF THE INVENTION

1. Field of the Invention

This invention relates to color conversion coefficient preparation and color conversion image processing and in particular to color conversion image processing for converting a first n-color separation color signal containing black into a second n-color separation signal containing black, a preparation apparatus and method of color conversion coefficients used at the color conversion image processing time, a storage medium storing a program for executing such processing or color conversion coefficients, and a color conversion system for performing such processing.

2. Description of the Related Art

In print, advertising, and publishing industries, etc., often an image signal is handled as a color signal separated into four colors containing black, such as C (cyan), M (magenta), Y (yellow), and K (black). In the invention, three colors other than black are arbitrary; in the description that follows, however, CMY will be used as an example and CMYK containing black will be used.

A color signal separated into four colors is previously prepared assuming one print condition. The assumed print condition is set based on the color reproduction characteristic in a specific printer or printing machine and is a machine-dependent color signal. Thus, even if a printer accepts CMYK color signals, if it has a color reproduction characteristic different from the assumed print condition, the output result is color reproduction different from that of print under the originally assumed print condition.

In the print industry, etc., a business practice called color proofreading or color proof is conducted, namely, before a large number of sheets of printed matter ordered by a client are printed on a rotary press, etc., (real machine printing), so-called proof print is executed and client's agreement is obtained. If CMYK is digital color signal, the proof print can be executed using a marking technique other than print, for example, a thermal dye-sublimation printer, an ink jet printer, a Xerographic printer, etc. To execute proof print using a printer, it is necessary to convert CMYK four-color separation image signal into CMYK four-color separation image signal for the printer for executing the proof print so as to provide the same reproduced color as with the case where printing machine printing is executed based on CMYK four-color separation image signal separated into four colors of CMYK. Conversion from machine-dependent CMYK four-color separation image signal to machine-dependent CMYK four-color separation image signal for a printer is called CMYK-to-CMYK image conversion. The CMYK four-color separation image signal will be called electronic original. Further, for the electronic original concerning the invention, unless otherwise noted, an image (plate) for each color of CMYK is a multilevel image.

Particularly, for color proofreading, it becomes important to faithfully reproduce the state of the K plate of an electronic original, for example, black characters in a single color of K and gray in a natural image in mixed color of K and CMY or only CMY also on the reproduced mage output on a printer. This function is called K preservation. That is, faithful color reproduction and K preservation become important conditions for the color proofreading.

An electronic original is input and color proofreading can be executed on a given printer as described above. This means that not only the color proofreading, but also on-demand printing can be realized if printer output is final output. That is, if an electronic original is transmitted via various networks and is printed at the party to which the electronic original is transmitted, remote color proofreading is accomplished, and if an electronic original is transmitted via various networks and print at the party to which the electronic original is transmitted is final output, remote on-demand printing is accomplished.

To execute CMYK-to-CMYK image conversion at high speed, a color conversion mechanism is required. As the color conversion mechanism, a system using a neural network is disclosed in JP-A-2-241271 and a system using a multi-dimensional table and interpolation in combination is disclosed in JP-B-58-16180. A system using a high-order polynomial is also known. In fact, a color conversion mechanism using a system using a neural network, using a multi-dimensional table and interpolation in combination (multi-dimensional table type conversion) as described above, a mechanism (gradation conversion) for adjusting gradation separately for each color of C, M, Y, and K based on log conversion, power (γ conversion), or any other arbitrary function form including a high-order polynomial, or operations accompanying UCR (under color removal) in combination is provided. It is known that the gradation conversion uses a one-dimensional table for speeding up, and a one-dimensional table is simply called LUT (lookup table).

To use the color conversion mechanism to execute CMYK-to-CMYK image conversion, it is necessary to appropriately determine a binding coefficient if a neural network is used, a table value if the system using a multi-dimensional table and interpolation in combination, a coefficient of a polynomial if a high-order polynomial is used, a value of LUT, etc., if gradation conversion is executed, and a coefficient involved in UCR if UCR is executed. The objects to be determined will be collectively called color conversion coefficients and preparing a color conversion coefficient will be called characterization. Particularly, characterization for CMYK-to-CMYK image conversion will be called CMYK-to-CMYK color conversion and a color conversion coefficient thereof will be called a CMYK-to-CMYK color conversion coefficient.

The characterization often is accomplished in a computer program and each prepared color conversion coefficient is recorded in a file, memory, etc., together with the number of data pieces and any other information required at the read time. The record is called a profile.

An image processing apparatus receives a profile at some section, processes an electronic original in accordance with the received profile, and outputs the process result on an image output unit such as a printer for providing any desired print. Thus, generally an apparatus such as a computer for performing characterization and the image processing apparatus are separate, but the image processing apparatus itself may have the characterization function in some cases. Further, an electronic original with a profile contained is transferred, whereby the convenience of remote printing can also be improved. Thus, the remote color proof, remote printing, etc., previously described is made possible.

As previously described, it is important in CMYK-to-CMYK image conversion that reproduced color is faithful and that K preservation is accomplished. The expression "reproduced color is faithful" is used to mean that tristimulus values XYZ or color space coordinate values of a color system such as L*a*b* or L*u*v* derived from XYZ match. The values can be provided by a calorimeter. In brief, colors of print of an electronic original (preferably, color chart) as originally assumed (A output color chart) and print provided by executing CMYK-to-CMYK image conversion for the electronic original and outputting the conversion result on a different printing machine or printer (B output color chart) are measured and the color measurement values of the A and B output color charts match. This is called calorimetric match.

To provide colorimetric match, the concept of ICC Profile Format defined in International Color Consortium (ICC) is effective, namely, the concept of accomplishing colorimetric match by realizing CMYK-to-CMYK color conversion by converting from machine-dependent CMYK into machine-independent color space of a color system such as L*a*b* and converting from L*a*b* into CMYK. However, the machine-independent color space of a color system (hub space) is three dimensions and if converting from machine-dependent CMYK into hub space and converting from hub space into CMYK are simply performed, information concerning K is lost and K preservation cannot be provided because of dimension degeneration.

To provide K preservation in the CMYK-to-CMYK color conversion, for example, JP-A-10-309833 discloses a method of separately executing one-dimensional conversion from K to K and three-dimensional conversion from CMY to CMY. However, one-dimensional conversion from K to K and three-dimensional conversion from CMY to CMY are separately executed and thus the color conversion mechanism is simple, but the calorimetric match accuracy is poor, because additive property does not hold in the so-called subtractive color process like CMYK.

For example, JP-A-10-341354 discloses a method of providing n one-dimensional correspondences from K to K, then fixing ki (i=1, 2, . . . , n), providing n sets of color charts with CYM, measuring colors, and determining CYM based on the color measurement values of the color chart sets containing ki from L*a*b* found from CMYK and ki' found from K. In this method, color chart preparation is not flexible and, for example, a disadvantage that color charts called IT8 (two types of 128 colors and 928 colors are available) widely used in the print industry, etc., cannot be used occurs. A color prediction model described later is used bit by bit and thus continuity is not guaranteed and consequently gradation level difference called pseudo contour easily occurs.

Further, JP-A-2000-78419 discloses a method of assuming four-dimensional table type conversion, finding L*a*b* from CMYK, finding K so that L* matches from K, and finding CMY from L*a*b* and K. In this method, K is found from K by a technique of L* matching described later, but K becomes excessive in a high color saturation area and consequently it may be made impossible to find matching L*a*b* found from CMYK regardless of how CMY is adjusted. This nature is also the same as in the method described in JP-A-10-341354.

To execute CMYK-to-CMYK image conversion in the four-dimensional table type color conversion, it is difficult to control the reproduction start point (where gradation starts to appear), because representative points of the four-dimensional color space of CMYK are previously stored and gap between the representative points is interpolated roughly linearly using the nearby representative point. However, if a large number of representative points are taken, the problem can be solved, but this solution is very inefficient.

Further, it is not always good to provide absolute calorimetric match and the following three cases need to be considered: The assumption is that to execute CMYK-to-CMYK image conversion, paper assumed in input and paper used in output are not necessarily the same. If input is an electronic original assuming being printed and output is an ink jet printer, a Xerographic printer, a sublimation-type heat-sensitive printer, etc., dedicated paper must be used because of restriction on the output side and paper cannot be selected as desired. If both input and output happen to use a marking technique, the same type of paper is not always available at remote location. The fact that different types of paper are used section that the state in which coloring material of ink, toner, etc., is not put, namely, L*a*b* values of white differ.

As a first example, a case where input paper has lower lightness (L* value) than output paper will be considered. To conduct calorimetric match, if input CMYK is all 0%, namely, white, some color material is put on output paper to lower the lightness. This is a first reproduction method, called complete colorimetric match. Even with complete colorimetric match, a second example is an opposite case to the above-described example, namely, if input paper has higher lightness than output paper, nothing can be performed. In this case, a predicted defect is that highlight will disappear.

Even if complete calorimetric match is provided, reproducing also white of input paper as in the first example may often be unpreferable. Likewise, as for reproduction in K single color such as black characters, if an attempt is made to conduct complete calorimetric match, the color material of input K differs from the color material of output K and thus CMY is mixed into K. JP-A-2000-78419 discloses such invention guaranteeing the single color of K when the single color K is converted into output K value. However, as for K, it is important to reproduce K single color in K single color and in addition, it is also important to represent K=100% on the input side in K=100% also on the output side, because if a printer adopts area modulation and K=100% on the input side is represented in K=80% on the output side, the image structure difference such that solid black with no structure is represented as a dot structure appears. Further, not only reproducing of K, but also reproducing of Y single color in mixed colors of other colors is unpreferable. This may also apply to M single color or C single color in some cases. Thus, often it is preferable that reproducing of a single color in the single color takes precedence over complete calorimetric match partially in all colors represented in mixed colors of CMYK. Reproducing based on complete calorimetric match and partially different from complete colorimetric match is called partial calorimetric match; this is a second reproduction method.

Even with the second reproduction method, the second example previously described in the complete calorimetric match, namely, the problem involved if input paper has higher lightness than output paper cannot be circumvented and if input paper white and output paper white largely differ, very unnatural reproducing results. In such a case, the color measurement values of input, output L*a*b*, etc., may be changed so that the color measurement values of input paper white and output paper white are made the same without unreasonably conducting complete calorimetric match or partial calorimetric match. This is a third reproduction method and is called relative calorimetric match.

In the four-dimensional table type conversion in the related art, it is difficult to reproduce color in a high color saturation area because of the K component and it is difficult to control in the vicinity of the reproducing start point as described above. Further, to aim at absolute calorimetric match, the effect of the paper white difference, the reproducibility of a single color, etc., involves a problem, as described above.

SUMMARY OF THE INVENTION

It is therefore an object of the invention to provide color conversion image processing capable of reproducing an image so as to colorimetrically match as a whole, improving color reproduction and reproducibility of a single color in a high color saturation area, facilitating control in the vicinity of a reproduction start point, and also dealing with the paper white difference and a color conversion coefficient preparation apparatus and method used at the time and a storage medium storing a program or color conversion coefficients (profile) for executing such processing.

(6)

It is another object of the invention to provide a color data processing apparatus and a color data processing method for making it possible to selectively use a function of using an already prepared profile and a function of preparing from a device profile and performing precise color reproduction and making it possible to prepare adaptive color conversion coefficients (profile) fitted for the use purpose of the user and a storage medium storing a program for providing such functions.

In the invention, basically an n-dimensional lookup table is used to convert from n color values including black into n color values, and conversion section, such as a one-dimensional lookup table, for converting the gradation of a single color for each color is provided at the preceding or following stage of the n-dimensional lookup table or at the preceding and following stages. As another configuration, an n-dimensional lookup table for converting from n color values including black into three color values except for black is used and a one-dimensional lookup table for conversion of black is also used. Also in this case, conversion section, such as a one-dimensional lookup table, for converting the gradation of a single color for each color is provided at the preceding or following stage of the n-dimensional lookup table or at the preceding and following stages.

The gradation property of each color can be made almost linear by the conversion section provided at the preceding or following stage of the n-dimensional lookup table or at the preceding and following stages. Thus, input or output of the n-dimensional lookup table or the relationship between the input and output can be made roughly linear. In addition, in the n-dimensional lookup table prepared assuming that the conversion section such as a one-dimensional lookup table is used, fine gradation control is made possible on the input side or the output side or both sides. Thus, an interpolation error can be decreased for realizing more faithful color reproduction and control at the reproduction start point can be facilitated.

The n-dimensional lookup table for converting from n color values into n color values and the one-dimensional lookup table for conversion of black are prepared considering the characteristic of black. Thus, degradation of color reproducibility caused by excessive or insufficient black can be prevented. Further, to prepare an n-dimensional lookup table, of the table values of n colors that a specific grid point, grid points on a specific line, grid points on a specific plane, or grid points on a specific (n−1) dimensional area of the n-dimensional lookup table have, the n colors in the case of a specific grid point, (n−1) colors in the case of grid points on a specific line, (n−2) colors in the case of grid points on a specific plane, or one color in the case of grid points on a specific (n−1) dimensional area can be forcibly replaced each with a predetermined value. Accordingly, if paper white differs, the under color of paper can also be made white, and it is made possible to guarantee single color output in response to single color input, secondary color output in response to secondary color input, tertiary color output in response to tertiary color input, etc. Further, it is also possible to degrade color reproducibility because of replacement with the predetermined value. In this case, processing of redetermination is performed for the color values undergoing no replacement, whereby the color reproducibility can be enhanced.

Further, as data to prepare such a one-dimensional lookup table and an n-dimensional lookup table, colors of color charts output from units are measured and in addition, in either or both of them, previously prepared conversion definition can be used to prepare color values.

According to the invention, there are provided a color conversion coefficient preparation apparatus and a color conversion coefficient preparation method for preparing color conversion coefficients of conversion section such as a one-dimensional lookup table provided at the preceding or following stage of an n-dimensional lookup table or at the preceding and following stages and preparing an n-dimensional lookup table considering them. There is also provided a storage medium storing a program or color conversion coefficients for executing such a color conversion coefficient preparation method. Further, there is provided a color conversion system using the color conversion coefficients, one-dimensional lookup table, and n-dimensional lookup table prepared by the color conversion coefficient preparation apparatus and the color conversion coefficient preparation method of the invention.

According to the invention, there are provided a color data processing apparatus and a color data processing method for preparing color conversion data based on the characteristics of a source device and a target device and a storage medium storing a program for providing such functions. For example, the user, etc., selects inputting previously stored color characteristic information of the source device or a plurality of data sets to prepare color characteristic information of the source device and selects inputting previously stored color characteristic information of the target device or a plurality of data sets to prepare color characteristic information of the target device. The selected color characteristic information or data set of the source device and the selected color characteristic information or data set of the target device are input and color conversion data is prepared based on them.

According to the configuration, to use the previously prepared color characteristic information, it may be selected; to execute color matching more fitted for the present circumstances, a plurality of data sets to prepare color characteristic information can be input for preparing color conversion data from a profile. Thus, it is made possible to adaptively prepare color conversion data fitted for the use purpose of the user.

The user might want to use the previously prepared color characteristic information undergoing predetermined processing rather than the previously prepared color characteristic information intact to prepare color conversion data. To meet such a demand, a plurality of data sets can be prepared from the color characteristic information of the source device or the color characteristic information of the target device and predetermined processing can be performed for the prepared data sets before use for preparing color conversion data. Accordingly, it is made possible to prepare color conversion data within the range of various conditions such as controlling the value of data of each special color prepared and limiting the sum total of the values.

The configuration wherein previously prepared color characteristic information or a plurality of data sets to prepare color characteristic information can be selected can also be applied only to the source device or the target device, for example. Further, color conversion execution section for performing color conversion of image data using the prepared color conversion data may be provided.

DETAILED DESCRIPTION OF THE PREFERRED EMBODIMENTS

Figure 1:
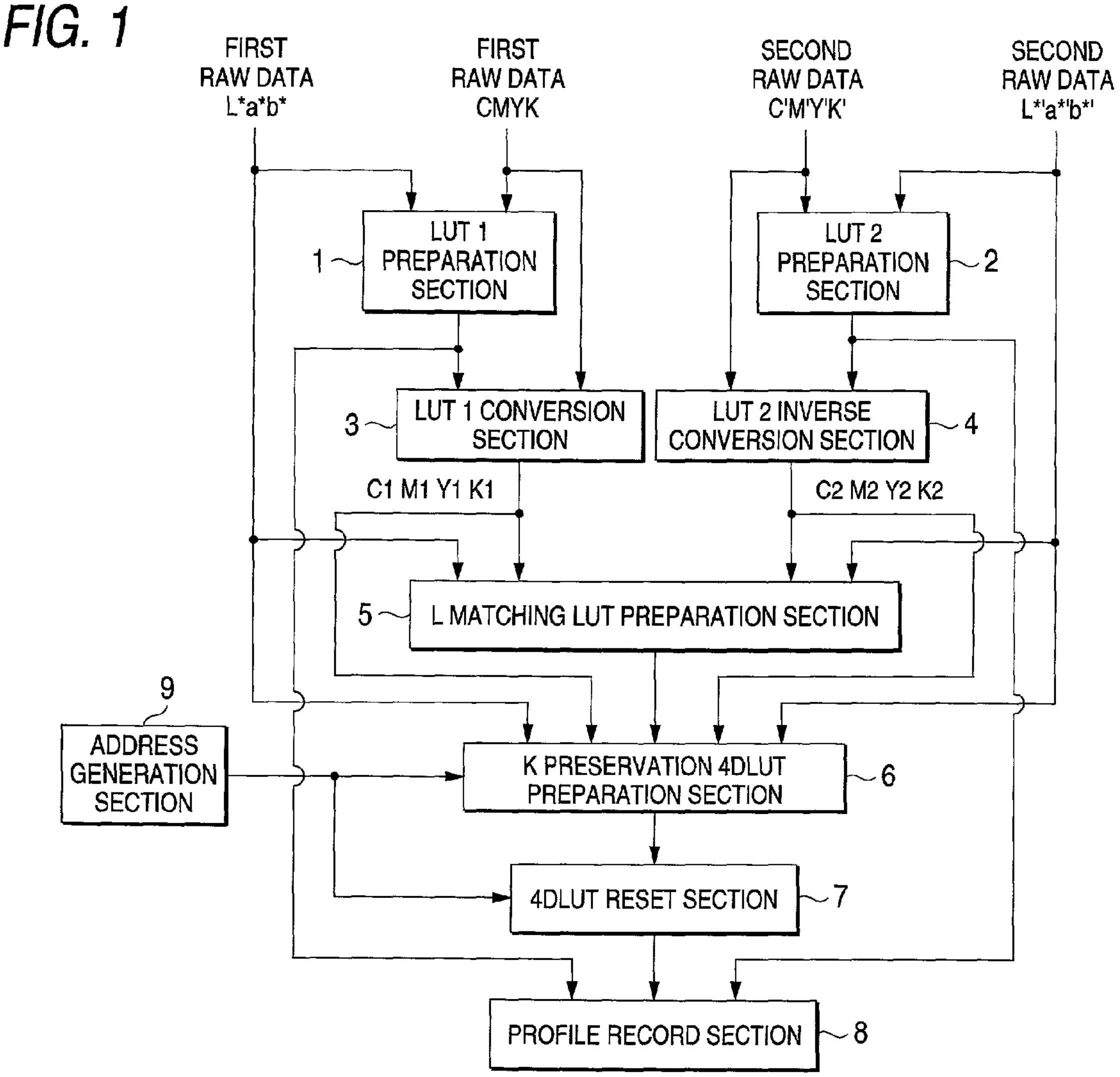
FIG. 1 is a block diagram to show a first embodiment of a color conversion coefficient preparation apparatus and a color conversion coefficient preparation method of the invention.

A theoretical description will be made to some extent, followed by description of the configuration of the invention. First, it is assumed that n colors containing black used are four colors of C (cyan), M (magenta), Y (yellow), and K (black), the color space of color measurement values or a color system is L*a*b*, and the relationship with CMYK will be discussed.

(Normal color prediction model)

First, a method of actually finding L*a*b* from CMYK or finding CMYK from L*a*b* will be discussed. Unless otherwise noted, the term CMYK is used in a general sense and is not limited to input CMYK. The L*a*b* color space is used as an example, but any other color space may be applied. To find L*a*b* from CMYK, color charts with CMYK changed in order are prepared in a target image output unit and the colors of L*a*b* are measured, whereby a large number of pairs of CMYK and L*a*b* are provided. The pairs of CMYK and L*a*b* will be called raw data. To predict L*a*b* from CMYK, a model has been constructed based on the raw data. A model for predicting L*a*b* from CMYK will be called normal color prediction model.

The most general method of the normal color prediction model is high-order polynomial approximation based on a least squares method. Also known are a model for using raw data as teacher data and predicting L*a*b* from CMYK with a neural network as described in JP-A-2-241271, a model for using weighted linear regression and predicting L*a*b* from CMYK as described in JP-A-10-262157, and the like. These models are called black box models and do not depend on the characteristics of an image output unit or a gradation reproducing system of area modulation or density modulation. In contrast, raw data pieces of several hundred to several thousand colors are required to provide calorimetric match accuracy.

(Inverse Color Prediction Model)

A method of finding CMYK from L*a*b* will be discussed. Generally, the direction of finding CMYK from L*a*b* is one-to-multiple relationship (ambiguous) and is not the one-valued function relationship and thus a solution is not defined. Then, one of C, M, Y, and K is restricted and fixed under some condition and the values of the remaining three colors are found from given L*a*b* and the fixed one color. For example, a method of determining one maximum K (maxK) satisfying given L*a*b*, fixing K by multiplying maxK by appropriate UCR ratio β, and finding CMY from L*a*b* and K is described on "flexible UCR niyoru kouseido irohenkan," Japan Hardcopy 94 Ronbunshuu, Denshishashin Gakkai, P177. Such a model for fixing L*a*b* and one of C, M, Y, and K and predicting the remaining three colors is called inverse color prediction model.

However, the range of L*a*b* that can be reproduced in all CMYK combinations is determined by an image output unit and an output condition and is called color gamut. If L*a*b* exceeding the color gamut is given, a solution cannot be obtained regardless of how C, M, Y, and K are combined. Likewise, if the value of the fixed color is improper although L*a*b* is given in the color gamut, a solution cannot be obtained either. For example, if K having lower lightness than the L* value (lightness) of given L*a*b* is fixed for finding CMY, the same as the given L*a*b* does not result, because if CMY is added to K, the lightness becomes low, but does not become high. If a solution exists as the model although L*a*b* is outside the color gamut or the fixed value is improper, it is preferred for K correction processing described later.

Normally, CMYK is in the range of 0% to 100%, but the range is not limited and a negative value and a value exceeding 100 may be allowed in the inverse color prediction model, but do not actually exist. That is, the values are not contained in the raw data and thus the inverse color prediction model extrapolates based on the raw data. That is, the inverse color prediction model having a high extrapolation capability not only in the range of the color gamut is more preferred. Assuming that inverse prediction is conducted and CMY is found, if C, M, or Y is outside the proper range, namely, is a negative value or a value exceeding 100, it can be determined an improper solution and thus correction processing can be performed. If the inverse color prediction model does not have a extrapolation capability, the inverse color prediction model having a function capable of detecting L*a*b* being out of the color gamut is preferred.

(Color Gamut Compression)

The concept of the color gamut has been described. If the output unit assumed on the input side and the output unit for actually outputting differ as in the invention, the color gamut differs, of course. In this case, the inverse color prediction model cannot be solved. Thus, it is preferable that color gamut compression from the color gamut on the input side to the color gamut on the output side is executed. Various devices for color gamut compression are invented and will not be described in detail.

(Principle of the Invention)

Next, the principle for conducting absolute colorimetric match, partial colorimetric match, and relative calorimetric match in the invention will be discussed on the assumptions that a proper number of raw data on the input side and a proper number of raw data on the output side are provided and that two types of normal color prediction models, input normal color prediction model and output normal color prediction model, and two types of inverse color prediction models, input inverse color prediction model and output inverse color prediction model, are provided. A color conversion system with a first one-dimensional lookup table, which will be hereinafter referred to as LUT1, a four-dimensional table type conversion section, which will be hereinafter referred to as 4DLUT, and a second one-dimensional lookup table, which will be hereinafter referred to as LUT2, is used as a preferred CMYK-to-CMYK color conversion system satisfying the requirements of aligning the reproducing start points, etc. That is, CMYK is converted into C1M1Y1K1 according to the LUT1, converted into C2M2Y2K2 according to the 4DLUT, and converted into CMYK according to the LUT2. It is also assumed that each color of C, M, Y, and K consists of eight bits.

(Absolute Calorimetric Match)

The LUT1 is prepared so that the gradation of each single color of C1, M1, Y1, and K1 and color difference ΔE from input paper white become linear. K is taken as an example. C, M, and Y are all 0% and when K is 0%, the color difference ΔE from input paper white equals 0. The color difference ΔE from input paper white when K=100% equals q. If the gradation of K is represented in eight bits, 256 K gradation levels of 0 to 255 are provided and thus (C, M, Y, K)=(0, 0, 0, Ki) (ki=0, 1, . . . , 255) is assigned to the input normal color prediction model to find the L*a*b* value (Li, ai, bi) when (0, 0, 0, Ki), and ΔEi is obtained according to expression 1:

$$\Delta Ei=[(Li-L0)^2+(ai-a0)^2+(bi-b0)^2]^{1/2} \quad \text{Expression 1}$$

where (L0, a0, b0) is L*a*b* of paper white.

Further, ΔEi is normalized to find normΔEi as in expression 2:

$$\text{norm}\Delta Ei=\Delta Ei/q\times 100 \quad \text{Expression 2}$$

ki and normΔEi are in a one-to-one correspondence, normΔEi is plotted on the horizontal axis, ki is plotted on the vertical axis, approximation or polygonal line approximation based on regression is conducted, and a conversion rule from K to K1 in LUT1 is determined. This also applies to each single color of C, M, and Y.

The LUT2 is also prepared like the LUT1 using the output normal color prediction model so that the gradation of each single color of C2, M2, Y2, and K2 and color difference ΔE from output paper white become linear. However, prepared here is a lookup table for executing gradation conversion in the direction from CMYK to C2M2Y2K2. For actual use at the color conversion processing time, a one-dimensional lookup table for executing inverse conversion, namely, conversion in the direction from C2M2Y2K2 to CMYK is used. Because of one-to-one correspondence in the gradation conversion, the table can also be easily obtained for inverse conversion.

The LUT1 and the LUT2 are designed as described above, whereby the relationship between the corresponding single colors of C1M1Y1K1 and C2M2Y2K2 becomes almost linear, providing the effect of decreasing an interpolation error of the 4DLUT prepared in the next step. Since fine gradation control can be performed at all 256 gradation levels, there is provided the effect of easily aligning the reproducing start points of CMYK when the portion with the gradation width growing in the vicinity of white formerly is canceled and CMYK-to-CMYK color conversion is executed.

In the description given above, the LUT1 and the LUT2 are prepared so that the color difference ΔE from white becomes linear, but it may be any if it is an index used with single-color gradation design and evaluation, such as optical density, reflectivity, lightness, equivalent neutral density, or equivalent neutral lightness. However, it is more preferable if the minimum value 0 can be converted into 0 and the maximum value 100 can be converted into 100 as the input/output relationship of lookup table to conduct partial calorimetric match or relative calorimetric match.

Next, the preparation method of the 4DLUT for converting from C1M1Y1K1 into C2M2Y2K2 will be discussed. The 4DLUT can be prepared in the following five steps:

(1) For all 0 of C1M1Y1, namely, (0, 0, 0, K1), L*a*b* is predicted according to the input normal color prediction model, and only the L* value at this time is set to L1. Likewise, for (0, 0, 0, K2), L*a*b* is also predicted according to the output normal color prediction model, and only the L* value at this time is set to L2. The correspondence between K1 and K2 such that L1=L2 is prepared. This is called L matching. K2 is found from K1 based on the L matching.

(2) L*a*b* is predicted according to the input normal color prediction model from C1M1Y1K1.

(3) If L*a*b* exceeds the color gamut on the output side, color gamut compression is executed and L*a*b* is changed to the inside of the color gamut on the output side.

(4) From L*a*b* and K2 based on K matching, C2M2Y2 is found according to the output inverse color prediction model.

(5) If C2M2Y2 is not a proper value, K2 is adjusted to again find C2M2Y2 for finding a proper value of C2M2Y2K2. (K correction processing)

Processing in step (5) is to decrease K2 if K2 based on the L matching in step (1) is excessive. in contrast, insufficient K2 may occur and adjustment may be made in the direction of increasing K2. If processing of the LUT1, the LUT2 is performed, step (1) can also be skipped.

If steps (1) to (5) or steps (2) to (5) are repeated as many times as the number of grid points of the 4DLUT, the table values of the 4DLUT can be found.

(Partial Colorimetric Match)

The partial colorometric match is a reproduction method wherein if input is K single color, for example, output is also reproduced in the K single color. This is realized by rewriting a table of apart of the 4DLUT prepared in the absolute colorometric match. In the 4DLUT, it may be considered that input C1M1Y1K1 is an address for looking up the table and that the table value is C2M2Y2K2. For example, to make input white also white at the output time, the table value at the address of white (C1, M1, Y1, K1)=(0, 0, 0, 0) may be forcibly set to (C2, M2, Y2, K2)=(0, 0, 0, 0). Likewise, when K1 is single color (0, 0, 0, K1), C2=M2=Y2=0 may be forcibly set as (0, 0, 0, K2). If single-color reproducing of Y is to be guaranteed, like K, when (0, 0, Y1, 0), C2=M2=K2=0 may be set. Likewise, if process black (when K1 is 0 and only C1M1Y1 has values) is to be guaranteed, the table value of (C1, M1, Y1, 0) may be set to (C2, M2, Y2, 0) forcibly with K2=0. As for (C1, M1, Y1, K1)=(0, 0, 0, 100), if the table value is forcibly set to (C2, M2, Y2, K2)=(0, 0, 0, 100), solid black can be reproduced as solid black.

The above-described processing of forcibly setting a specific color to 0 (reset processing) is to remove the specific color from the colors reproduced in the original C2M2Y2K2 and thus if color change caused by removing the specific color is small, faithfulness of color reproduction is not much lost. However, if color change caused by removing the specific color becomes large, the inverse color prediction model may be used to again determine the values corresponding to the color material amounts other than the specific color so as to minimize the index of color difference, lightness, color saturation, etc. For example, to guarantee single-color reproducing of Y, (C2, M2, Y2, K2) is provided in response to input of (0, 0, Y1, 0) and the color specification value at the time is (L2, a2, b2). If reset processing to (0, 0, Y2, 0) is performed, a color shift may occur. Thus, if inverse color prediction model on the output side, namely, using raw data to which C2M2Y2K2 belongs is used and C=M=K is fixed to 0 and Y2 is again determined so that the color saturation or the color difference or b* becomes the minimum with (L2, a2, b2) as the target, the faithfulness of reproduced colors can be more enhanced. Likewise, to reset any color other than K2, for example, as input is (0, 0, 0, K2), the faithfulness can be enhanced by again determining K2 so as to match or minimize the color difference or the lightness as the index. For high-order colors of second-order color or higher, such a method minimizing the color difference may be used. As described above, after reset processing, a prime color (unreset color) is again determined according to an appropriate index, whereby colors roughly equivalent to those which will be provided when reset processing is not performed can be reproduced if reset processing is performed.

(Relative Colorometric Match)

To conduct the relative colorometric match, white of input raw data and white of output raw data may be changed to the unified white reference and complete or partial colorometric match may be conducted based on the changed raw data. When the color measurement value is L*a*b*, the changed color measurement value is called relative L*a*b*. A method of changing to relative L*a*b* will be discussed.

The relations between L*, a*, and b* and tristimulus values X, Y, and Z are shown in expressions 3-1 to 3-3:

$$L^*=116\cdot(Y/Yo)^{1/3}-16 \quad \text{Expression 3-1}$$

$$a^*=500[(X/Xo)^{1/3}-(Y/Yo)^{1/3}] \quad \text{Expression 3-2}$$

$$b^*=200[(Y/Yo)^{1/3}-(Z/Zo)^{1/3}] \quad \text{Expression 3-3}$$

where (Xo, Yo, Zo) are tristimulus values of a light source. Letting $(X/Xo)^{1/3}=P$, $(Y/Yo)^{1/3}=Q$, $(Z/Zo)^{1/3}=R$, L*a*b* value of paper white be (Lw, aw, bw), (P, Q, R) at the time be (Pw, Qw, Rw), and white reference value of relative L*a*b* be (Lo, ao, bo), $$Lw=116Qw-16 \quad \text{Expression 4-1}$$

$$aw=500(Pw-Qw) \quad \text{Expression 4-2}$$

$$bw=200(Qw-Rw) \quad \text{Expression 4-3}$$

Adjustment coefficients α, β, and γ are introduced and can be solved from $$Lo=116\beta Qw-16 \quad \text{Expression 5-1}$$

$$ao=500(\alpha Pw\beta-Qw) \quad \text{Expression 5-2}$$

$$bo=200(\beta Qw-\gamma Rw) \quad \text{Expression 5-3}$$

For given L*a*b*, P, Q, and R are found and with αP, βQ, γR, restoring to L*a*b* is performed, whereby relative L*a*b* is provided. If this operation is performed on L*a*b* of the input raw data and L*a*b* of the output raw data, the L*a*b* values of input white and output white match.

If X/Xo=E, Y/Yo=F, and Z/Zo=G are represented in expressions 3-1 to 3-3 and (E, F, G) when (Lw, aw, bw) is represented as (Ew, Fw, Gw), conversion to relative Lab can be accomplished according to expressions 6-1 to 6-3:

$$Lr=116(F/Fw)^{1/3}-16 \quad \text{Expression 6-1}$$

$$ar=500[(E/Ew)^{1/3}-(F/Fw)^{1/3}] \quad \text{Expression 6-2}$$

$$br=200[(F/Fw)^{1/3}-(G/Gw)^{1/3}] \quad \text{Expression 6-3}$$

(Lr, ar, br) in expressions 6-1 to 6-3 represents relative L*a*b*.

Thus, the LUT1, the LUT2, and the 4DLUT are prepared based on the absolute colorimetric match and the contents of the 4DLUT are corrected so that the 4DLUT is reproduced based on the partial colorometric match and the relative colorometric match.

FIG. 1 is a block diagram to show a first embodiment of a color conversion coefficient preparation apparatus and a color conversion coefficient preparation method of the invention. In the figure, numeral 1 denotes an LUT1 preparation section, numeral 2 denotes an LUT2 preparation section, numeral 3 denotes an LUT1 conversion section, numeral 4 denotes an LUT2 inverse conversion section, numeral 5 denotes an L matching LUT preparation section, numeral 6 denotes a K preservation 4DLUT preparation section, numeral 7 denotes a 4DLUT reset section, numeral 8 denotes a profile record section, and numeral 9 denotes an address generation section. A first example of the color conversion coefficient preparation apparatus and the color conversion coefficient preparation method for preparing LUT1, LUT2, and 4DLUT as described above can be provided according to the configuration as shown in FIG. 1. Here, a profile is prepared from given first raw data on the input side and given second raw data on the output side. The profile is made up of, for example, table value of 4DLUT with characteristic of K preserved with the CMYK value of a first output unit (for example, printing machine) and the CMYK value of a second output unit (for example, printer) matched with machine-independent L*a*b* value, LUT1 for correcting the gradation of the first output unit, and LUT2 for correcting the gradation of the second output unit. Either or both of the LUT1 and the LUT2 may not be prepared.

The LUT1 preparation section 1 prepares table value LUT1 of lookup table linear to ΔE from the first raw data. The LUT1 is provided for converting CMYK on the input side into C1M1Y1K1. The color space on the input side is a first machine-dependent color space and the color space after the LUT1 is applied becomes a first adjustment-machine-dependent color space. The LUT1 preparation section 1 corresponds to first TRC preparation section.

The LUT2 preparation section 2 prepares table value LUT2 of lookup table linear to ΔE from the second raw data. If a lookup table is prepared like the LUT1, a table for converting C'M'Y'K' on the output side into C2M2Y2K2 is prepared. To prepare an L matching table described later and 4DLUT, conversion from C'M'Y'K' to C2M2Y2K2 is required and thus here the LUT2 is made intact. However, conversion from C2M2Y2K2 to C'M'Y'K' is used actually in color conversion processing. Therefore, as the LUT2 output as a part of the profile, a table provided by inversely converting a table (LUT2') for converting C'M'Y'K' into C2M2Y2K2 may be output. C'M'Y'K' on the output side is value in a second machine-dependent color space and C2M2Y2K2 is value in a second adjustment-machine-dependent color space. The LUT2 preparation section 2 corresponds to second TRC preparation section.

The LUT1 conversion section 3 receives the LUT1 prepared in the LUT1 preparation section 1 and CMYK of the first raw data and converts CMYK of the first raw data according to the LUT1 to prepare C1M1Y1K1.

The LUT2 inverse conversion section 4 receives a table (LUT2') before inverse conversion performed when LUT2 is prepared in the LUT2 preparation section 2 and C'M'Y'K' of the second raw data and prepares C2M2Y2K2 from C'M'Y'K' of the second raw data. The LUT2 inverse conversion section 4 may use not only LUT2', but also LUT2 to find an address from the table value.

The L matching LUT preparation section 5 relates K1 and K2 so that L* becomes equal from C1M1Y1K1 provided by the LUT1 conversion section 3 and L*a*b* of the first raw data and C2M2Y2K2 provided by the LUT2 inverse conversion section 4 and L*'a*'b*' of the second raw data, whereby a one-dimensional lookup table relating both is prepared and is used as L matching LUT.

The K preservation 4DLUT preparation section 6 prepares a K preservation 4DLUT from L*a*b* of the first raw data, C1M1Y1K1' provided by the LUT1 conversion section 3, L*'a*'b*' of the second raw data, C2M2Y2K2 provided by the LUT2 inverse conversion section 4, the L matching LUT prepared by the L matching LUT preparation section 5, and (Ci, Mi, Yi, Ki) generated by the address generation section 9 described later. The LUT1 conversion section 3, the LUT2 inverse conversion section 4, the L matching LUT preparation section 5, the K preservation 4DLUT preparation section 6, and the like make up K preservation n-dimensional DLUT preparation section (in this case, n=4).

The 4DLUT reset section 7 resets the corresponding data to a specific grid point, grid points on a specific line, grid points on a specific plane, or grid points in a specific three-dimensional area based on the CMYK address data for the K preservation 4DLUT prepared by the K preservation 4DLUT preparation section 6. For example, as resetting a specific grid point, for example, white is guaranteed with data set as (0, 0, 0, 0) for a white point with C, M, Y, K=0 or with data set as (0, 0, 0, 100) for a black solid point with C, M, Y=0, K=100. Of course, a grid point of a single color of each of C, M, and Y can also be reset. As resetting grid points on a specific line, for example, Y single color or K single color can be guaranteed by resetting points on Y line with C, M, K=0 (0, 0, Y, 0) or K line with C, M, Y=0 (0, 0, 0, K). Of course, this also applied to C single color and M signal color. As resetting grid points on a specific plane, for example, it is possible to reset to (C, M, 0, 0) as value of secondary color based on C and M with Y, K=0 (namely, blue). Of course, this also applies to secondary color based on M and Y with C, K=0 (namely, red), secondary color based on C and Y with M, K=0 (namely, green), secondary color containing K, or the like. Further, as resetting grid points in a specific three-dimensional area, it is possible to guarantee process black, etc., by resetting CMY plane with K=0 (C, M, Y, 0). For such a specific grid point, grid points on a specific line, grid points on a specific plane, or grid points in a specific three-dimensional area, the corresponding data is reset, whereby partial colorometric match is provided. The 4DLUT reset section 7 corresponds to n-dimensional DLUT reset section (in this case, n=4).

Figure 2:
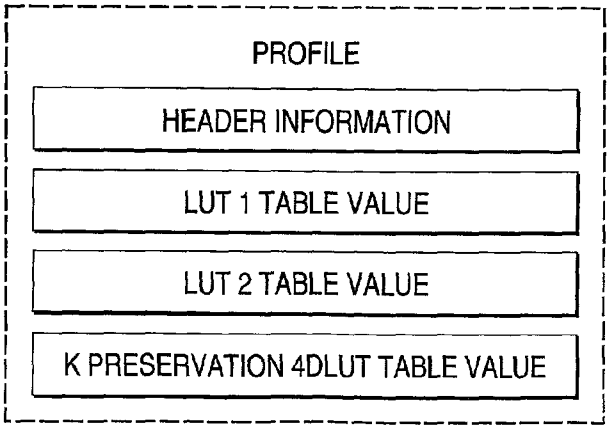
FIG. 2 is a schematic representation of one format of the profile.

The profile record section 8 retains the LUT1 prepared in the LUT1 preparation section 1, the LUT2 prepared in the LUT2 preparation section 2, and the K preservation 4DLUT output from the 4DLUT reset section 7 as a file, for example. FIG. 2 is a schematic representation of one format of the profile. The profile can be made up of, for example, header information, LUT1 table value, LUT2 table value, and K preservation 4DLUT table value. The header information is additional information of the number of tables of LUT1, LUT2, and K preservation 4DLUT, the preparation dates and times, etc. When a profile preparation apparatus for preparing a profile and an image processing apparatus for performing color conversion processing of an image are separate, the header information is useful information for the image processing apparatus to interpret the profile.

The address generation section 9 regularly generates addresses of a four-dimensional lookup table. For example, if a four-dimensional space represented by (c, m, y, k) has three representative points of 0%, 50%, and 100% for each axis, the address generation section 9 generates 3×3×3×3=81 addresses of (0, 0, 0, 0), (0, 0, 0, 50), (0, 0, 0, 100), (0, 0, 50, 0), (0, 0, 50, 50), (0, 0, 50, 100), . . . , (100, 100, 100, 100) in order. The generated address is described as (Ci, Mi, Yi, Ki). Of course, the number of divisions of each axis may be arbitrary and if address information, etc., is added to the profile, each axis can also be divided unevenly.

Operations in each section are performed as floating-point operations. As for the LUT1 and the LUT2, the number of entries in the table is arbitrary, but preferably is set to the same as the quantization number of an image to be processed. Operations on the table values of the LUT1 and the LUT2 are performed as floating-point operations and it is advisable to finally round the result to the nearest integer. In the embodiment, as the LUT1 and the LUT2, lookup tables are adopted from the viewpoints of the required time for image processing and general versatility of processing. However, for example, a format for converting based on a function such as a high-order polynomial may be adopted or any other format maybe adopted if one-input one-output conversion is performed. The number of entries of the K preservation 4DLUT is determined by the number of divisions in each color. the number of divisions may be predetermined, or may be entered by the operator before a profile is prepared.

The operation in the described configuration will be discussed briefly. The LUT1 preparation section 1 prepares table value LUT1 of lookup table linear to ΔE from the first raw data. Likewise, the LUT2 preparation section 2 prepares table value LUT2 of lookup table linear to ΔE from the second raw data. At this time, LUT2' before inverse conversion when LUT2 is prepared can be left.

From the LUT1 prepared in the LUT1 preparation section 1 and CMYK of the first raw data, the LUT1 conversion section 3 converts CMYK of the first raw data according to the LUT1 to prepare C1M1Y1K1. From the LUT2' (or LUT2) prepared in the LUT2 preparation section 2 and C'M'Y'K' of the second raw data, the LUT2 inverse conversion section 4 prepares C2M2Y2K2.

The L matching LUT preparation section 5 prepares an L matching LUT for relating K1 and K2 so that L* becomes equal from C1M1Y1K1 provided by the LUT1 conversion section 3, L*a*b* of the first raw data, C2M2Y2K2 provided by the LUT2 inverse conversion section 4, and L*'a*'b*' of the second raw data. The K preservation 4DLUT preparation section 6 prepares a K preservation 4DLUT from the prepared L matching LUT, L*a*b* of the first raw data, C1M1Y1K1 provided by the LUT1 conversion section 3, L*'a*'b*' of the second raw data, C2M2Y2K2 provided by the LUT2 inverse conversion section 4, and (Ci, Mi, Yi, Ki) generated by the address generation section 9. Thus, the K preservation 4DLUT is prepared by the LUT1 conversion section 3, the LUT2 inverse conversion section 4, the L matching LUT preparation section 5, the K preservation 4DLUT preparation section 6, and the like.

For the prepared K preservation 4DLUT, the 4DLUT reset section 7 resets the data of a specific point, line, plane, partial area, etc., based on the CMYK address data, whereby partial colorometric match is intended.

The profile record section 8 retains the LUT1 prepared in the LUT1 preparation section 1, the LUT2 prepared in the LUT2 preparation section 2, and the K preservation 4DLUT after processed in the 4DLUT reset section 7 as a file, for example.

Figure 3:
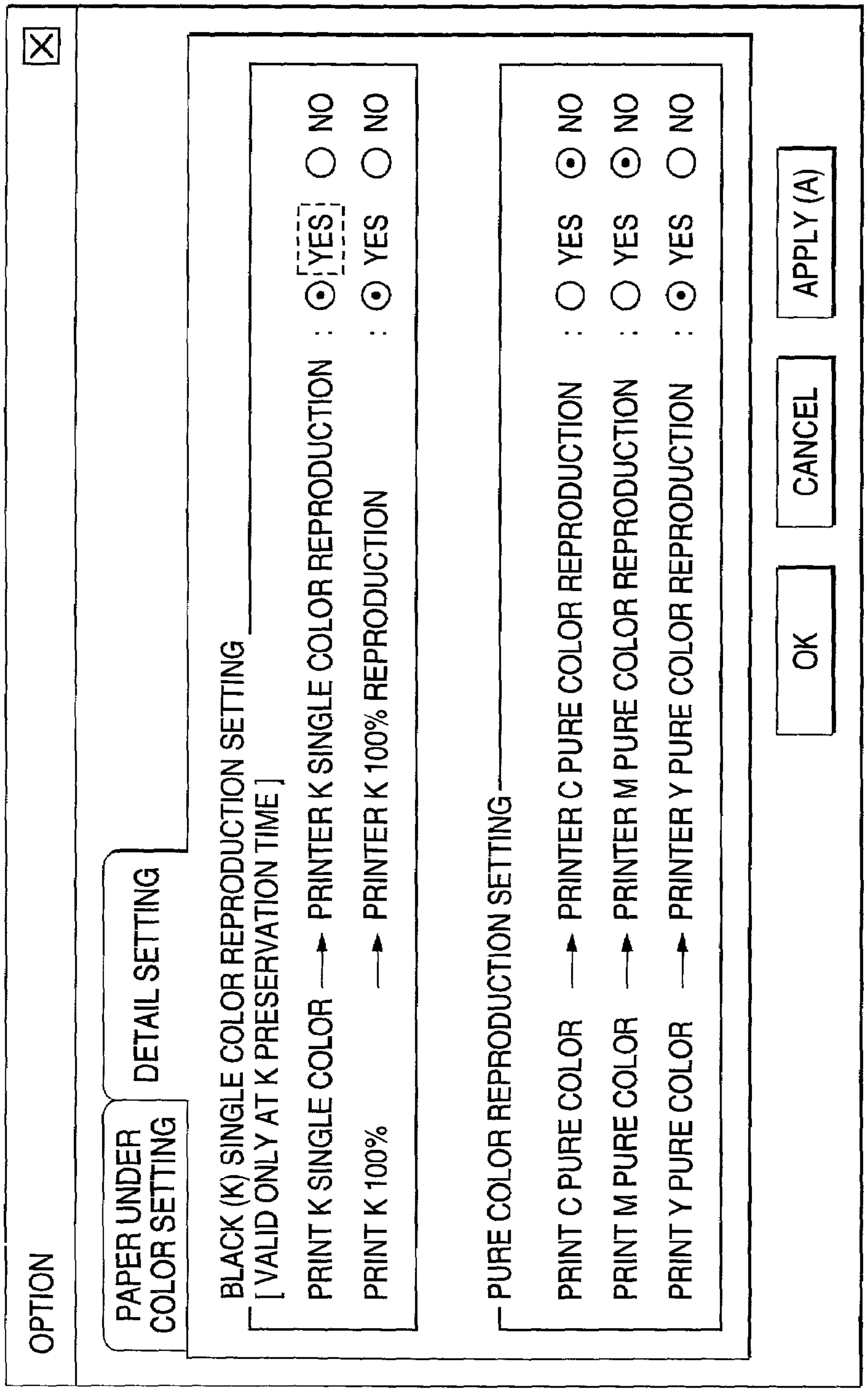
FIG. 3 is a schematic representation of an example of a user interface for the user to give a command to a 4DLUT reset section.

Thus, a profile satisfying the partial colorometric match can be prepared. To conduct absolute colorimetric match, the 4DLUT reset section 7 may be removed or the reset operation of the 4DLUT reset section 7 may be inhibited. FIG. 3 is a schematic representation of an example of a user interface for the user to give a command to the 4DLUT reset section 7. The user can use a user interface, for example, as shown in FIG. 3 to specify whether or not absolute colorometric match is to be conducted in the 4DLUT reset section 7 or specify what extent correction processing is to be executed to even if partial colorimetric match is to be conducted. In the example, whether or not (0, 0, 0, K2) is to be set forcibly with C2=M2=Y2=0 when K is single color (0, 0, 0, K1) can be specified by specifying YES or NO for PRINT K SINGLE COLOR→PRINTER K SINGLE COLOR REPRODUCTION. If the user specifies YES, gray is reproduced only in K. Whether or not (C1, M1, Y1, K1)=(0, 0, 0, 100) is to be set forcibly to (C2, M2, Y2, K2)=(0, 0, 0, 100) can be specified by specifying YES or NO for PRINT K 100%→PRINTER K 100% REPRODUCTION. If the user specifies YES, solid black can be reproduced as solid black.

Whether or not pure color is to be reproduced can be specified for any other color than K. For example, whether or not (0, 0, Y2, 0) is to be set with C2=M2=K2=0 when (0, 0, Y1, 0) can be specified by specifying YES or NO for PRINT Y PURE COLOR→PRINTER Y PURE COLOR REPRODUCTION. If the user specifies YES, other colors are mixed into yellow and vibrant yellow can be reproduced. This also applies to other colors (C, M).

Of course, in addition, the user interface can also be configured so as to enable resetting under various conditions and various settings, for example, in such a manner that white (0, 0, 0, 0) is set to (0, 0, 0, 0), that a secondary color is reproduced only in two colors making up the secondary color, or that process black is reproduced in process black, for example. It is also possible, for example, that some can be set on the interface and some is forcibly performed in the 4DLUT reset section 7. In this case, an option for inhibiting processing of the 4DLUT reset section 7 may be provided.

To acquire CMYK and L*a*b* of the first raw data and C'M'Y'K' and L*'a*'b*' of the second raw data, those recorded in the file can be read.

Figure 4:
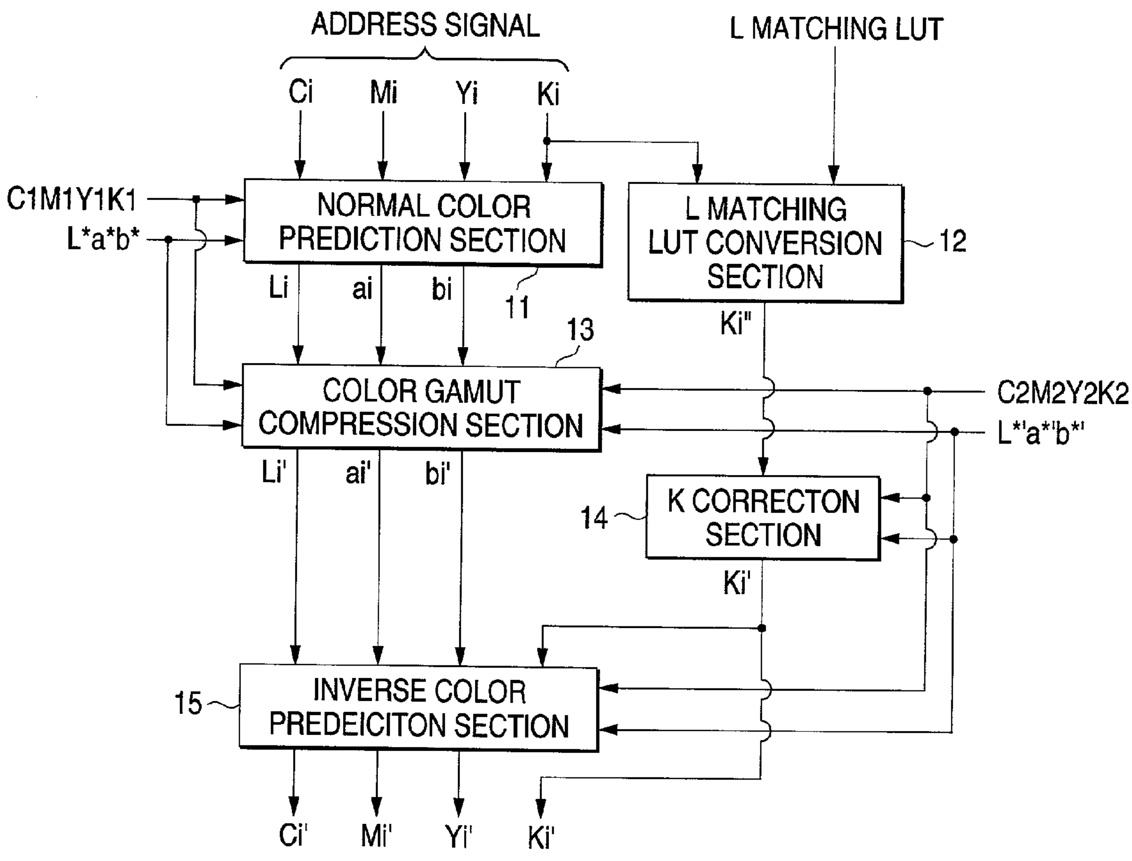
FIG. 4 is a block diagram to show an example of a K preservation 4DLUT preparation section.

FIG. 4 is a block diagram to show an example of the K preservation 4DLUT preparation section. In the figure, numeral 11 denotes a normal color prediction section, numeral 12 denotes an L matching LUT conversion section, numeral 13 denotes a color gamut compression section, numeral 14 denotes a K correction section, and numeral 15 denotes an inverse color prediction section. The normal color prediction section 11 converts (Ci, Mi, Yi, Ki) generated by the address generation section 9 into (Li, ai, bi) in sequence by executing prediction according to the normal color prediction model based on C1M1Y1K1 provided by the LUT1 conversion section 3 and L*a*b* of the first raw data. This processing is to find prediction value (Li, ai, bi) at a grid point of the 4DLUT according to the normal color prediction model.

The L matching LUT conversion section 12 converts Ki of (Ci, Mi, Yi, Ki) generated by the address generation section 9 into Ki" based on the L matching LUT prepared in the L matching LUT preparation section 5, whereby Ki' can be converted into Ki" with the characteristic of K preserved.

The color gamut compression section 13 performs color gamut compression processing for (Li, ai, bi) at the grid point predicted by the normal color prediction section 11 based on C1M1Y1K1 provided by the LUT1 conversion section 3, L*a*b* of the first raw data, C2M2Y2K2 provided by the LUT2 inverse conversion section 4, and L*'a*'b*' of the second raw data, and converts (Li, ai, bi) into (Li', ai', bi').

The K correction section 14 converts Ki" provided by the L matching LUT conversion section 12 into Ki' based on C2M2Y2K2 provided by the LUT2 inverse conversion section 4 and L*'a*'b*' of the second raw data. The K correction section 14 performs correction processing to remove the effect of excessive K, short of K, or the like, for example, for preventing excessive K in a high color saturation area.

The inverse color prediction section 15 converts (Li', ai', bi') undergoing color gamut compression processing in the color gamut compression section 13 into Ci', Mi', Yi' according to the inverse color prediction model based on C2M2Y2K2 provided by the LUT2 inverse conversion section 4, L*'a*'b*' of the second raw data, and Ki' provided by the K correction section 14.

The operation in the example of the K preservation 4DLUT preparation section 6 described above will be discussed briefly. Before K preservation 4DLUT is prepared, C1M1Y1K1 provided by the LUT1 conversion section 3 and L*a*b* of the first raw data are set in the normal color prediction section 11 for preparation for predicting according to the normal color prediction mode based on C1M1Y1K1 and L*a*b* of the first raw data. The L matching LUT prepared in the L matching LUT preparation section 5 is set in the L matching LUT conversion section 12. Further, C1M1Y1K1 provided by the LUT1 conversion section 3, L*a*b* of the first raw data, C2M2Y2K2 provided by the LUT2 inverse conversion section 4, and L*'a*'b*' of the second raw data are set in the color gamut compression section 13 for preparation for color gamut compression. C2M2Y2K2 provided by the LUT2 inverse conversion section 4 and L*'a*'b*' of the second raw data are set in the K correction section 14 for preparation for making K correction. C2M2Y2K2 provided by the LUT2 inverse conversion section 4 and L*'a*'b*' of the second raw data are also set in the inverse color prediction section 15 for preparation for executing inverse color prediction according to the inverse color prediction model.

Then, the normal color prediction section 11 converts (Ci, Mi, Yi, Ki) generated by the address generation section 9 into (Li, ai, bi) in sequence and the color gamut compression section 13 performs color gamut compression processing for (Li, ai, bi) and converts (Li, ai, bi) into (Li', ai', bi'). On the other hand, the L matching LUT conversion section 12 converts Ki of (Ci, Mi, Yi, Ki) generated by the address generation section 9 into Ki" and further the K correction section 14 converts Ki" into Ki'. (Li', ai', bi') output from the color gamut compression section 13 and Ki' output from the K correction section 14 are input to the inverse color prediction section 15 and are converted into Ci', Mi', Yi' according to the inverse color prediction model.

A pair of Ci', Mi', Yi' thus provided by the inverse color prediction section 15 and Ki' output from the K correction section 14 (Ci', Mi', Yi', Ki') becomes data written into the address of the grid point (Ci, Mi, Yi, Ki) generated by the address generation section 9. That is, the grid point (Ci, Mi, Yi, Ki) generated by the address generation section 9 is here the value in the first adjustment-machine-dependent color space and the data written (Ci', Mi', Yi', Ki') is the value in the second adjustment-machine-dependent color space.

As a simple configuration, the K correction section 14 may be removed. Alternatively, without providing the L matching LUT conversion section 12 (and without providing the L matching LUT preparation section 5), only K correction of the K correction section 14 may be made with Ki' of CiMiYiKi generated by the address generation section 9 as Ki" intact. Further, Ki of CiMiYiki generated by the address generation section 9 can also be used intact as Ki' by the inverse color prediction section 15 without providing the K correction section 14.

Figure 5:
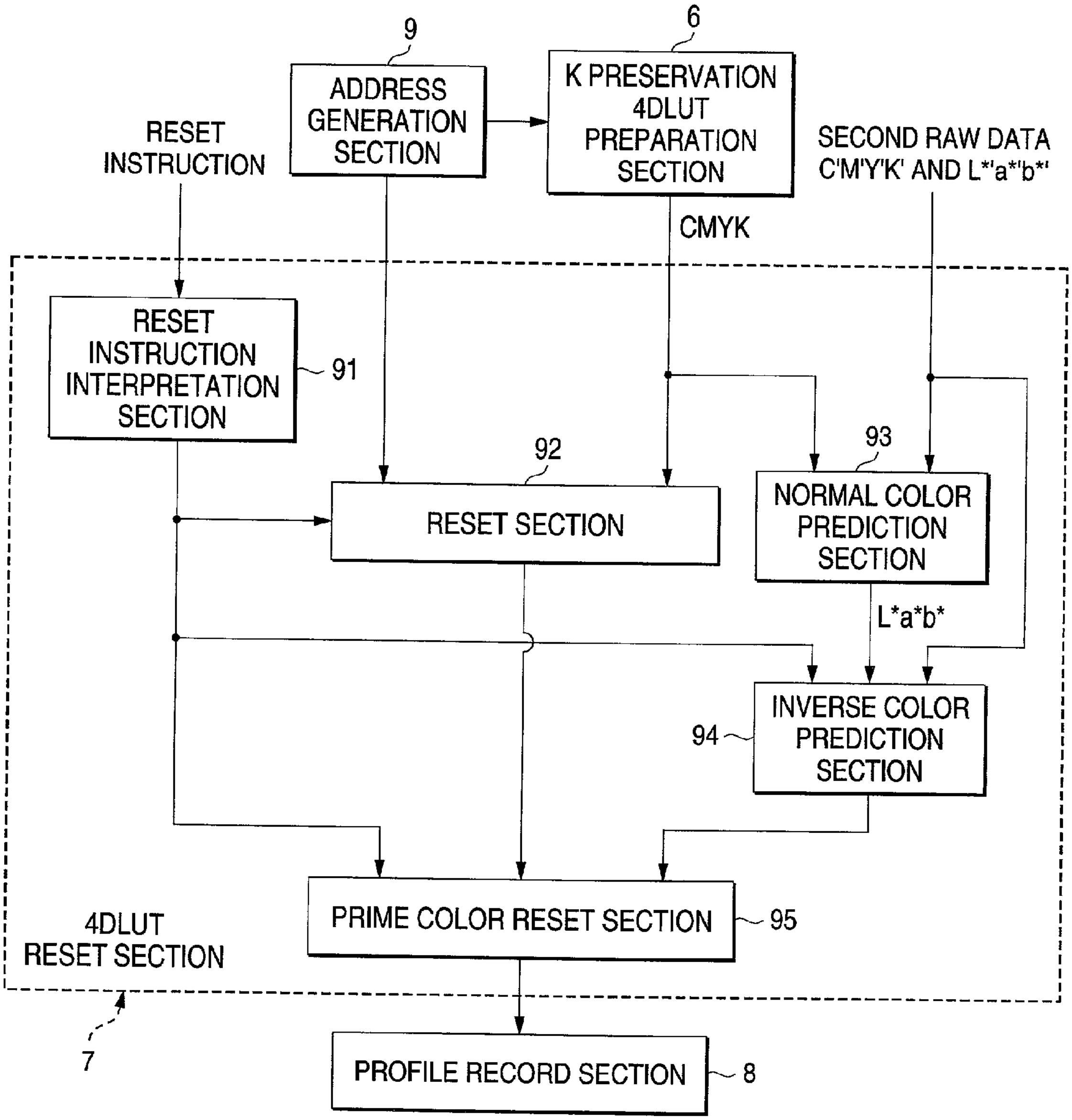
FIG. 5 is a block diagram to show an example of the 4DLUT reset section.

FIG. 5 is a block diagram to show an example of the 4DLUT reset section. In the figure, numeral 91 denotes a reset instruction interpretation section, numeral 92 denotes a reset section, numeral 93 denotes a normal color prediction section, numeral 94 denotes an inverse color prediction section, and numeral 95 denotes a prime color reset section. As described above, the 4DLUT reset section 7 resets the corresponding data to a specific grid point for the K preservation 4DLUT prepared in the K preservation 4DLUT preparation section 6. At this time, the reset processing is performed for a specific color value in the data and thus the represented color may shift from the target color. The example shown in FIG. 5 is a configuration example for performing resetting processing so as to lessen such a color shift. To correct such a color shift, as the data input to the 4DLUT reset section 7, the second raw data used when the K preservation 4DLUT is prepared is required in addition to the data from the K preservation 4DLUT preparation section 6 and the address generation section 9 shown in FIG. 1. C'M'Y'K' of the second raw data is C2M2Y2K2 provided by the LUT2 inverse conversion section 4 in FIG. 1. In a configuration wherein LUT2 is not prepared, C'M'Y'K' is used intact, as described later. For L*'a*'b*', the conversion result to a relative value is used if relative colorometric match is applied.

The reset instruction interpretation section 91 interprets a reset instruction given from the outside as to what color (reset color) is to be reset to what reset value and sends the interpretation result to the sections in the 4DLUT reset section 7.

The reset section 92 actually performs reset processing as instructed from the reset instruction interpretation section 91. For example, it performs reset processing of forcibly replacing the reset color with the reset value at a specific grid point, grid points on a specific line, grid points on a specific plane, grid points in a specific three-dimensional area, grid points corresponding to a specific secondary color, etc., for example.

The normal color prediction section 93 uses the second raw data to conduct normal color prediction for CMYK reset by the reset section 92, and converts CMYK into L*a*b* value, which is the target index.

The inverse color prediction section 94 receives the reset color and the reset value from the reset instruction interpretation section 91 and uses the L*a*b* value provided by the normal color prediction section 93 and the reset color and the reset value as fixed values and unreset color other than the reset color as variable to predict the unreset color by inverse color prediction.

The prime color reset section 95 performs processing of replacing the data after undergoing the reset processing in the reset section 92 with the value of the unreset color provided by the inverse color prediction section 94. The data thus provided may be output of the 4DLUT reset section 7.

The operation of the 4DLUT reset section 7 as described above will be discussed briefly. Before 4DLUT is prepared, a reset instruction specifying what color is to be reset to what reset value is previously input through a user interface, etc., to the reset instruction interpretation section 91. The reset instruction interpretation section 91 determines reset color and unreset color and a predetermined value for the reset color (reset value). The second raw data is set in the normal color prediction section 93 and the inverse color prediction section 94.

Then, the address generation section 9 generates addresses in sequence and the K preservation 4DLUT preparation section 6 inputs the addresses and prepare CMYK of grid point data. The reset section 92 performs reset processing based on the addresses, the prepared CMYK, and the reset color and the reset value from the reset instruction interpretation section 91.

On the other hand, the normal color prediction section 93 converts CMYK prepared in the K preservation 4DLUT preparation section 6 into L*a*b* by normal color prediction while using the second raw data. The L*a*b* is the target index. Next, the inverse color prediction section 94 uses the L*a*b* provided by the normal color prediction section 93 and the reset color and the reset value as fixed values and unreset color as variable to predict the unreset color so as to minimize the color difference, for example. The prime color reset section 95 replaces the data of CMYK after undergoing the reset processing in the reset section 92 with the value of the unreset color provided by the inverse color prediction section 94. The final CMYK thus provided is recorded in the profile record section 8 as the final grid point data in the K preservation 4DLUT.

In the example, when the inverse color prediction section 94 predicts the unreset color so as to minimize the color difference. However, to execute such resetting guaranteeing K single color reproduction, for example, only L* of output of the normal color prediction section 93 may be adopted and the inverse color prediction section 94 may be implemented as a one-dimensional LUT representing only the relationship between K' and L* of the second raw data. Further, for example, for Y, color saturation may be used for matching. in addition, the value derived from L*a*b* may be adopted as the target value.

The 4DLUT reset section 7 is configured as described above, whereby 4DLUT wherein color change caused by reset processing is suppressed as much as possible can be prepared.

Figure 6:
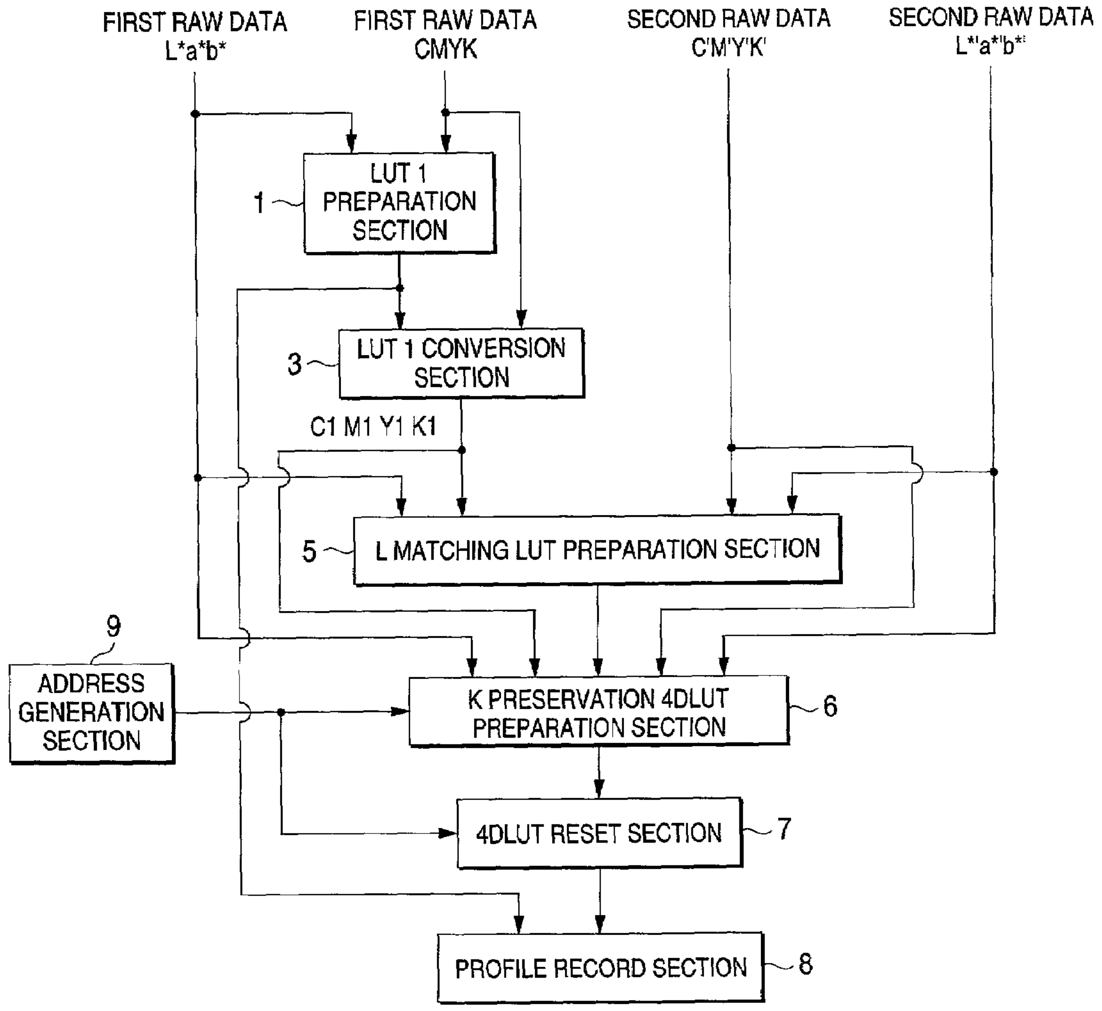
FIG. 6 is a block diagram to show a modified example of the first embodiment of the color conversion coefficient preparation apparatus and the color conversion coefficient preparation method of the invention.

FIG. 6 is a block diagram to show a modified example of the first embodiment of the color conversion coefficient preparation apparatus and the color conversion coefficient preparation method of the invention. Parts similar to those previously described with reference to FIG. 1 are denoted by the same reference numerals in FIG. 6 and will not be discussed again. In the modified example, the LUT2 preparation section 2 is not provided and therefore LUT2 is not prepared. In this case, the LUT2 inverse conversion section 4 is not required either.

An L matching LUT preparation section 5 relates K1 and K' so that L* becomes equal from C1M1Y1K1 provided by an LUT1 conversion section 3, L*a*b* of the first raw data, and C'M'Y'K' and L*'a*'b*' of the second raw data, whereby a one-dimensional lookup table relating both is prepared and is used as L matching LUT.

A K preservation 4DLUT preparation section 6 prepares a K preservation 4DLUT from L*a*b* of the first raw data, C1M1Y1K1 provided by the LUT1 conversion section 3, C'M'Y'K' and L*'a*'b*' of the second raw data, the L matching LUT prepared by the L matching LUT preparation section 5, and (Ci, Mi, Yi, Ki) generated by an address generation section 9. The K preservation 4DLUT preparation section 6 may have a configuration similar to that described above, such as the configuration previously described with reference to FIG. 4.

Other components are similar to those previously described with reference to FIG. 1 and the whole operation is as described above except that LUT2 is not prepared or used, and therefore they will not be discussed again.

Figure 7:
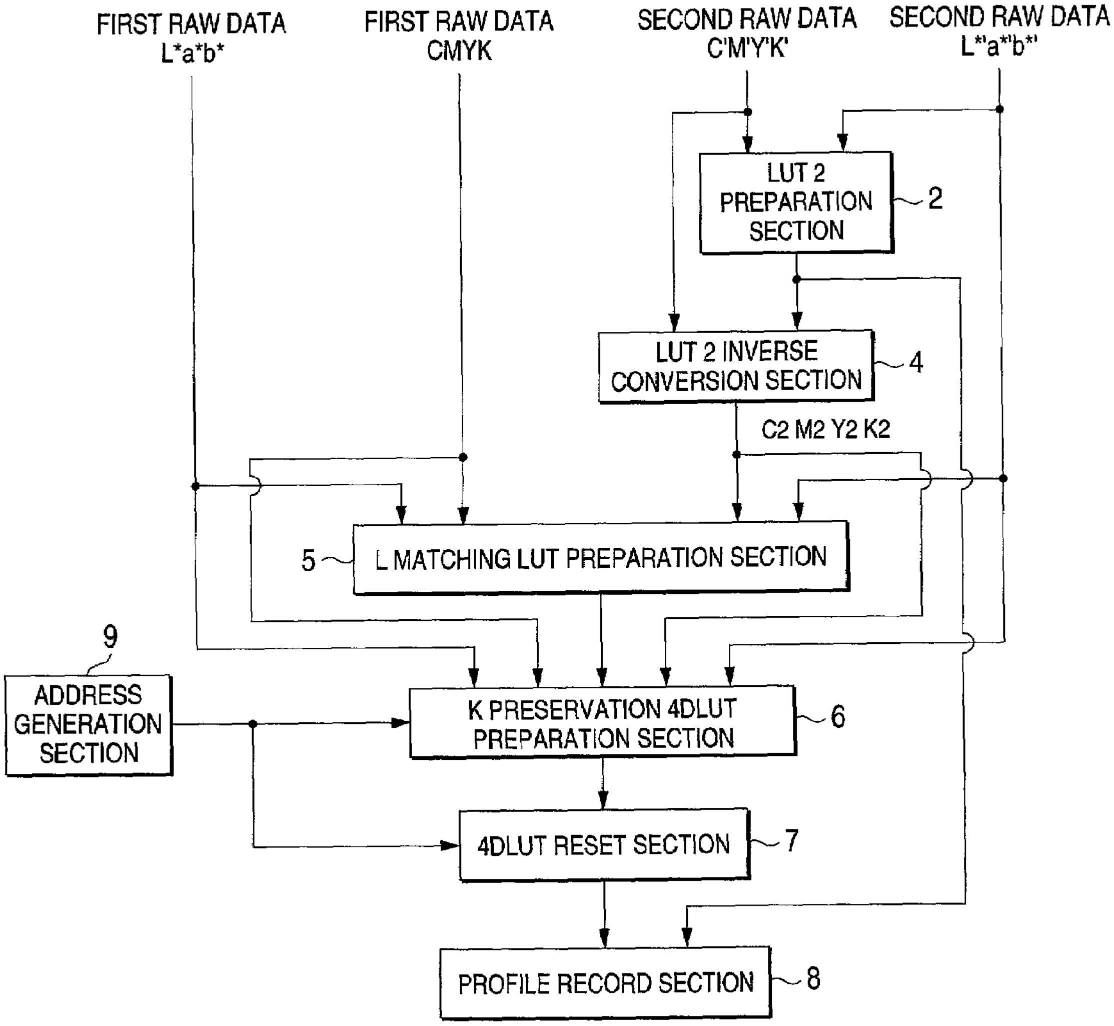
FIG. 7 is a block diagram to show another modified example of the first embodiment of the color conversion coefficient preparation apparatus and the color conversion coefficient preparation method of the invention.

FIG. 7 is a block diagram to show another modified example of the first embodiment of the color conversion coefficient preparation apparatus and the color conversion coefficient preparation method of the invention. Parts similar to those previously described with reference to FIG. 1 are denoted by the same reference numerals in FIG. 7 and will not be discussed again. In the modified example, the LUT1 preparation section 1 is not provided and therefore LUT1 is not prepared. In this case, the LUT1 conversion section 3 is not required either.

An L matching LUT preparation section 5 relates K1 and K2 so that L* becomes equal from CMYK and L*a*b* of the first raw data, C2M2Y2K2 provided by an LUT2 inverse conversion section 4, and L*'a*'b*' of the second raw data, whereby a one-dimensional lookup table relating both is prepared and is used as L matching LUT.

A K preservation 4DLUT preparation section 6 prepares a K preservation 4DLUT from CMYK and L*a*b* of the first raw data, C2M2Y2K2 provided by the LUT2 inverse conversion section 4, L*'a*'b*' of the second raw data, the L matching LUT prepared by the L matching LUT preparation section 5, and (Ci, Mi, Yi, Ki) generated by an address generation section 9. The K preservation 4DLUT preparation section 6 may have a configuration similar to that described above, such as the configuration previously described with reference to FIG. 4.

Other components are similar to those previously described with reference to FIG. 1 and the whole operation is as described above except that LUT1 is not prepared or used, and therefore they will not be discussed again.

In the configuration shown in FIG. 6, the LUT2 preparation section 2 and the LUT2 inverse conversion section 4 are not provided and in the configuration shown in FIG. 7, the LUT1 preparation section 1 and the LUT1 conversion section 3 are not provided. However, similarity is also applied if the LUT2 preparation section 2 or the LUT1 preparation section 1 prepares such LUT2 or LUT1 allowing C'M'Y'K' or CMYK to pass through. None of the LUT2 preparation section 2 and the LUT2 inverse conversion section 4 and the LUT1 preparation section 1 and the LUT1 conversion section 3 may be provided.

Figure 8:
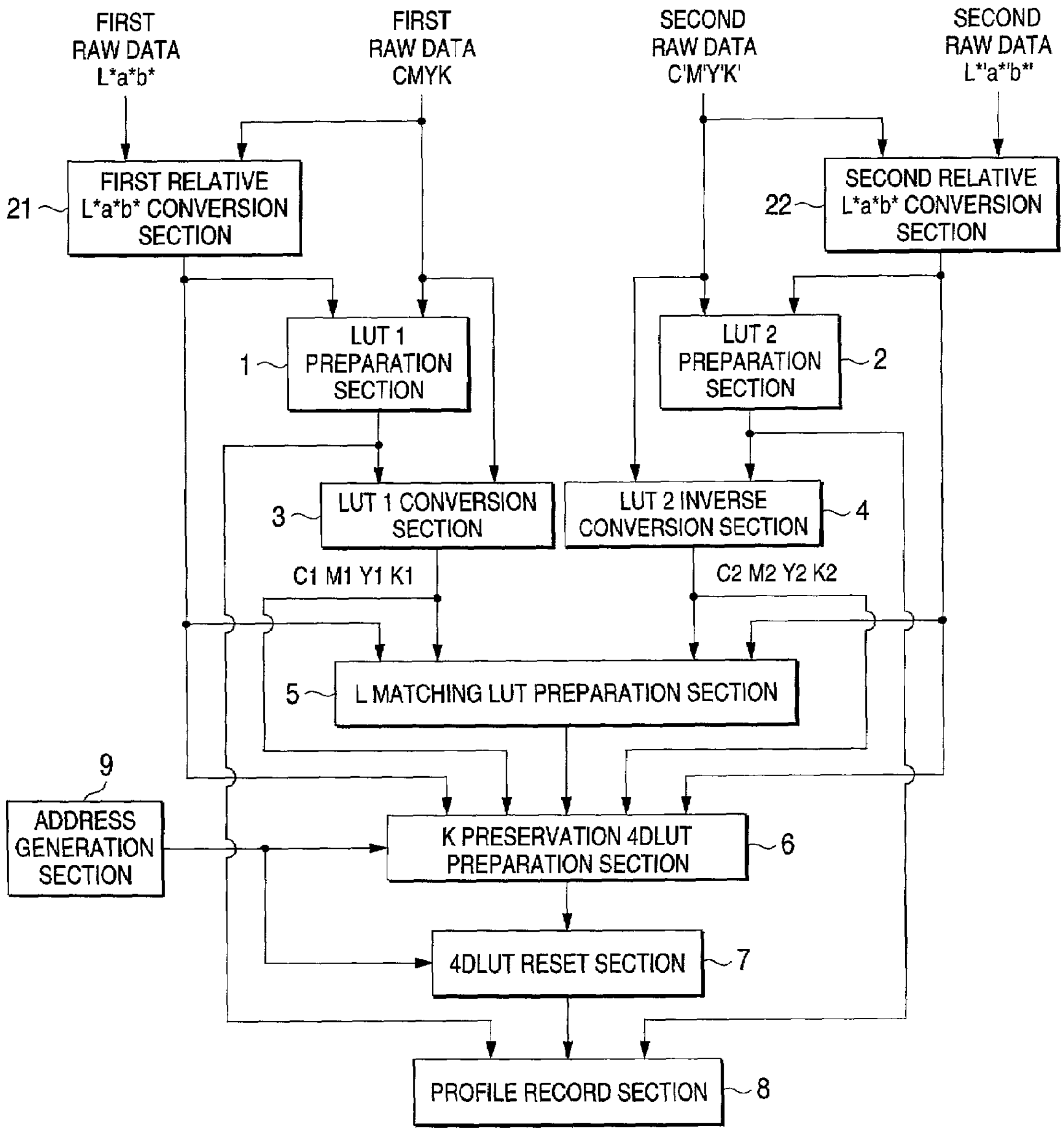
FIG. 8 is a block diagram to show a second embodiment of color conversion coefficient preparation apparatus and color conversion coefficient preparation method of the invention.

FIG. 8 is a block diagram to show a second embodiment of color conversion coefficient preparation apparatus and color conversion coefficient preparation method of the invention. Parts similar to those previously described with reference to FIG. 1 are denoted by the same reference numerals in FIG. 8 and will not be discussed again. In FIG. 8, numeral 21 denotes a first relative L*a*b* conversion section and numeral 22 denotes a second relative L*a*b* conversion section. In the second embodiment, a configuration also considering relative colorimetric match in addition to the first embodiment is shown.

The first relative L*a*b* conversion section 21 recognizes white in first raw data from L*a*b* and CMYK of first raw data or predicts white using a normal color prediction model and converts L*a*b* of the first raw data into relative L*a*b* using the recognized or predicted white and preset white reference. Likewise, the second relative L*a*b* conversion section 22 recognizes white in second raw data from L*'a*'b*' and C'M'Y'K' of second raw data or predicts white using a normal color prediction model and converts L*'a*'b*' of the second raw data into relative L*'a*'b*' using the recognized or predicted white and preset white reference.

The processing in the first relative L*a*b* conversion section 21 and the second relative L*a*b* conversion section 22 is processing for making the under color of paper "white." For a specific calculation method, etc., expressions 3 to 6, etc., for example, in the above-given description of the relative colorimetric match can be used.

An LUT1 preparation section 1 uses relative L*a*b* provided by the first relative L*a*b* conversion section 21 instead of L*a*b* of the first raw data. An LUT2 preparation section 2 uses relative L*'a*'b*' provided by the second relative L*a*b* conversion section 22 instead of L*'a*'b*' of the second raw data. Further, an L matching LUT preparation section 5 and a K preservation 4DLUT preparation section 6 use relative L*a*b* provided by the first relative L*a*b* conversion section 21 and relative L*'a*'b*' provided by the second relative L*a*b* conversion section 22 instead of L*a*b* of the first raw data and L*'a*'b*' of the second raw data. Other components are similar to those of the first embodiment described above.

Any other operation than conversion of L*a*b* of the first raw data to relative L*a*b* in the first relative L*a*b* conversion section 21 or conversion of L*'a*'b*' of the second raw data to relative L*'a*'b*' in the second relative L*a*b* conversion section 22 is also similar to that of the first embodiment and will not be discussed again.

According to the configuration, if the under color of paper assumed to be white on the input side differs from under color of paper assumed to be white on the output side, the under color of paper on the output side can be reproduced as white. Thus, for example, if the under color of paper on the input side has lower lightness than the under color of paper on the output side, coloring the whole paper is avoided. in an opposite case, a problem such that a highlight portion disappears can be prevented.

FIG. 8 shows the configuration based on the configuration in the first embodiment previously described with reference to FIG. 1, but the second embodiment can also be applied to other configurations, such as those of the modified examples previously described with reference to FIGS. 6 and 7.

Figure 9:
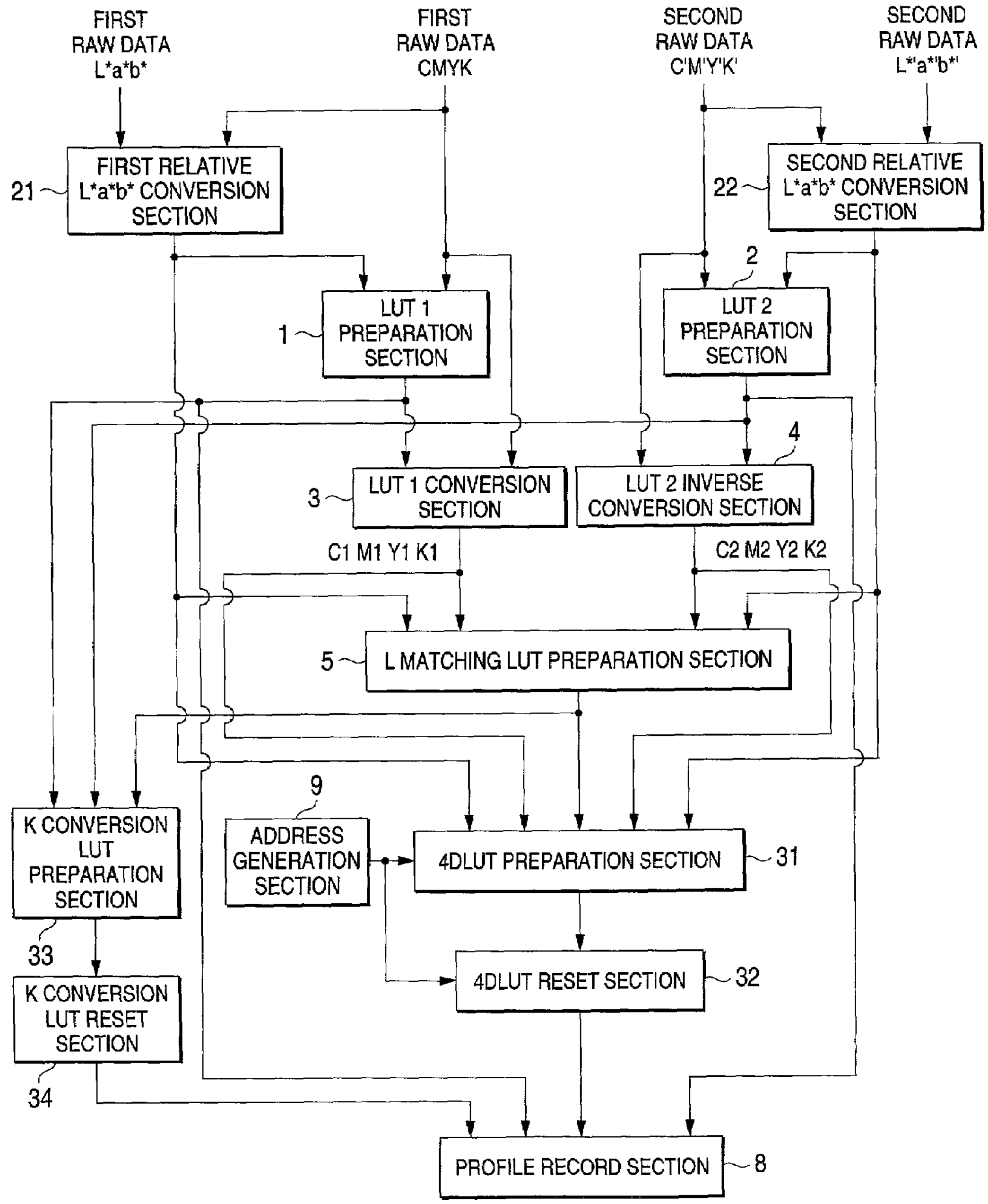
FIG. 9 is a block diagram to show a third embodiment of color conversion coefficient preparation apparatus and color conversion coefficient preparation method of the invention.

FIG. 9 is a block diagram to show a third embodiment of color conversion coefficient preparation apparatus and color conversion coefficient preparation method of the invention. Parts similar to those previously described with reference to FIG. 8 are denoted by the same reference numerals in FIG. 9 and will not be discussed again. In FIG. 9, numeral 31 denotes a 4DLUT preparation section, numeral 32 denotes a 4DLUT reset section, numeral 33 denotes a K conversion LUT preparation section, and numeral 34 denotes a K conversion LUT reset section. In the third embodiment, a 4DLUT for performing three outputs of CMY excluding K from four inputs of CMYK and a one-dimensional lookup table for K (K conversion LUT) are prepared instead of preparing a 4-input, 4-output 4DLUT. In the embodiment shown in FIG. 9, components for preparing the K conversion LUT are added based on the configuration shown in FIG. 8.

The 4DLUT preparation section 31 prepares a 4-input, 3-output 4DLUT from relative L*a*b* of first raw data provided by a first relative L*a*b* conversion section 21, C1M1Y1K1 provided by an LUT1 conversion section 3, relative L*'a*'b*' of second raw data provided by a second relative L*a*b* conversion section 22, C2M2Y2K2 provided by an LUT2 inverse conversion section 4, an L matching LUT prepared by an L matching LUT preparation section 5, and (Ci, Mi, Yi, Ki) generated by an address generation section 9. The prepared 4-input, 3-output 4DLUT basically is similar to the 4DLUT prepared in the first and second embodiments, but data of CMY except K is stored as data of each grid point. The LUT1 conversion section 3, the LUT2 inverse conversion section 4, the L matching LUT preparation section 5, the 4DLUT preparation section 31, and the like make up n-dimensional DLUT preparation section (in this case, n=4).

Figure 10:
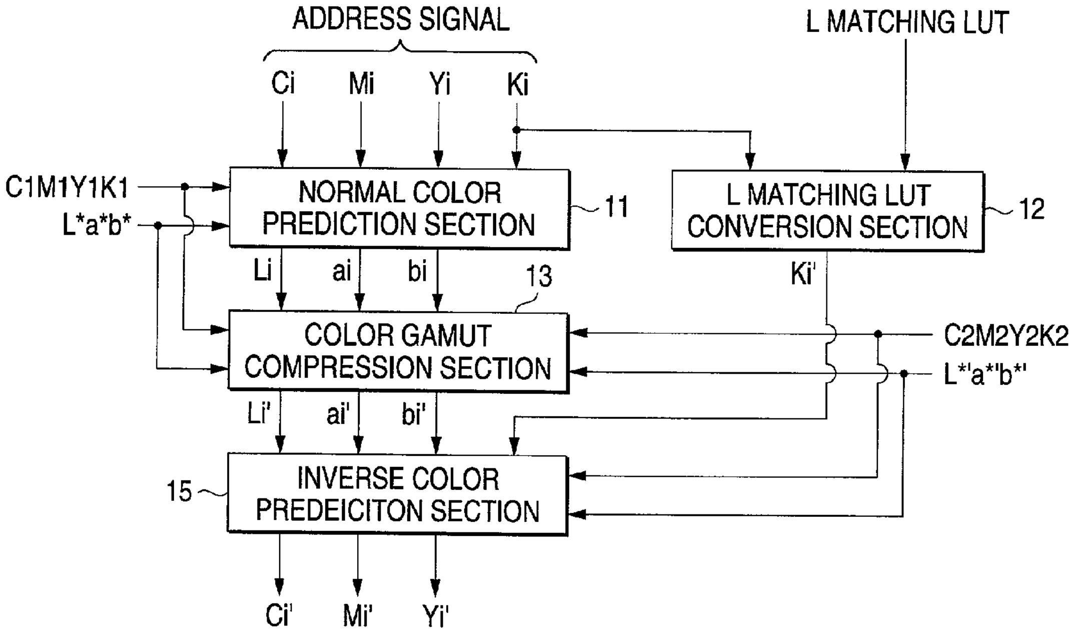
FIG. 10 is a block diagram to show an example of a 4DLUT preparation section.

FIG. 10 is a block diagram to show an example of the 4DLUT preparation section 31. Parts similar to those previously described with reference to FIG. 4 are denoted by the same reference numerals in FIG. 10. The 4DLUT preparation section 31 differs from the K preservation 4DLUT preparation section 6 shown in FIG. 4 only in that the K correction section 14 of the K preservation 4DLUT preparation section 6 is excluded and that an inverse color prediction section 15 does not output Ki' and outputs Ci', Mi', Yi'. The operation of the sections is similar to that previously described with reference to FIG. 4.

Referring again to FIG. 9, the 4DLUT reset section 32 basically is similar to the 4DLUT reset section 7 in the first and second embodiments, but differs from the 4DLUT reset section 7 in that it does not perform resetting concerning K.

A table value A of a lookup table for converting K in LUT1 prepared by an LUT1 preparation section 1, a table value B of a lookup table for converting K in LUT2 prepared by an LUT2 preparation section 2, and a table value C of the L matching LUT prepared by the L matching LUT preparation section 5 are input to the K conversion LUT preparation section 33. The K conversion LUT preparation section 33 combines the three one-dimensional lookup tables made up of the table values A, B, and C in the order of A, C, and B to prepare K conversion LUT. This K conversion LUT is provided for converting input K (K value in first machine-dependent color space) into output K' (K value in second machine-dependent space).

The K conversion LUT reset section 34 performs resetting concerning K as required for the K conversion LUT prepared by the K conversion LUT preparation section 33. Specifically, the K conversion LUT reset section 34 forcibly sets K=0 to K=0, forcibly sets K=100 to K=100, etc.

According to the configuration, the LUT1 concerning C, M, and Y prepared by the LUT1 preparation section 1, the LUT2 concerning C, M, and Y prepared by the LUT2 preparation section 2, the K conversion LUT, and 4-input, 3-output 4DLUT are recorded in a profile record section 8. Thus, the 4DLUT is three outputs and the K conversion LUT is provided, whereby the memory capacity for storing the lookup tables can be reduced.

In the third embodiment, the operation of preparing the 4DLUT and performing reset processing is similar to that in the first and second embodiments. However, in the third embodiment, in the 4DLUT preparation section 31, data of CMY except K is stored as the data corresponding to the grid point addresses generated by the address generation section 9, reset processing except for K is performed in the 4DLUT reset section 32, and 4-input, 3-output 4DLUT is recorded in the profile record section 8. On the other hand, when LUT1, LUT2, and L matching LUT are prepared, the K conversion LUT preparation section 33 combines the table value A in the LUT1, the table value B in the LUT2, and the table value C in the L matching LUT in the order of A, C, and B to prepare K conversion LUT. For the prepared K conversion LUT, the K conversion LUT reset section 34 performs reset processing relative to a predetermined value and the result is recorded in the profile record section 8. Thus, the LUT1 concerning C, M, and Y prepared by the LUT1 preparation section 1, the LUT2 concerning C, M, and Y prepared by the LUT2 preparation section 2, the K conversion LUT, and 4-input, 3-output 4DLUT are recorded in the profile record section 8, as described above.

In the third embodiment, the 4DLUT reset section 32 does not perform reset processing for K, but K is reset in the K conversion LUT reset section 34. Therefore, the 4DLUT reset section 32 can be configured so as to perform reset processing as specified for any other color than K through a user interface, for example, as shown in FIG. 3 in the first embodiment and the K conversion LUT reset section 34 can be configured so as to perform reset processing as specified for K. Of course, various modifications previously described with reference to FIG. 3 are possible such that various reset items can be selected in addition to the items shown in FIG. 3.

In the description given above, the K conversion LUT preparation section 33 combines the table values A, C, and B in the order to prepare K conversion LUT, but the invention is not limited to it. For example, the table values A and C may be combined in this order to prepare K conversion LUT. In this case, the table value for K in the LUT2 prepared by the LUT2 preparation section 2 maybe recorded in the profile record section 8 as it is, and when it is used, output of the K conversion LUT may be converted with the table value of K in the LUT2. Alternatively, the table values C and B may be combined in this order to prepare K conversion LUT. In this case, the table value for K in the LUT1 prepared by the LUT1 preparation section 1 may be recorded in the profile record section 8 as it is, and when it is used, first, conversion based on the table value of K in the LUT1 may be executed before conversion based on the K conversion LUT is executed.

For example, without preparing the table value for K in either or both of the LUT1 preparation section 1 and the LUT2 preparation section 2 and using K of the first raw data or K' of the second raw data as it is, the K conversion LUT preparation section 33 may prepare K conversion LUT. In this case, for K, K of the first raw data or K' of the second raw data is input to the L matching LUT preparation section 5 and the 4DLUT preparation section 31 as it is.

Further, FIG. 9 shows the configuration example for preparing the 4-input, 3-output 4DLUT to conduct relative colorimetric match as well as absolute colorometric match and partial colorometric match. However, the invention is not limited to it. For example, the first relative L*a*b* conversion section 21 and the second relative L*a*b* conversion section 22 can be removed as in the configuration shown in FIG. 1 and absolute colorometric match can also be conducted using the 4-input, 3-output 4DLUT to conduct partial colorimetric match. Further, in any case, the embodiment can also be applied to the configuration wherein either LUT1 or LUT2 is not prepared, for example, as shown in FIG. 6 or 7.

Figure 11:
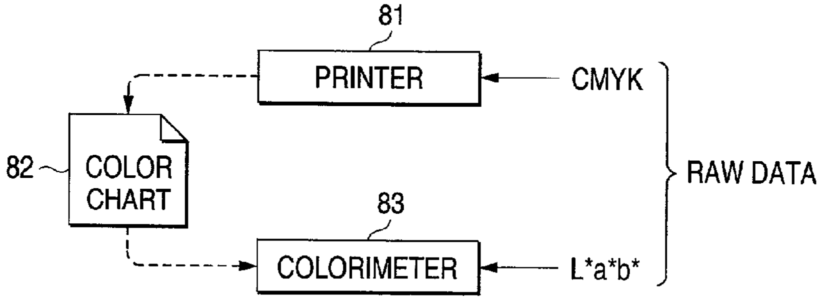
FIG. 11 is a schematic representation of examples of a preparation method of raw data.
Figure 11:
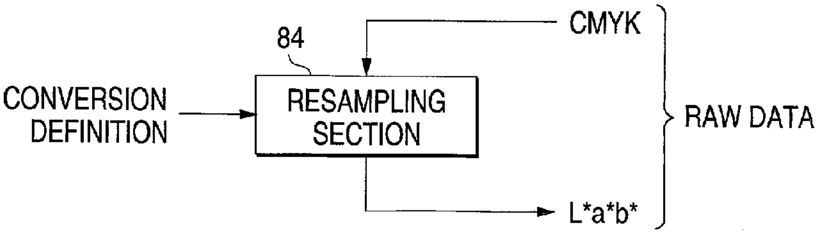

FIG. 11 is a schematic representation of examples of a preparation method of raw data. In the figure, numeral 81 denotes an output unit, numeral 82 denotes a color chart, numeral 83 denotes a calorimeter, and numeral 84 denotes a resampling section. In the description given above, the first raw data and the second raw data are given as they are previously recorded in a file, etc. Of course, the first raw data and the second raw data may be given by any desired method. Here, two examples of the raw data preparation method are given.

First, in the example shown in FIG. 11(A), the color chart 82 is printed out on the output unit 81 and the color of the color chart is measured with the calorimeter 83. For example, a color chart image made up of CMYK data is passed from the outside to the output unit 81 for printing out. Accordingly, the color chart 82 is prepared. The color chart image contains various color patches and patch images of various colors are formed on the color chart 82. The colors of the color patches on the color chart 82 printed out are measured with the colorimeter 83 and color values, for example, in the L*a*b* color space are obtained.

Raw data can be provided based on the color values in the L*a*b* color space thus provided by measuring the colors with the calorimeter 83 and the CMYK data passed to the output unit 81 at the color chart output time corresponding to the measured color patches. For example, if the output unit 81 is a first output unit, first raw data can be provided and if the output unit 81 is a second output unit, second raw data can be provided.

In the example shown in FIG. 11(B), a profile as typified by ICC is used in place of obtaining raw data by color measurement. First, the structure of the ICC profile will be discussed briefly. The ICC profile describes the relationship between the L*a*b* color space or XYZ color space as machine-independent color space and the CMYK color space as machine-dependent color space. The ICC profile has bidirectional color conversion coefficients and conversion from machine-dependent color space to machine-independent color space and conversion from machine-independent color space to machine-dependent color space are enabled. Here, conversion from machine-dependent color space to machine-independent color space is called A to B and conversion from machine-independent color space to machine-dependent color space is called B to A. A to B is considered to be a function of converting arbitrary CMYK color space data into L*a*b* color space or XYZ color space data. In the machine-dependent color space in the ICC profile, relative value, namely, relative colorometric match is basic. Conversion rule and conversion coefficient called Media White Point Tag are defined so that the machine-dependent color space can be converted into absolute value. Therefore, it is possible to obtain such an absolute value corresponding to a color measurement value with respect to arbitrary CMYK data.

The resampling section 84 prepares raw data using the profile as described above. This processing can be performed, for example, as follows: Here, it is assumed that the profile is the ICC profile.

(1) The ICC profile is read and parameters are set for executing color conversion with absolute value as A to B.

(2) A data set of CMYK to prepare raw data is provided. The CMYK data set can use color patch data used with a color chart image described above, for example.

(3) For the CMYK data set provided in (2), conversion of A to B is executed according to the parameter set obtained in (1) and L*a*b* data is calculated.

Such processing in (1) to (3) is called resampling and the resampling section 84 performs such resampling processing. A pair of the CMYK data and the L*a*b* data obtained by resampling is equivalent to raw data. Resampling processing of the resampling section 84 as described above maybe performed when the first raw data and the second raw data are found.

If the ICC profile is used as described above, when relative colorimetric match is to be finally found, conversion with relative value rather than absolute value may be executed in (1). The profile used in the resampling section 84 is not limited to the ICC profile and if conversion definition (profile) from machine-dependent color space to machine-independent color space is made, it can be used in place of the raw data, needless to say.

If the sampling section 84 shown in FIG. 11(B) is placed, for example, at the preceding stage in the first embodiment of the color conversion coefficient preparation apparatus and the color conversion coefficient preparation method shown in FIG. 1, similar result can be obtained with a profile such as the ICC profile as input. Of course, this is also applied in the modified examples of the first embodiment and the second and third embodiments.

Such a configuration is adopted, whereby if some conversion definition (profile) such as the ICC profile already exists, time and labor of printing out a color chart and measuring the color thereof can be saved and a color conversion coefficient can be prepared efficiently.

The resampling section 84 may be provided separately for preparing each of the first raw data and the second raw data or may be provided for common use. For one, raw data may be obtained by color measurement and for the other, resampling from a profile may be executed.

Figure 12:
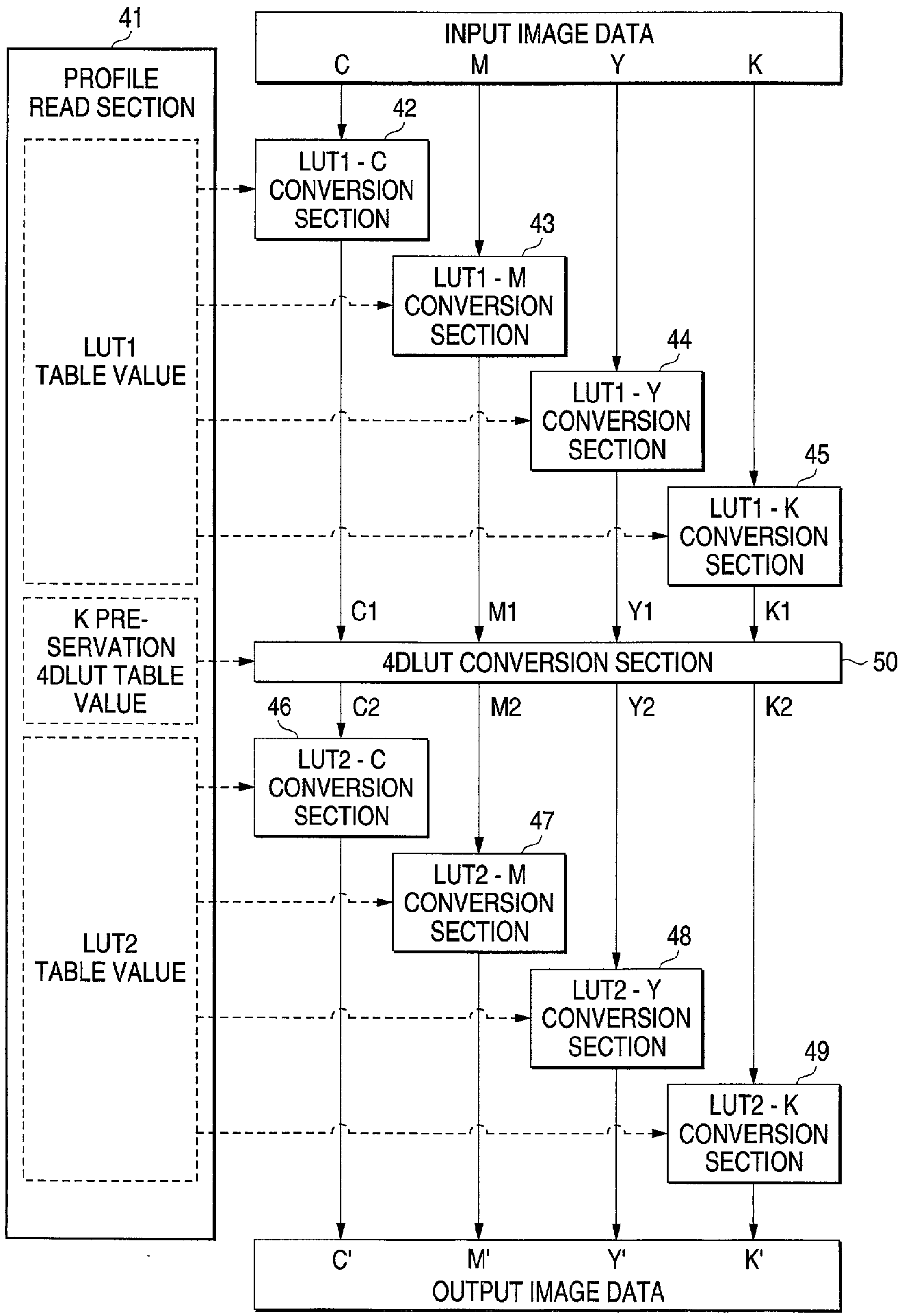
FIG. 12 is a block diagram to show a first embodiment of a color conversion system of the invention.

Next, a system for executing color conversion using a profile prepared as described above will be discussed. FIG. 12 is a block diagram to show a first embodiment of the color conversion system of the invention. In the figure, numeral 41 denotes a profile read section, numeral 42 denotes an LUT1-C conversion section, numeral 43 denotes an LUT1-M conversion section, numeral 44 denotes an LUT1-Y conversion section, numeral 45 denotes an LUT1-K conversion section, numeral 46 denotes an LUT2-C conversion section, numeral 47 denotes an LUT2-M conversion section, numeral 48 denotes an LUT2-Y conversion section, numeral 49 denotes an LUT2-K conversion section, and numeral 50 denotes a 4DLUT conversion section.

The profile read section 41 reads a profile previously prepared in a manner as shown as the first or second embodiment of the color conversion coefficient preparation apparatus and the color conversion coefficient preparation method of the invention described above, for example. The profile read section 41 interprets LUT1, LUT2, and K preservation 4DLUT in the profile and sets a C table value in the LUT1 in the LUT1-C conversion section 42, an M table value in the LUT1 in the LUT1-M conversion section 43, a Y table value in the LUT1 in the LUT1-Y conversion section 44, a K table value in the LUT1 in the LUT1-K conversion section 45, a C table value in the LUT2 in the LUT2-C conversion section 46, an M table value in the LUT2 in the LUT2-M conversion section 47, a Y table value in the LUT2 in the LUT2-Y conversion section 48, a K table value in the LUT2 in the LUT2-K conversion section 49, and a table value in the K preservation 4DLUT in the 4DLUT conversion section 50.

The LUT1-C conversion section 42, the LUT1-M conversion section 43, the LUT1-Y conversion section 44, and the LUT1-K conversion section 45 use the one-dimensional lookup tables of the colors read by the profile read section 41 and execute gradation conversion with respect to the single colors of C, M, Y, and K.

The 4DLUT conversion section 50 uses the K preservation 4DLUT read by the profile read section 41 and executes color conversion processing with respect to input CMYK (C1M1Y1K1) after undergoing the gradation conversion.

The LUT2-C conversion section 46, the LUT2-M conversion section 47, the LUT2-Y conversion section 48, and the LUT2-K conversion section 49 use the one-dimensional lookup tables of the colors read by the profile read section 41 and execute single-color gradation conversion with respect to CMYK (C2M2Y2K2) after undergoing the color conversion in the 4DLUT conversion section 50.

An example of the operation in the first embodiment of the color conversion system described above will be discussed briefly. The profile read section 41 previously reads a profile and sets the table values in the LUT1 in the LUT1-C conversion section 42, the LUT1-M conversion section 43, the LUT1-Y conversion section 44, and the LUT1-K conversion section 45, sets the table values in the LUT2 in the LUT2-C conversion section 46, the LUT2-M conversion section 47, the LUT2-Y conversion section 48, and the LUT2-K conversion section 49, and sets the table value in the K preservation 4DLUT in the 4DLUT conversion section 50.

Then, the LUT1-C conversion section 42, the LUT1-M conversion section 43, the LUT1-Y conversion section 44, and the LUT1-K conversion section 45 execute gradation conversion of C, M, Y, and K of input image data, whereby the four color values CMYK in the first machine-dependent color space are converted into four color values C1M1Y1K1 in the first adjustment-machine-dependent color space. Next, the 4DLUT conversion section 50 executes color conversion processing. The color conversion executed by the 4DLUT conversion section 50 is conversion from the four color values C1M1Y1K1 in the first adjustment-machine-dependent color space to four color values C2M2Y2K2 in the second adjustment-machine-dependent color space. Last, the LUT2-C conversion section 46, the LUT2-M conversion section 47, the LUT2-Y conversion section 48, and the LUT2-K conversion section 49 execute gradation conversion to prepare output image data. The conversion is conversion from the four color values C2M2Y2K2 in the second adjustment-machine-dependent color space to four color values C'M'Y'K' in the second machine-dependent color space. The input four color values CMYK in the first machine-dependent color space are thus converted into the four color values C'M'Y'K' in the second machine-dependent color space. At this time, the table values in the lookup tables in the sections are determined as described above and thus not only complete colorometric match, but also partial colorometric match and relative colorimetric match, for example, can be conducted and color reproducibility can be improved as compared with that in the related art.

In the described color conversion system, the profile is changed in read whenever necessary, whereby complete colorometric match, partial colorometric match, and relative colorometric match can be changed for processing as desired for the input image data without changing the image processing technique. For example, if the profile prepared according to the first embodiment of the color conversion coefficient preparation apparatus and the color conversion coefficient preparation method of the invention described above, color conversion based on complete colorometric match, partial colorometric match is executed and if the profile prepared according to the second embodiment of the color conversion coefficient preparation apparatus and the color conversion coefficient preparation method of the invention, color conversion based on complete colorometric match, partial colorometric match, relative colorimetric match is executed. For example, if the image output unit assumed in input image data differs, etc., the corresponding profile can also be read for performing color conversion processing. Of course, color conversion with a profile in which predetermined LUT1, LUT2, and K preservation 4DLUT are built and fixed may be executed without providing the profile read section 41.

Figure 13:
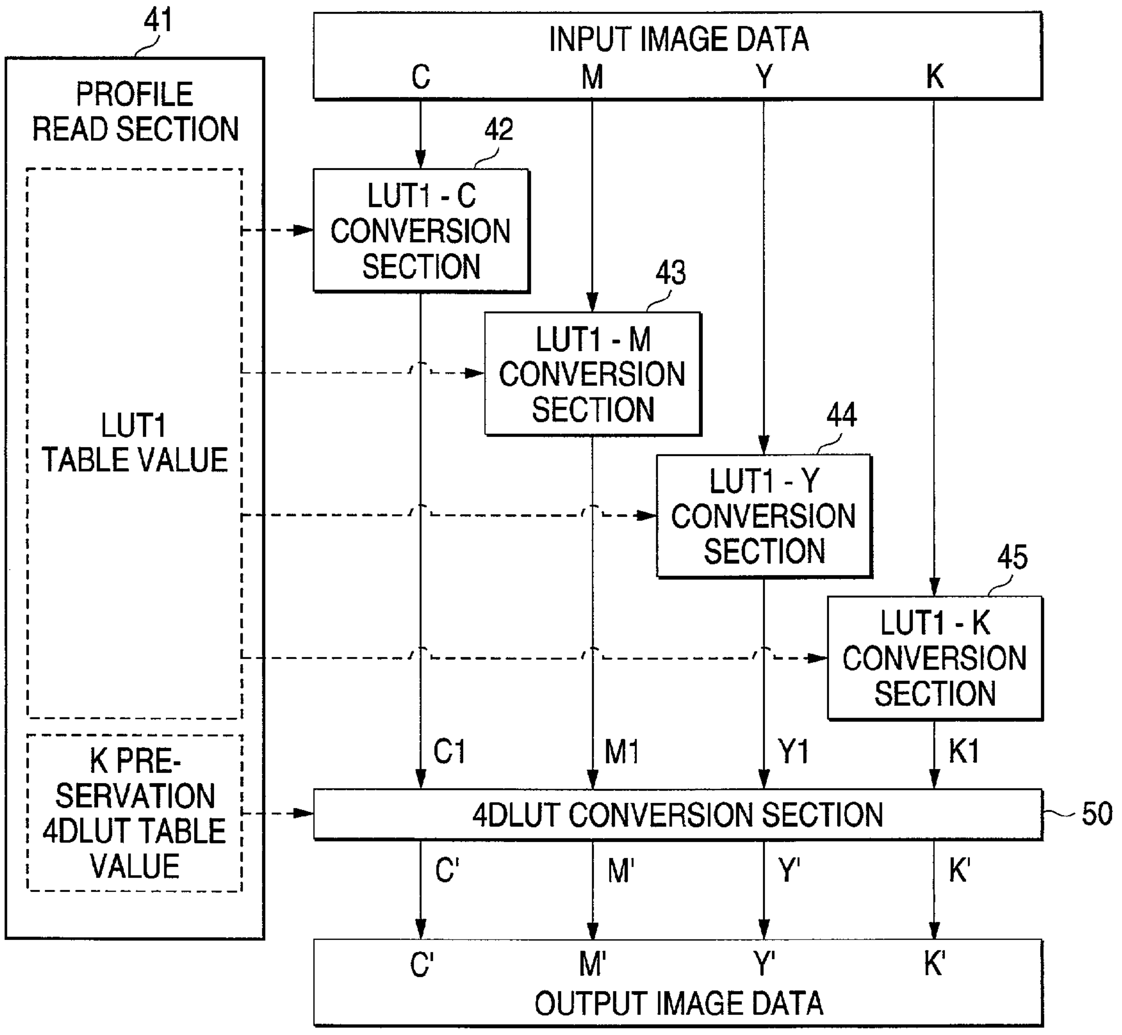
FIG. 13 is a block diagram to show a modified example in the first embodiment of the color conversion system of the invention.

FIG. 13 is a block diagram to show a modified example in the first embodiment of the color conversion system of the invention. Parts similar to those previously described with reference to FIG. 12 are denoted by the same reference numerals in FIG. 13. The modified example corresponds to the modified example of the first embodiment of the color conversion coefficient preparation apparatus and the color conversion coefficient preparation method of the invention previously described with reference to FIG. 6, and provides an example in which LUT2 is not prepared. Of course, similar operation can also be performed if the table values for outputting the values of the 4DLUT conversion section 50 to the LUT2-C conversion section 46, the LUT2-M conversion section 47, the LUT2-Y conversion section 48, and the LUT2-K conversion section 49 as they are, namely, the same values as the address values to the lookup tables are set as table values in the configuration shown in FIG. 12.

Figure 14:
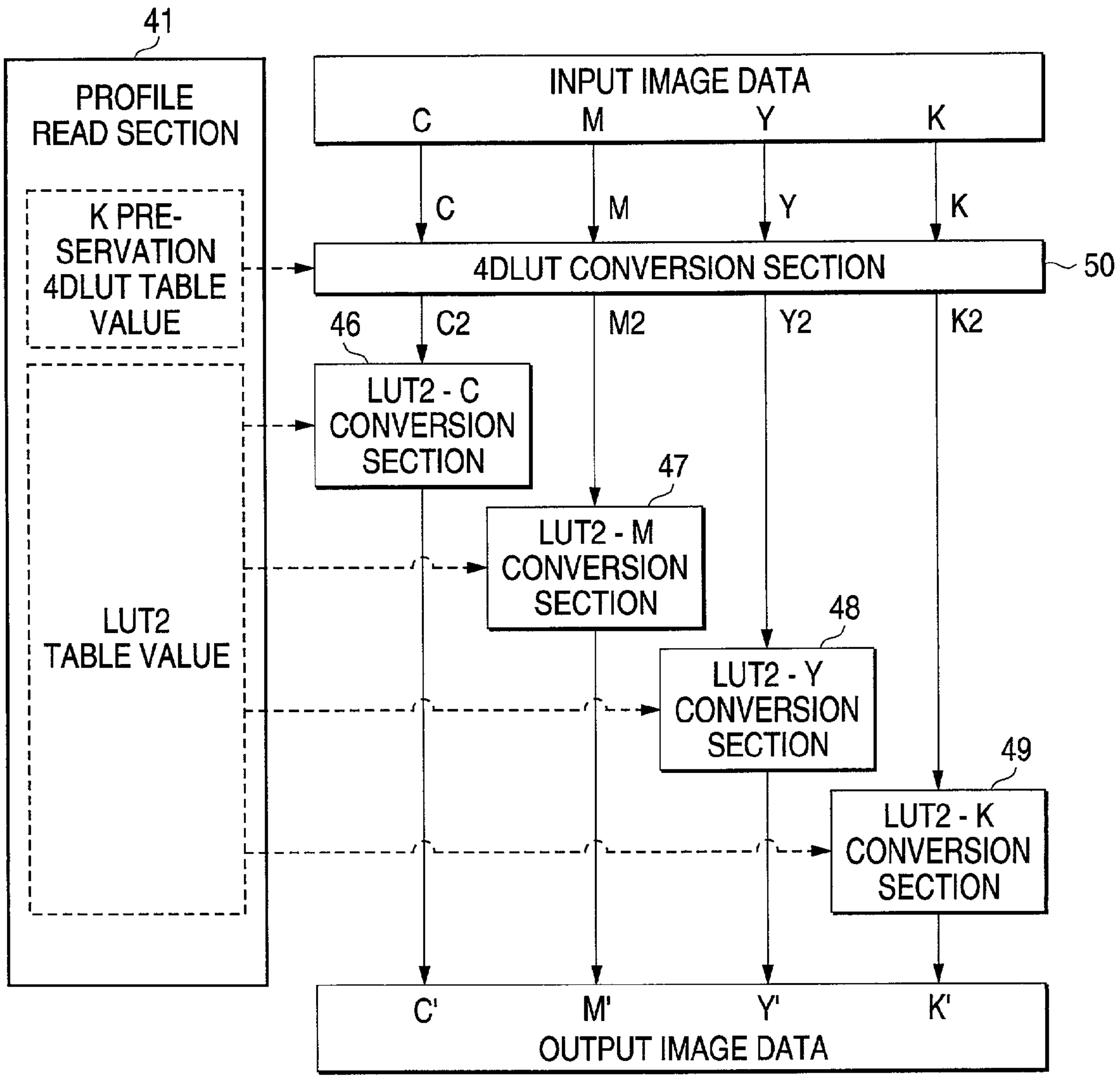
FIG. 14 is a block diagram to show another modified example in the first embodiment of the color conversion system of the invention.

FIG. 14 is a block diagram to show another modified example in the first embodiment of the color conversion system of the invention. Parts similar to those previously described with reference to FIG. 12 are denoted by the same reference numerals in FIG. 14. The modified example corresponds to the modified example of the first embodiment of the color conversion coefficient preparation apparatus and the color conversion coefficient preparation method of the invention previously described with reference to FIG. 7, and provides an example in which LUT1 is not prepared. Of course, similar operation can also be performed if the table values for outputting the image data input to the LUT1-C conversion section 42, the LUT1-M conversion section 43, the LUT1-Y conversion section 44, and the LUT1-K conversion section 45 as it is, namely, the same values as the address values to the lookup tables are set as table values in the configuration shown in FIG. 12. If the 4DLUT conversion section 50 executes conversion using the K preservation 4DLUT table values preserving the characteristic of K corresponding to the case where LUT2 is not prepared either, the effects of K preservation, partial colorometric match, paper white correction, etc., can also be provided.

Figure 15:
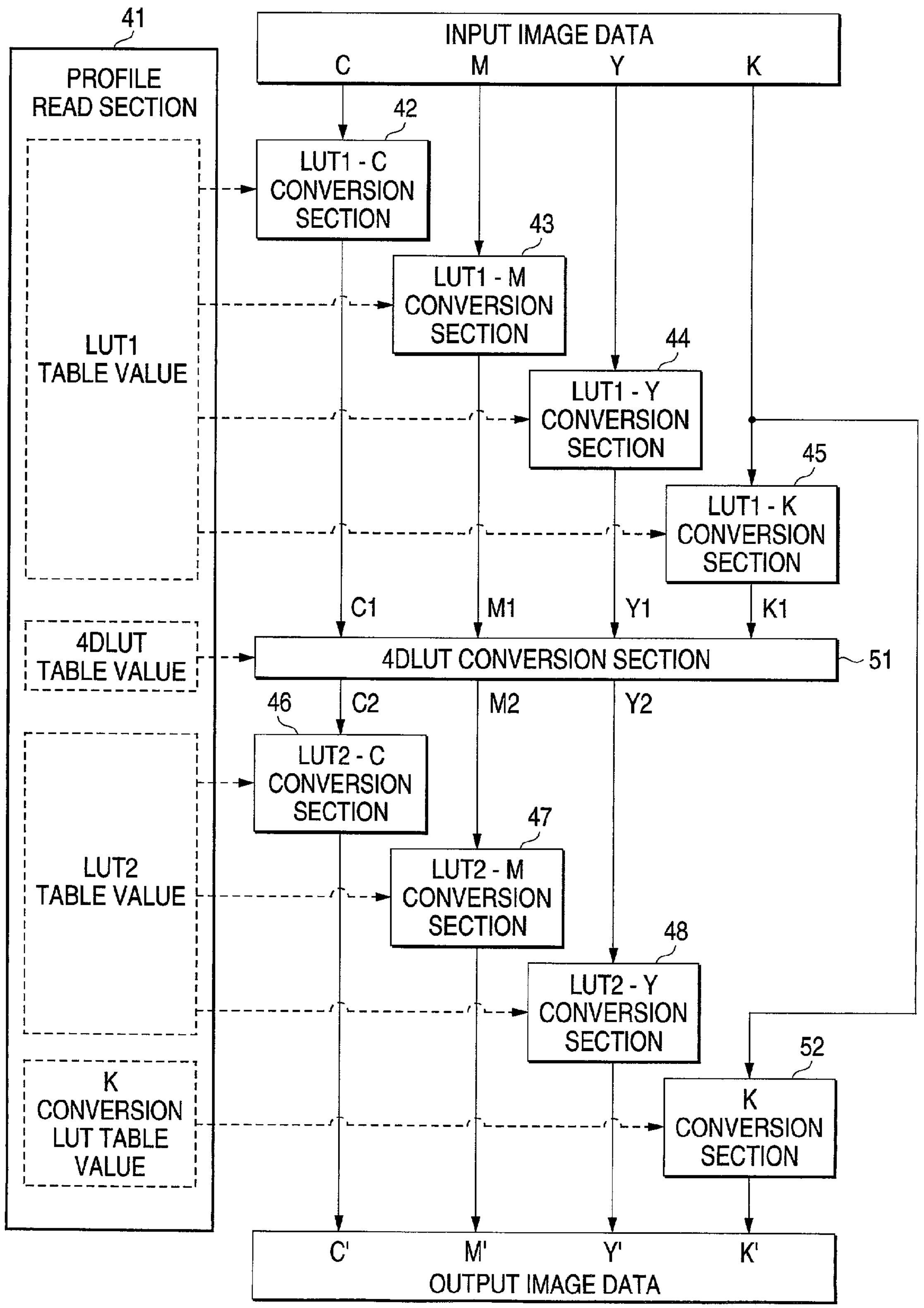
FIG. 15 is a block diagram to show a second embodiment of the color conversion system of the invention.

FIG. 15 is a block diagram to show a second embodiment of the color conversion system of the invention. Parts similar to those previously described with reference to FIG. 12 are denoted by the same reference numerals in FIG. 15 and will not be discussed again. In FIG. 15, numeral 51 denotes a 4DLUT conversion section and numeral 52 denotes a K conversion section. The second embodiment of the color conversion system provides a configuration example of the color conversion system corresponding to the case where 4-input, 3-output 4DLUT and K conversion LUT together with LUT1 and LUT2 are prepared, as shown as the third embodiment of the color conversion coefficient preparation apparatus and the color conversion coefficient preparation method of the invention previously described.

The profile read section 41 reads a profile previously prepared, interprets LUT1, LUT2, 4DLUT, and K conversion LUT in the profile, and sets a C table value in the LUT1 in a LUT1-C conversion section 42, an M table value in the LUT1 in an LUT1-M conversion section 43, a Y table value in the LUT1 in an LUT1-Y conversion section 44, a K table value in the LUT1 in an LUT1-K conversion section 45, a C table value in the LUT2 in an LUT2-C conversion section 46, an C table value in the LUT2 in an LUT2-M conversion section 47, a Y table value in the LUT2 in an LUT2-Y conversion section 48, a table value in the 4DLUT in the 4DLUT conversion section 51, and a table value in the K conversion LUT in the K conversion section 52.

The 4DLUT conversion section 51 uses the 4-input, 3-output 4DLUT read by the profile read section 41, performs color conversion processing with respect to input CMYK (C1M1Y1K1) after undergoing gradation conversion, and outputs the conversion result with respect to CMY except K (C2M2Y2).

The K conversion section 52 uses the K conversion LUT read by the profile read section 41 and executes conversion with respect to K of the input image data. Here, the K conversion section 52 converts K in the first machine-dependent color space directly into K' in the second machine-dependent color space.

An example of the operation in the second embodiment of the color conversion system described above will be discussed briefly. The profile read section 41 reads a profile and sets the table values in the sections. Then, the LUT1-C conversion section 42, the LUT1-M conversion section 43, the LUT1-Y conversion section 44, and the LUT1-K conversion section 45 execute gradation conversion of C, M, Y, and K of input image data, whereby the four color values CMYK in the first machine-dependent color space are converted into four color values C1M1Y1K1 in the first adjustment-machine-dependent color space. Next, the 4DLUT conversion section 51 executes color conversion processing. The 4DLUT conversion section 51 is four inputs and three outputs and converts the four color values C1M1Y1K1 in the first adjustment-machine-dependent color space into three color values C2M2Y2 except K in the second adjustment-machine-dependent color space. The LUT2-C conversion section 46, the LUT2-M conversion section 47, and the LUT2-Y conversion section 48 execute gradation conversion to prepare output image data with respect to the three color values except K. The conversion is conversion from the three color values C2M2Y2 except K in the second adjustment-machine-dependent color space to three color values C'M'Y' except K in the second machine-dependent color space.

On the other hand, as for K, the value of K of the input image data is input to the K conversion section 52 as it is, and is converted into the value of K of the output image data (K'). Thus, the four color values of the output image data are made up of C'M'Y' output from the LUT2-C conversion section 46, the LUT2-M conversion section 47, and the LUT2-Y conversion section 48 and K'output from the K conversion section 52.

The input four color values CMYK in the first machine-dependent color space are thus converted into the four color values C'M'Y'K' in the second machine-dependent color space. At this time, the table values in the lookup tables in the sections are determined as described above and thus not only complete colorometric match, but also partial colorometric match and relative colorometric match, for example, can be conducted and color reproducibility can be improved as compared with that in the related art. In such a configuration, the 4DLUT conversion section 51 has the advantage that the memory capacity can be reduced to three quarters as the number of output data pieces is fewer by one than that of four-dimensional LUT of four inputs and four outputs.

If the K conversion LUT set in the K conversion section 52 is provided for conversion from the first adjustment-machine-dependent color space to the second adjustment-machine-dependent color space, output of the LUT1-K conversion section 45 may be input to the K conversion section 52. If the K conversion LUT set in the K conversion section 52 is provided for conversion from the first adjustment-machine-dependent color space to the second adjustment-machine-dependent color space, the LUT2-K conversion section 49 may be inserted into the following stage of the K conversion section 52.

In the configuration shown in FIG. 15, the LUT1-K conversion section 45 is provided for inputting K1 to the 4DLUT conversion section 51. It is also possible to use K input when 4DLUT is prepared as it is, as previously described in the third embodiment of the color conversion coefficient preparation apparatus and the color conversion coefficient preparation method of the invention. For the 4DLUT conversion section 51 to use the 4DLUT thus prepared, the LUT1-K conversion section 45 may not be provided. Alternatively, such a table value for outputting the input value intact may be set in the LUT1-K conversion section 45.

In the embodiments of the color conversion coefficient preparation apparatus and the color conversion coefficient preparation method and the color conversion system of the invention described above, the description assumes that the lookup tables for gradation conversion of single colors are used at the preceding or following stage or the preceding and following stages of the K preservation 4DLUT or the 4DLUT. However, the invention is not limited to them. For example, in the color conversion coefficient preparation apparatus and the color conversion coefficient preparation method, function parameters for executing gradation conversion of single colors may be prepared as color conversion coefficients and in the color conversion system, conversion processing based on the functions using the function parameters may be performed. It is also possible to place the 4DLUT conversion section 51 and the K conversion section 52 with one-dimensional lookup tables not provided at the preceding stage of the 4DLUT conversion section 51 of four inputs and three outputs or not provided at the following stage or with one-dimensional lookup tables provided at neither the preceding stage nor the following stage.

Figure 16:
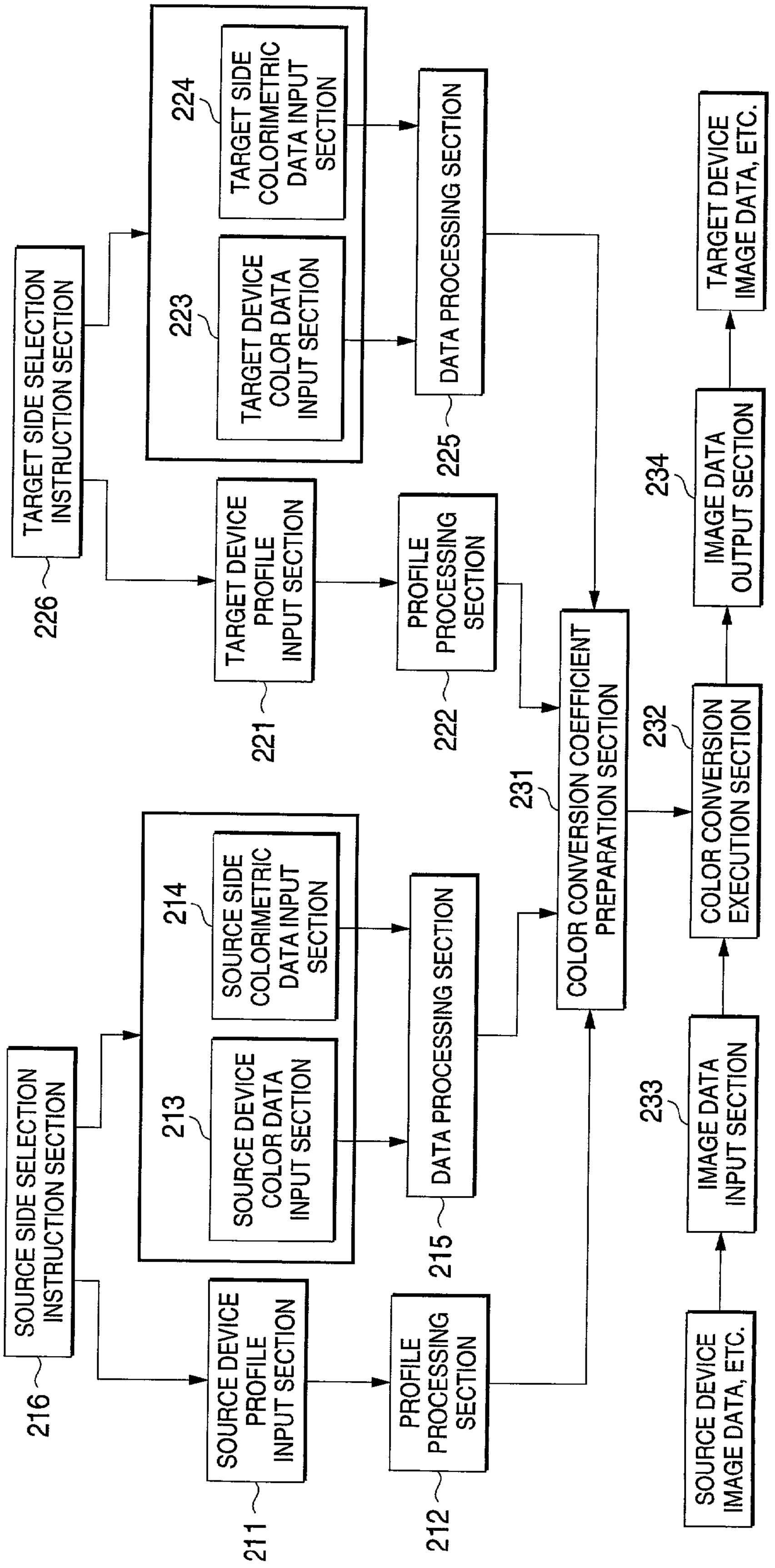
FIG. 16 is a block diagram of one embodiment of a color data processing apparatus and a color data processing method of the invention.

FIG. 16 is a block diagram of one embodiment of a color data processing apparatus and a color data processing method of the invention. In the figure, numeral 211 denotes a source device profile input section, numeral 212 denotes a profile processing section, numeral 213 denotes a source device color data input section, numeral 214 denotes a source side colorometric data input section, numeral 215 denotes a data processing section, numeral 216 denotes a source side selection instruction section, numeral 221 denotes a target device profile input section, numeral 222 denotes a profile processing section, numeral 223 denotes a target device color data input section, numeral 224 denotes a target side colorometric data input section, numeral 225 denotes a data processing section, numeral 226 denotes a target side selection instruction section, numeral 231 denotes a color conversion coefficient preparation section, numeral 232 denotes a color conversion execution section, numeral 233 denotes an image data input section, and numeral 234 denotes an image data output section.

For example, if an image is read and input, the source device is the input device. Considering image data prepared so that any desired color is reproduced on one output device, the output device may be the source device in some cases. The target device is the target output device to output image data.

The source device profile input section 211 reads the profile corresponding to the source device from among previously prepared profiles. The profile refers to conversion definition (profile) from machine-dependent color space to machine-independent color space, such as an ICC profile. The profile corresponding to the source device read by the source device profile input section 211 is subjected to predetermined processing by the profile processing section 212 and then passed to the color conversion coefficient preparation section 231. The resampling section shown in FIG. 11(B) can be named as one example of the profile processing section 212. The predetermined processing may be resampling of preparing first raw data.

The source device color data input section 213 inputs device color data in the source device. The source side colorometric data input section 214 inputs the colorometric data corresponding to the device color data. Accordingly, a plurality of data sets of the device color data and the colorometric data for preparing color characteristic information of the source device can be input. The plurality of input data sets are subjected to predetermined processing by the data processing section 215 and then passed to the color conversion coefficient preparation section 231. The device color data may be a color chart image made up of CMYK data as in the example shown in FIG. 11(A). The colorimetric data may be color values in L*a*b* color space provided by outputting the color chart image on the source device and measuring the color with a calorimeter. Further, the first raw data may be prepared by predetermined processing of the data processing section 215 and passed to the color conversion coefficient preparation section 231.

The source side selection instruction section 216 selects reading one of the profiles previously prepared in the source device profile input section 211 or reading the device color data and the colorometric data in the source device in the source device color data input section 213 and the source side colorometric data input section 214 according to an external instruction, such as a user's instruction, and sends a read instruction and information for reading to either the source device profile input section 211 or the source device color data input section 213 and the source side colorometric data input section 214.

The target device profile input section 221 reads the profile corresponding to the target device from among previously prepared profiles. The profile refers to conversion definition (profile) from machine-dependent color space to machine-independent color space, such as an ICC profile. The profile corresponding to the target device read by the target device profile input section 221 is subjected to predetermined processing by the profile processing section 222 and then passed to the color conversion coefficient preparation section 231. The resampling section shown in FIG. 11(B) can be named as one example of the profile processing section 222. The predetermined processing may be resampling of preparing second raw data.

The target device color data input section 223 inputs device color data in the target device. The target side colorometric data input section 224 inputs the colorometric data corresponding to the device color data. Accordingly, a plurality of data sets of the device color data and the colorometric data for preparing color characteristic information of the target device can be input. The plurality of input data sets are subjected to predetermined processing by the data processing section 225 and then passed to the color conversion coefficient preparation section 231. The device color data may be a color chart image made up of CMYK data as in the example shown in FIG. 11(A). The colorometric data maybe color values in L*a*b* color space provided by outputting the color chart image on the target device and measuring the color with a calorimeter. Further, the second raw data may be prepared by predetermined processing of the data processing section 225 and passed to the color conversion coefficient preparation section 231.

The target side selection instruction section 226 selects reading one of the profiles previously prepared in the target device profile input section 221 or reading the device color data and the colorometric data in the target device in the target device color data input section 223 and the target side colorometric data input section 224 according to an external instruction, such as a user's instruction, and sends a read instruction and information for reading to either the target device profile input section 221 or the target device color data input section 223 and the target side colorometric data input section 224.

The color conversion coefficient preparation section 231 receives the source device profile input in the source device profile input section 211 or a plurality of data sets of the device color data and the colorimetric data in the source device input in the source device color data input section 213 and the source side colorometric data input section 214 as the source device data through the profile processing section 212 or the data processing section 215. At this time, the color conversion coefficient preparation section 231 may receive the first raw data through the profile processing section 212 or the data processing section 215, as described above. The color conversion coefficient preparation section 231 receives the target device profile input in the target device profile input section 221 or a plurality of data sets of the device color data and the colorometric data in the target device input in the target device color data input section 223 and the target side colorimetric data input section 224 as the target device data through the profile processing section 222 or the data processing section 225. At this time, the color conversion coefficient preparation section 231 may receive the second raw data through the profile processing section 222 or the data processing section 225, as described above. The color conversion coefficient preparation section 231 prepares color conversion coefficients so as to reproduce the same color as that of the source device on the target device from the source device profile or the data sets of the device color data and the colorometric data in the source device. Each embodiment of the color conversion coefficient preparation apparatus and the color conversion coefficient preparation method of the invention described above may be applied as the color conversion coefficient preparation section 231.

The color conversion execution section 232 uses the profile prepared in the color conversion coefficient preparation section 231 and performs color conversion processing for the image data input through the image data input section 233. The image data input through the image data input section 233 is image data having the device color in the source device or the like. The image data after being subjected to the color conversion processing by the color conversion execution section 232 or the like has the device color in the target device, but is reproduced in almost the same color as that on the source device. The image data after being subjected to the color conversion processing by the color conversion execution section 232 or the like is output through the image data output section 234. Each embodiment of the color conversion system of the invention described above may be used as the color conversion execution section 232.

Next, an example of the operation in the embodiment of the color data processing apparatus and the color data processing method of the invention will be discussed. In the description to follow, it is assumed that the user selects a previously stored profile or a plurality of data sets of device color data and colorometric data in the source side selection instruction section 216 and the target side selection instruction section 226. Of course, the selection operation may be performed using any other software or data.

Figure 17:
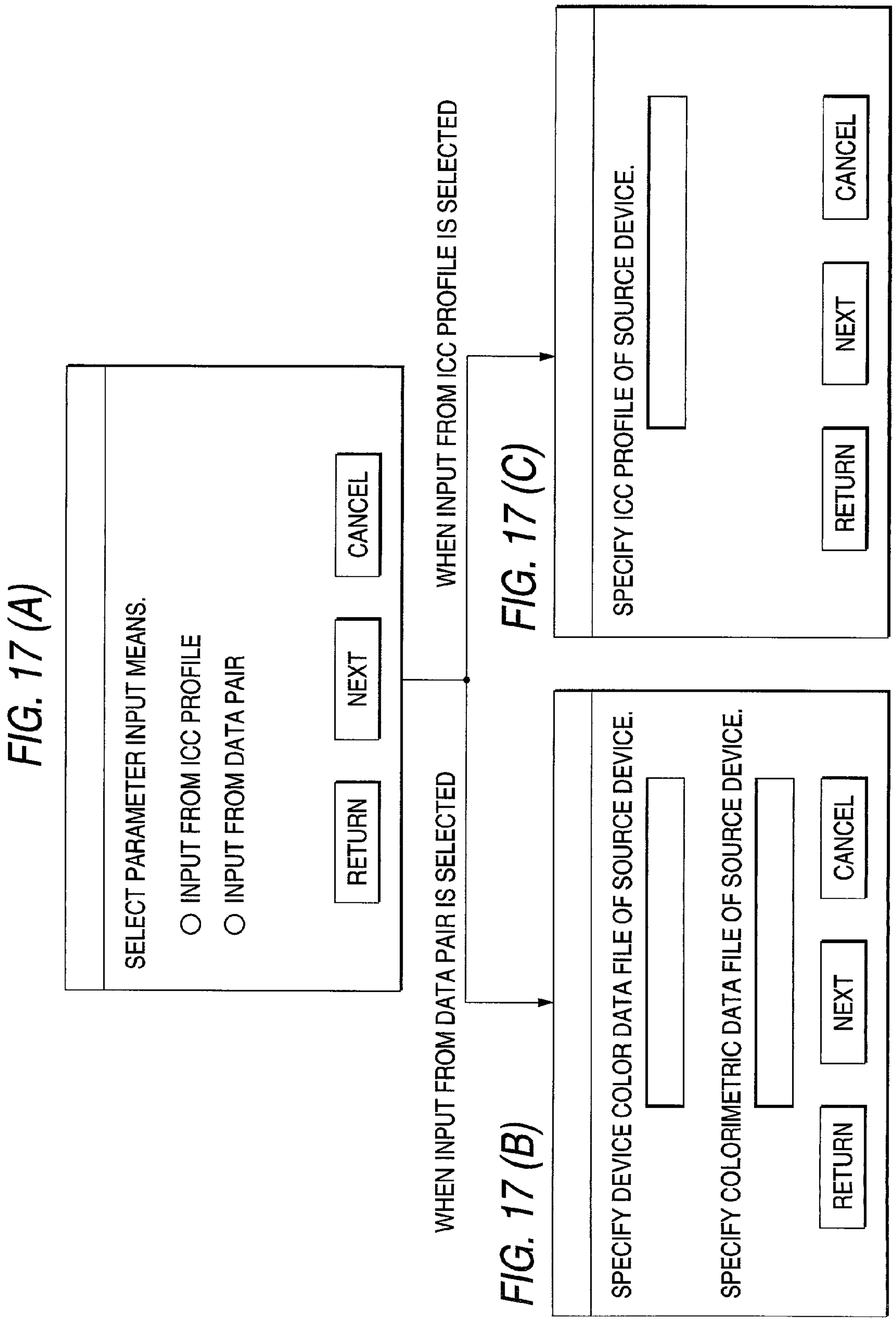
FIG. 17 is a schematic representation of an example of a user interface in a source side selection instruction section.

First, the user selects a source device input condition and a target device input condition. To specify the source device input condition for selection, the user selects reading from a file previously storing the color characteristic information of the source device or reading the source device color data required for preparing the color characteristic information of the source device and the colorometric data corresponding to the source device color data in the source side selection instruction section 216. FIG. 17 is a schematic representation of an example of a user interface in the source side selection instruction section 216. The source side selection instruction section 216 can be configured so that the user selects options in sequence through input dialogs, for example, as shown in FIG. 17. FIG. 17(A) shows a dialog for the user first to select parameter input section. Through this dialog, the user selects using a previously stored profile (input from ICC profile) or reading a pair of the device color data in the source device and the colorometric data corresponding to the device color data (input from data pair). If the user selects either of the options and clicks on NEXT, a data input dialog responsive to the user's selection is displayed.

For example, to use a previously stored profile, the user selects INPUT FROM ICC PROFILE and clicks on NEXT in the dialog shown in FIG. 17(A). Then, a dialog shown in FIG. 17(C) is displayed. In this dialog, the user may enter the location where the prestored profile of the source device, such as an ICC profile, is stored (containing the file name, etc.,). Of course, the method of specifying the file in which the profile is stored or the like is arbitrary. As the user clicks on NEXT in FIG. 17(C), the input instruction for the source device is terminated and a transition is made to an input instruction for the target device. To again select input section from the beginning, the user may click on RETURN. To quit color conversion processing, the user may click on CANCEL.

On the other hand, to read a pair of the device color data in the source device and the colorometric data corresponding to the device color data, the user selects INPUT FROM DATA PAIR and clicks on NEXT in the dialog shown in FIG. 17(A). Then, a dialog shown in FIG. 17(B) is displayed. In this dialog, the user enters the locations where the color data file storing the data indicating the device color of the source device and the data file storing the colorometric data paired with the device color data are stored (containing the file names, etc.,). Of course, the method of specifying the file in which the device color data and the colorometric data are stored or the like is arbitrary. As the user clicks on NEXT, the input instruction for the source device is terminated and a transition is made to an input instruction for the target device. To again select input section from the beginning, the user may click on RETURN. To quit color conversion processing, the user may click on CANCEL.

Likewise, the target device input condition can also be specified for selection by a similar method. That is, through a dialog similar to that in FIG. 17(A), the user selects using a previously stored profile or reading a pair of the device color data in the target device and the colorometric data corresponding to the device color data. To use a previously stored profile, the user may further enter the location where the prestored profile of the target device is stored (containing the file name, etc.,) through a dialog similar to that in FIG. 17(C) or the like. On the other hand, to read a pair of the device color data in the target device and the colorometric data corresponding to the device color data, the user may enter the locations where the color data file storing the data indicating the device color of the target device and the data file storing the colorimetric data paired with the device color data are stored (containing the file names, etc.,) through a dialog similar to that in FIG. 17(B) or the like.

The dialogs shown in FIG. 17 are example dialogs and can be formed as desired. For example, the dialogs in FIG. 17(A) to FIG. 17(C) may be combined into one and the area in which the file names, etc., can be entered may be changed by changing to input section. The dialogs for the source device and the target device may be collected into one. Alternatively, the dialog shown in FIG. 17(B) may be separated into a dialog for specifying the color data file and a dialog for specifying the corresponding colorometric data file. Of course, the dialogs may be laid out as desired.

Upon completion of specifying the input methods on the source and target sides and specifying the data files responsive to the specified input methods, the input section responsive to the specified input method is instructed to input data. For example, if an instruction for inputting a prestored profile is given on the source device side, information indicating the location containing the file name where the profile is stored is passed to the source device profile input section 211 and an instruction for reading the profile is given thereto. On the other hand, if an instruction for inputting a pair of the device color data in the target device and the corresponding colorometric data is given on the source device side, information indicating the location containing the file name of the input device color data file is passed to the source device color data input section 213 and the device color data of the source device is read. Information indicating the location containing the file name of the corresponding colorometric data file is passed to the source side colorometric data input section 214 and the corresponding colorometric data is read. Likewise, for example, if an instruction for inputting a prestored profile is given on the target device side, information indicating the location containing the file name where the profile is stored is passed to the target device profile input section 221 and an instruction for reading the profile is given thereto. On the other hand, if an instruction for inputting a pair of the device color data in the target device and the corresponding colorometric data is given on the target device side, information indicating the location containing the file name of the input device color data file is passed to the target device color data input section 223 and the device color data of the target device is read. Information indicating the location containing the file name of the corresponding colorometric data file is passed to the target side colorometric data input section 224 and the corresponding colorometric data is read.

Thus, on the source device side, the profile is read from the source device profile input section 211 or the device color data and the corresponding colorometric data are read from the source device color data input section 213 and the source side colorometric data input section 214. The read profile or device color data and colorometric data are subjected to predetermined processing in the profile processing section 213 or the data processing section 215 and then passed to the color conversion coefficient preparation section 231. Likewise, on the target device side, the profile is read from the target device profile input section 221 or the device color data and the corresponding colorometric data are read from the target device color data input section 223 and the target side colorimetric data input section 224. The read profile or device color data and colorometric data are subjected to predetermined processing in the profile processing section 223 or the data processing section 225 and then passed to the color conversion coefficient preparation section 231.

The color conversion coefficient preparation section 231 receives the source device profile or the pair of the device color data and the colorometric data of the source device and the target device profile or the pair of the device color data and the colorimetric data of the target device and prepares a profile so that the color almost matching the color on the source device is reproduced on the target device. The profile prepared by the color conversion coefficient preparation section 231 varies depending on the color conversion technique used in the color conversion execution section 232 or the image data for which color conversion is to be performed. For example, assuming processing of color proofreading of a four-color (CMYK) printer for a print color sample printed in four colors of CMYK as described above, color conversion from CMYK to C'M'Y'K' may be executed as color conversion of four-dimensional table type and parameters for executing the color conversion may be prepared from the color characteristic data of the source and target devices. If the source device is three-color print of CMY or six-color print using special colors, etc., for example, or likewise if the target device is three-color print of CMY or six-color print using special colors, etc., a color conversion table matched with the condition may be used. This also applies if the source device is RGB data of a scanner, a digital camera, etc. It also applies if the target device is a color printer or any other device of print, monitor, etc. Further, in addition to the color conversion of table type, any other color conversion technique, such as color conversion of matrix conversion type, may be used or some of color conversion techniques may be used in combination and color conversion coefficients (profile) responsive to the techniques may be prepared.

The profile prepared in the color conversion coefficient preparation section 231 is passed to the color conversion execution section 232 and preparation for color conversion is made in the color conversion execution section 232. Then, the image data having the device color in the source device or the like is input from the image data input section 233 and is subjected to color conversion processing in the color conversion execution section 232 so that it is reproduced in almost the same color as that on the source device. The image data, etc., after being subjected to the color conversion processing is sent from the image data output section 234 to the target device, for example, and is output. For example, if the source device is a printing machine and image data of printed matter in four colors of CMYK is input and is output to a four-color (CMYK) printer of the target device, a profile is prepared and color conversion processing using the prepared profile is performed as described above, whereby an image can be printed on the color printer as color reproduction similar to that of printing on the printing machine. Thus, it is possible to accomplish color proofreading, etc., using a color printer.

Figure 18:
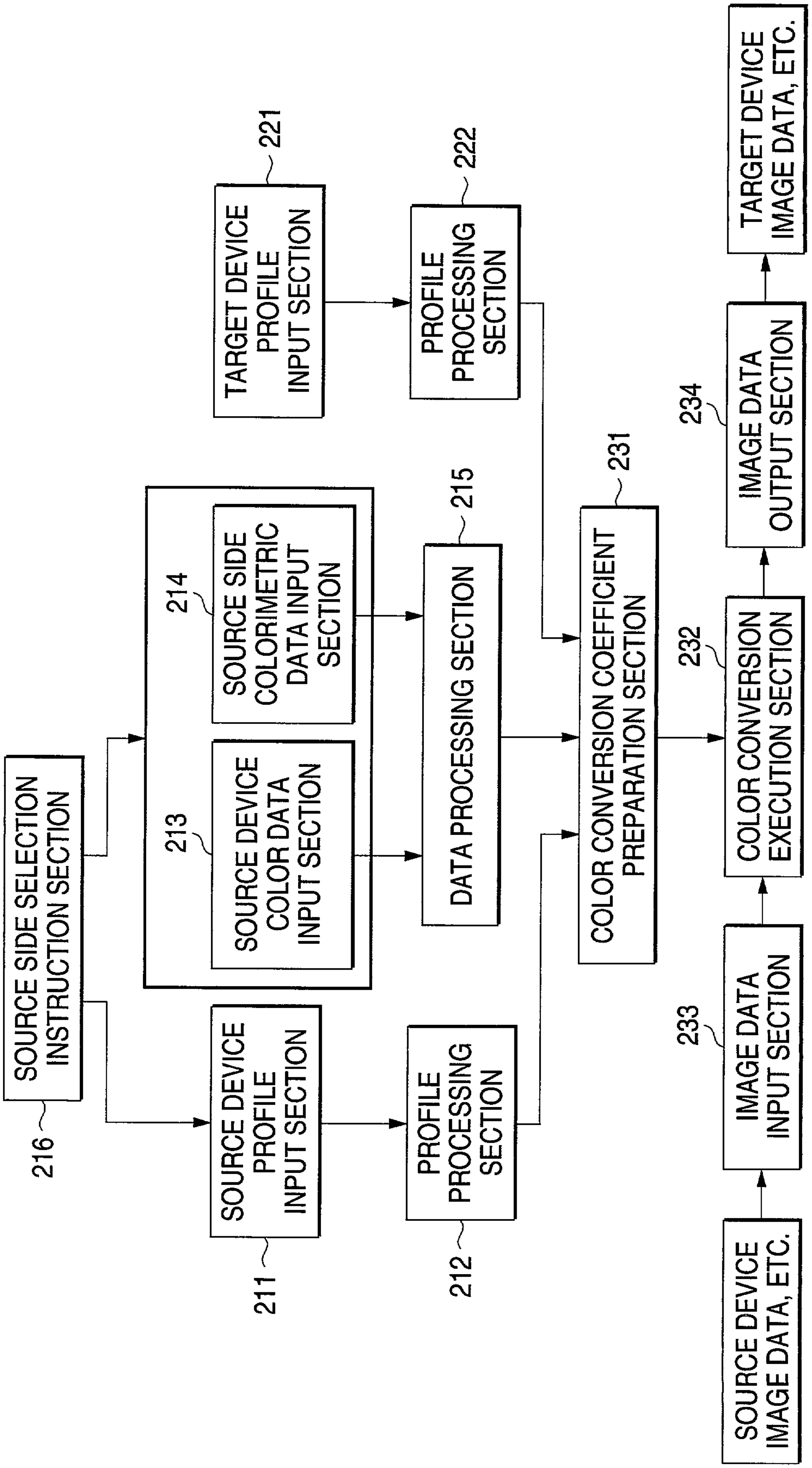
FIG. 18 is a block diagram to show a modified example in the embodiment of the color data processing apparatus and the color data processing method of the invention.

FIG. 18 is a block diagram to show a modified example in the embodiment of the color data processing apparatus and the color data processing method of the invention. Parts similar to those previously described with reference to FIG. 16 are denoted by the same reference numerals in FIG. 18. In the modified example, a prestored profile or a pair of device color data and colorometric data can be selected on the source device side, but only a prestored profile is used on the target device side.

Such a configuration is effective if the target device is limited to a specific device and changing with time or the like does not much occur. Such a configuration may be adopted, for example, if the profile of the target device is prepared in any other unit than the target device and can be acquired.

Figure 19:
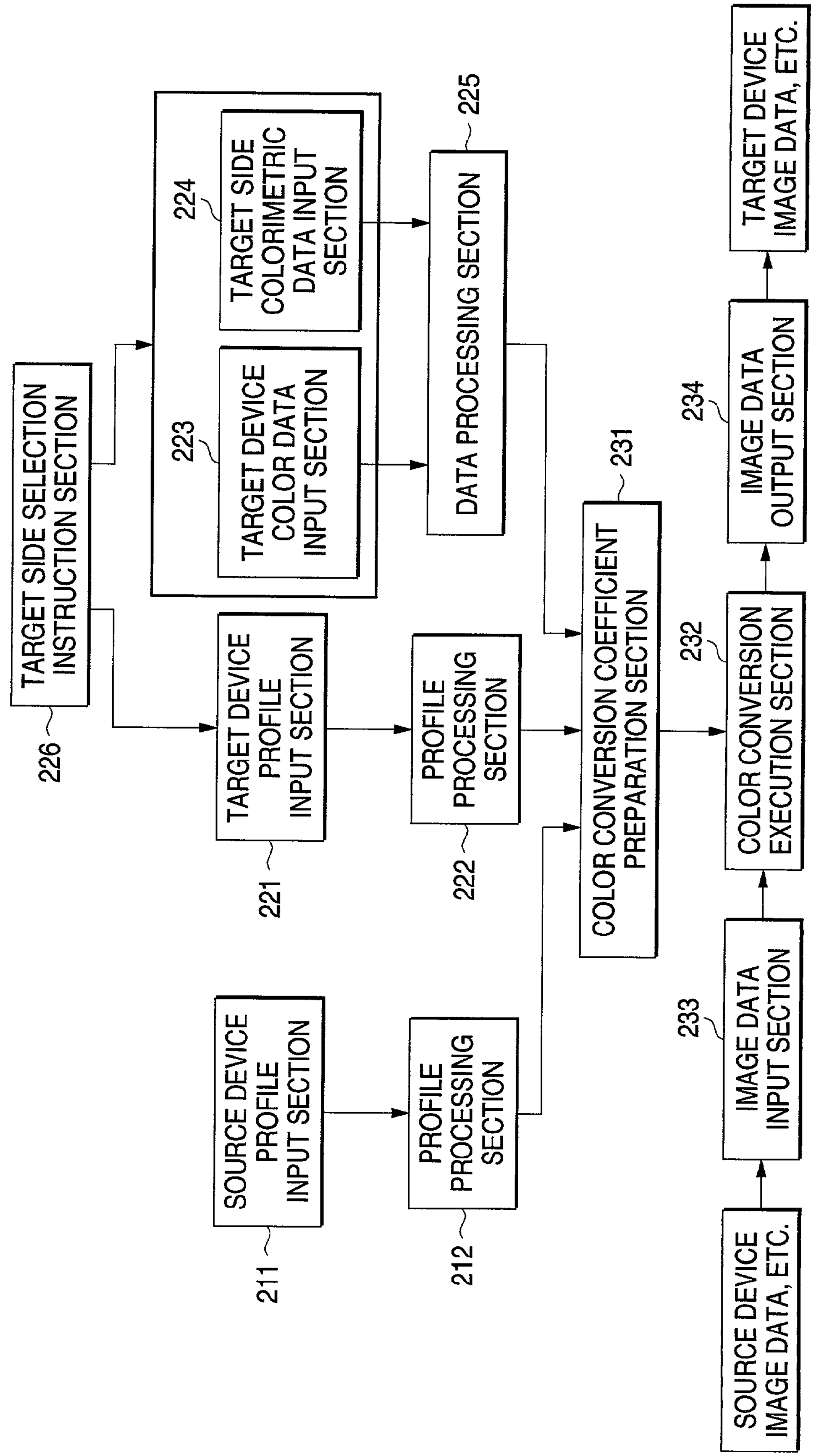
FIG. 19 is a block diagram to show another modified example in the embodiment of the color data processing apparatus and the color data processing method of the invention.

FIG. 19 is a block diagram to show another modified example in the embodiment of the color data processing apparatus and the color data processing method of the invention. Parts similar to those previously described with reference to FIG. 16 are denoted by the same reference numerals in FIG. 19. In the modified example, a prestored profile or a pair of device color data and colorometric data can be selected on the target device side, but only a prestored profile is used on the source device side.

Such a configuration is effective if the source device is limited to a specific device and changing with time or the like does not much occur. Such a configuration may be adopted, for example, if the profile of the source device is prepared in any other unit than the source device and can be acquired. For example, to conduct color proofreading on a printer of the company in a print ordering company or a printed matter creation company having no printing machine, it is possible to download the profile of a printing machine from a printing company for use as the source device profile and enable input section to be changed to the printer of the company as the target device.

Figure 20:
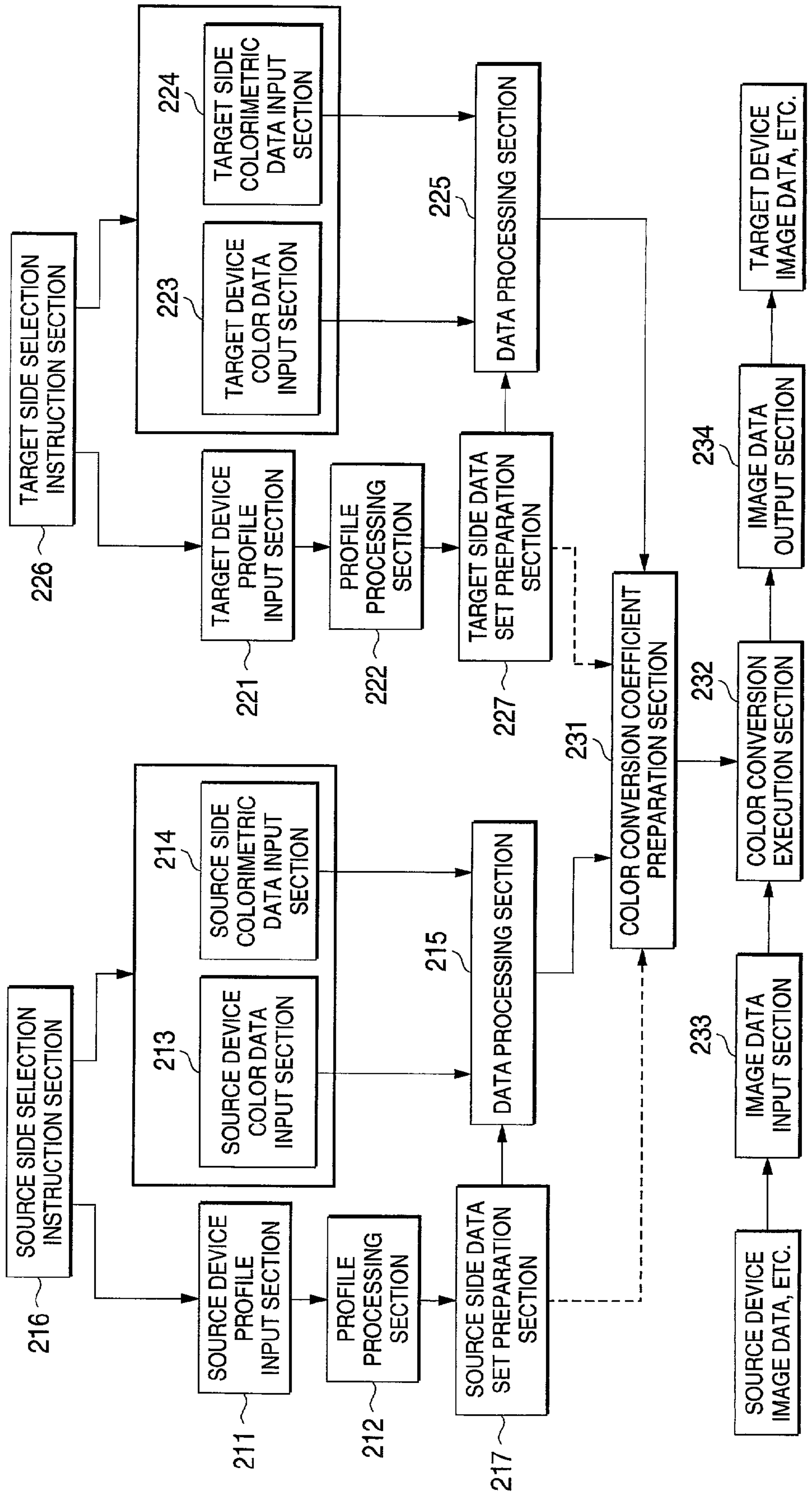
FIG. 20 is a block diagram to show still another modified example in the embodiment of the color data processing apparatus and the color data processing method of the invention.

FIG. 20 is a block diagram to show still another modified example in the embodiment of the color data processing apparatus and the color data processing method of the invention. Parts similar to those previously described with reference to FIG. 16 are denoted by the same reference numerals in FIG. 20 and will not be discussed again. In FIG. 20, numeral 217 denotes a source side data set preparation section and numeral 227 denotes a target side data set preparation section. For example, when reading one of the profiles previously prepared in a target device profile input section 221 is selected through a target side selection instruction section 226, if the profile is an ICC profile, the color conversion method between the device color and L*a*b* color space or XYZ color space is already described based on the color characteristic of the device. Thus, color conversion can be executed according to the described method.

However, the operator may want to perform various processing without using the color conversion method described in the ICC profile intact. For example, to prepare color conversion data in a four-color printer using color materials of C (cyan), M (magenta), Y (yellow), and K (black), the value of K data to be prepared cannot be changed as desired when the color conversion data is prepared. For example, the operator may want to limit the sum total of the color material amounts of C, M, Y, and K to 300% or less, namely, it may be necessary to limit the total data amount of color materials, but such limitation cannot be placed. The points are important for enhancing the color reproducibility on a printer and it is desirable that the various processing should be performed before the color conversion data is prepared. Of course, this also applies to a source side data set.

The example shown in FIG. 20 shows a configuration wherein various processing can be performed before the color conversion data is prepared if the ICC profile is selected. For the purpose, in the example shown in FIG. 20, the source side is provided with the source side data set preparation section 217 and the target side is provided with the target side data set preparation section 227.

The source side data set preparation section 217 receives the profile read in the source device profile input section 211 and subjected to predetermined processing in the profile processing section 212. The source side data set preparation section 217 uses the color conversion method between the device color and the L*a*b* color space or XYZ color space, stored in the profile and prepares a plurality of data sets of pairs of the device color data required for preparing the color characteristic information of the source device and the color data in the L*a*b* color space or XYZ color space corresponding to the device color data. To prepare the data set, for example, values in the corresponding L*a*b* color space or XYZ color space may be prepared according to the color conversion method described in the profile from predetermined combination data of C, M, Y, and K.

The plurality of data sets prepared in the source side data set preparation section 217 are input to the data processing section 215 and are subjected to predetermined processing. At this time, processing of changing, etc., the color conversion condition as desired at the color conversion coefficient preparation time can be performed. For example, the value of K data prepared at the color conversion coefficient preparation time can be changed as desired on the source side and the image quality can be improved by adjusting the black material amount. Various limitations such that the sum of the color components is suppressed to a predetermined value or less can also be placed.

Likewise, the target side data set preparation section 227 receives the profile read in the target device profile input section 221 and subjected to predetermined processing in the profile processing section 222. The target side data set preparation section 227 uses the color conversion method between the device color and the L*a*b* color space or XYZ color space, stored in the profile and prepares a plurality of data sets of pairs of the device color data required for preparing the color characteristic information of the target device and the color data in the L*a*b* color space or XYZ color space corresponding to the device color data. The data set preparation method is similar to that of the source side data set preparation section 217.

The plurality of data sets prepared in the target side data set preparation section 227 are input to the data processing section 225 and are subjected to predetermined processing. At this time, processing of changing, etc., the color conversion condition as desired at the color conversion coefficient preparation time. For example, the value of K data prepared at the color conversion coefficient preparation time can be changed as desired on the target side and the image quality can be improved by adjusting the black material amount. Various limitations such that the sum of the color material amounts is suppressed to a predetermined value or less for preventing a defective condition at the image formation time can also be placed.

In the example shown in FIG. 20, the source side is provided with the source side data set preparation section 217 and the target side is provided with the target side data set preparation section 227, but either of them may be removed. Whether or not the source side data set preparation section 217 prepares data sets may be able to be specified on the source side or whether or not the target side data set preparation section 227 prepares data sets may be able to be specified on the target side.

Figure 21:
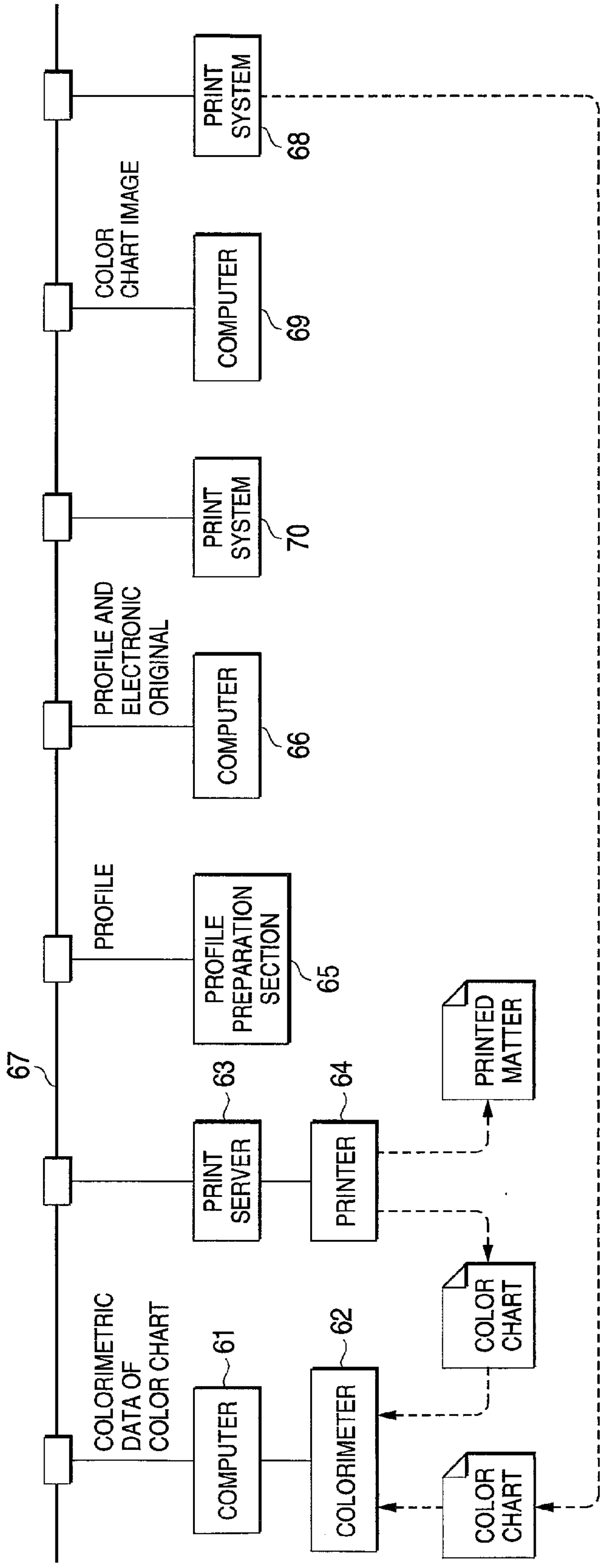
FIG. 21 is a system block diagram to show an application example of the color conversion coefficient preparation apparatus and the color conversion system of the invention.

FIG. 21 is a system block diagram to show an application example of the color conversion coefficient preparation apparatus and the color conversion system of the invention. In the figure, numerals 61, 66, and 69 denote computers, numeral 62 denotes a calorimeter, numeral 63 denotes a print server, numeral 64 denotes a printer, numeral 65 denotes a profile preparation section, numeral 67 denotes a network, and numerals 68 and 70 denote print systems. In the example shown in FIG. 21, various systems, units, devices, etc., are connected via the network 67 such as a LAN. in the example, the computers 61, 66, and 69, the print server 63, the profile preparation section 65, the print systems 68 and 70, etc., are connected. Of course, the machines connected to the network 67 are not limited to them in the example. The network 67 is not limited to LAN either and the machines may be connected by a dialup line, a dedicated line, etc., or a dialup line, a dedicated line, etc., may be used as a part of the network 67.

In the example, the computer 69 has a color chart image and a color chart can be printed out on the printer 64 through the print system 68, 70 or the print server 63. The colorimeter 62 is connected to the computer 61 and L*a*b* colors of a printed color chart can be measured. Assume that an electronic original to be actually printed is stored in the computer 66 and that the electronic document is prepared assuming printout in the print system 68. The profile preparation section 65 is an apparatus for realizing the color conversion coefficient preparation apparatus of the invention or the color conversion coefficient preparation method of the invention. Assume that the print server 63 installs the color conversion system of the invention.

An example of the operation for actually printing out an electronic original on the printer 64 will be discussed. First, from the computer 69 storing a color chart image, the predetermined color chart image is printed in the print system 68. L*a*b* colors of the printed color chart are measured with the calorimeter 62, colorometric data is obtained in the computer 61 for controlling the calorimeter 62, and the colorimetric values are sent to the profile preparation section 65. At this time, the color chart image is predetermined and thus the profile preparation section 65 itself stores CMYK data. If any desired color chart rather than the predetermined color chart is used, the L*a*b* colorometric values and the CMYK values may be sent to the profile preparation section 65. Then, first raw data is prepared.

Likewise, the predetermined color chart image from the computer 69 is printed out on the printer 64 via the print server 63. L*a*b* colors of the printed-out color chart are measured with the calorimeter 62, colorometric data is obtained in the computer 61 for controlling the calorimeter 62, and the colorimetric values are sent to the profile preparation section 65. Then, second raw data is prepared.

In the example, the color chart image is printed out and the colors of the color chart are measured, whereby the raw data is provided. However, the invention is not limited to the example. For example, if conversion definition (profile) such as an ICC profile can be used as previously described with reference to FIG. 1(B), the first raw data and the second raw data may be prepared by resampling from the profile.

The profile preparation section 65 prepares a profile as previously described in each embodiment of the color conversion coefficient preparation apparatus or the color conversion coefficient preparation method of the invention. The prepared profile is sent to the printer server 63.

From the computer 66, print based on the profile prepared as described above is specified and the electronic original is sent to the print server 63. The print server 63 performs color conversion processing using the profile as previously described in each embodiment of the color conversion system of the invention. The electronic original undergoing the color conversion processing is sent to the printer 64 for printing out.

When the profile preparation section 65 prepares a profile in such a print process, the profile is prepared with the raw data based on the print system 68 as the first raw data and the raw data of the printer 64 as the second raw data, so that the printer 64 can output an image simulating the print system 68. Accordingly, so-called remote color proof can be conducted. Accordingly, for example, it is made possible to conduct color proofreading based on printout of the printer 64 before printing in the print system 68.

In contrast, when the profile preparation section 65 prepares a profile, if the profile is prepared with the raw data based on the print system 68 as the second raw data and the raw data of the printer 64 as the first raw data, the print system 68 outputs an image simulating the printer 64. Such a use mode is useful, for example, if the designer of advertising, etc., creates color advertisement while seeing his or her printout and wants to produce printout matched with color reproduction of the printer. Of course, not only color conversion between the print system 68 and the printer 64, but also mutual color conversion also containing the print system 70 is possible.

As a modified example of the application system described above, it is also possible to contain a profile in an electronic original as the electronic original with the profile and manage the electronic original and the profile collectively. At this time, the print server 63 may comprise a mechanism for interpreting the electronic original and recognizing that the profile is contained therein and may perform image processing following the profile. For example, if the computer 66 retains electronic original A with profile for the print system 68 and electronic original B with profile for the print system 70, any desired output can be provided simply by sending the electronic original to be output to the print server 63.

Further, the invention can be applied not only to the above-described application example, but also to various application examples, for example, having a configuration wherein the function of the profile preparation section 65 can be executed on the web of the Internet, etc., in addition to the network such as LAN, for example.

In the embodiments of the color conversion coefficient preparation apparatus, the color conversion coefficient preparation method, and the color conversion system of the invention described above and in the above-described application examples, as four color values including black, CMYK has been used as an example, but the invention is not limited thereto. For example, the invention can be applied to any desired four color values including black, such as R (red), G (green), B (blue), and K (black). The invention can be applied not only to four colors, but also to any desired n colors containing K, such as six colors of dark C and M, light C and M, and Y and K, seven colors using dark Y and light Y as Y colors, or use of special color.

Figure 22:
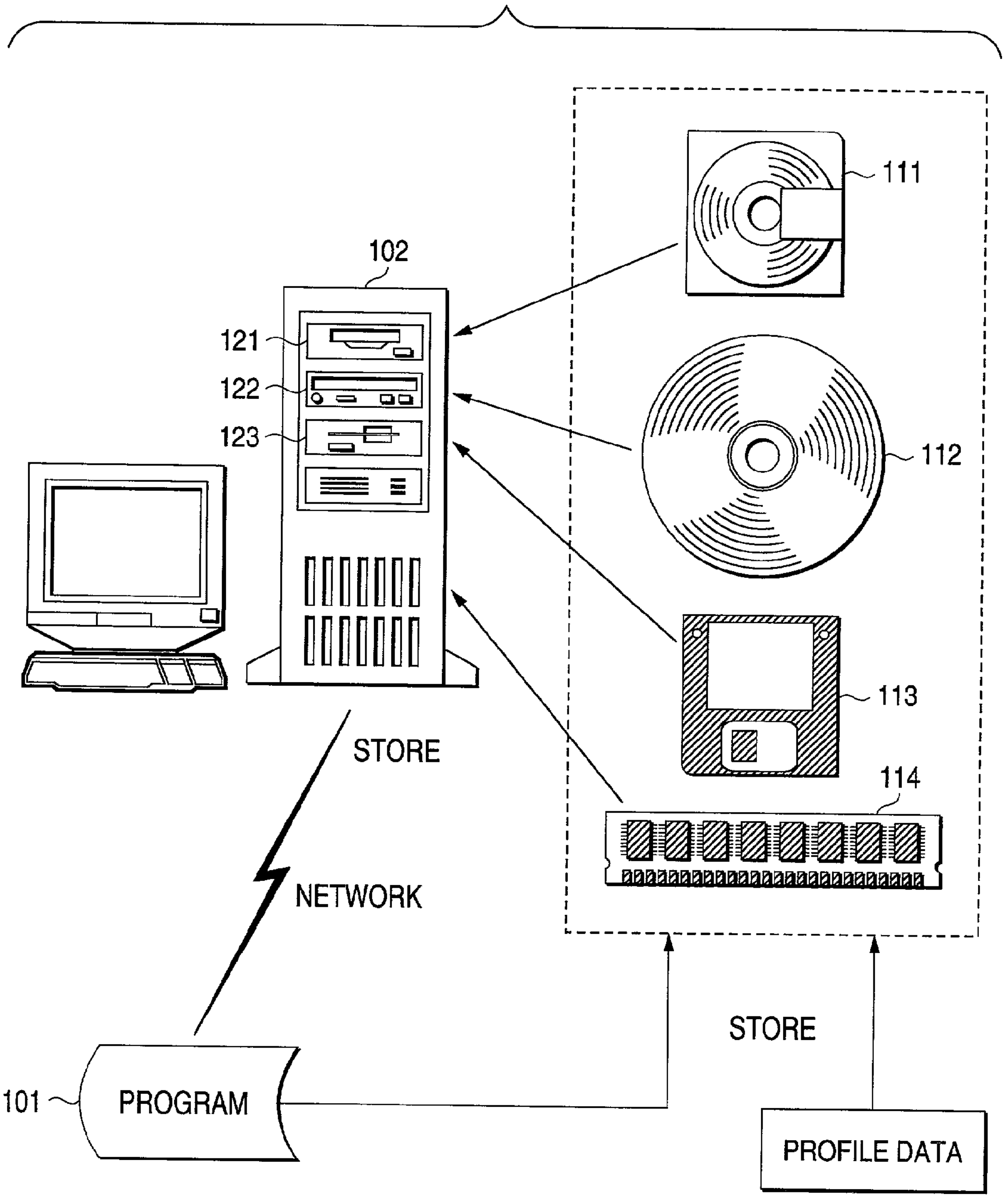
FIG. 22 is a schematic representation of an example of a storage medium storing a computer program or color conversion coefficients when the function of the color conversion coefficient preparation apparatus, the color conversion coefficient preparation method, or the function of the color conversion system of the invention is provided by the computer program.

FIG. 22 is a schematic representation of an example of a storage medium storing a computer program or color conversion coefficients when the function of the color conversion coefficient preparation apparatus, the color conversion coefficient preparation method, or the function of the color conversion system of the invention is provided by the computer program. In the figure, numeral 101 denotes a program, numeral 102 denotes a computer, numeral 111 denotes a magneto-optical disk, numeral 112 denotes an optical disk, numeral 113 denotes a magnetic disk, numeral 114 denotes memory, numeral 121 denotes a magneto-optical disk unit, numeral 122 denotes an optical disk unit, and numeral 123 denotes a magnetic disk unit.

The function in the configuration shown in each embodiment of the color conversion coefficient preparation apparatus and the color conversion coefficient preparation method, the function in the configuration shown in each embodiment of the color conversion system of the invention, or the function in the configuration shown in each embodiment of the color data processing apparatus and the color data processing method of the invention can also be provided by the program 101 that can be executed by a computer. In this case, the program 101, data used by the program, and the like can also be stored on a computer-readable storage medium. The color conversion coefficients (profile) prepared according to the configuration shown in each embodiment of the color conversion coefficient preparation apparatus and the color conversion coefficient preparation method of the invention can also be stored on a computer-readable storage medium. The storage medium can cause a change state in energy of magnetism, light, electricity, etc., to occur in response to the program description contents for a reader provided in the hardware resources of a computer and can transfer the program description contents to the reader in the signal format corresponding to the change state. For example, the storage medium includes the magneto-optical disk 111, the optical disk 112, the magnetic disk 113, the memory 114, etc. Of course, the storage media are not limited to those of portable type.

The program 101 is stored on at least one of the storage media and at least one of the storage media is placed in the magneto-optical disk unit 121, the optical disk unit 122, the magnetic disk unit 123, or a memory slot (not shown) of the computer 102, for example, whereby the program 101 is read from the computer 102 and the function described in each embodiment of the color conversion coefficient preparation apparatus and the color conversion coefficient preparation method of the invention or the function described in each embodiment of the color conversion system of the invention can be executed. Alternatively, a profile is stored on the storage medium and the storage medium is placed in the magneto-optical disk unit 121, the optical disk unit 122, the magnetic disk unit 123, or the memory slot (not shown) of the computer 102, for example, whereby the profile is read from the computer 102 and the function described in each embodiment of the color conversion system of the invention can be executed using the read profile. In addition to previously storing the profile 101 or a profile on the storage medium, a storage medium may be previously placed in the computer 102 and the program 101, the profile, etc., may be transferred to the computer 102, for example, through a network, etc., for storage on the storage medium for execution.

As seen from the description given above, a four-dimensional lookup table is used to execute color conversion for color signal of four color values including black, and a one-dimensional lookup table for converting the gradation of a single color for each color is provided at the preceding or following stage of the four-dimensional lookup table or at the preceding and following stages. According to the one-dimensional lookup table, input or output of the four-dimensional lookup table or the input and output can be made almost linear, and fine gradation control is made possible. Thus, an interpolation error can be decreased for realizing more faithful color reproduction and control at the reproduction start point can be facilitated, for example.

Further, when a four-dimensional lookup table is prepared, not only absolute colorometric match, but also partial colorimetric match and relative colorimetric match can be provided. According to the partial colorometric match, K single color reproduction of black characters, etc., solid reproduction of K 100%, Y single color reproduction, process black reproduction made up of only CMY with K being 0, etc., as machine-dependent color signal of input can be accomplished under a similar condition also at the output time, and a good image can be reproduced. According to the relative colorimetric match, input white and output white can be matched with each other and if input and output differ in white level, it is made possible to provide good reproduction without highlight disappearing or crush.

To input the color characteristic data of a device, inputting the color characteristic information of a device such as an ICC profile previously stored or inputting a pair of device color data and colorometric data corresponding to the device color data to prepare the color characteristic data of a device can be selected. Thus, for example, a previously stored profile is used, whereby the processing procedure and the processing speed can be shortened, and a pair of device color data and colorimetric data corresponding thereto is input and color characteristic information at the point in processing time is prepared, whereby color conversion processing with higher accuracy can be performed. Thus, in the invention, for management of the color characteristic data, management with the ICC profile, management with the device data, etc., can be adaptively selected for improving the user's convenience. It is also possible to once prepare color characteristic data from a profile and process the color characteristic data for use.

What is claimed is:

1. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert the n color values in the first machine-dependent color space into n color values in a first adjustment-machine-dependent color space with adjusted gradation of a single color in the first machine-dependent color space;

a second TRC preparation section for preparing a color conversion coefficient for each color to convert n color values in a second adjustment-machine-dependent color space with adjusted gradation of a single color in the second machine-dependent color space into the n color values in the second machine-dependent color space; and a K preservation n-dimensional DLUT preparation section for preparing an n-dimensional lookup table for converting the n color values in the first adjustment-machine-dependent color space into the n color values in the second adjustment-machine-dependent color space with the characteristic of black preserved.

2. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert the n color values in the first machine-dependent color space into n color values in a first adjustment-machine-dependent color space with adjusted gradation of a single color in the first machine-dependent color space; and a K preservation n-dimensional DLUT preparation section for preparing an n-dimensional lookup table for converting the n color values in the first adjustment-machine-dependent color space into the n color values in the second machine-dependent color space with the characteristic of black preserved.

3. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert n color values in a second adjustment-machine-dependent color space with adjusted gradation of a single color in the second machine-dependent color space into the n color values in the second machine-dependent color space; and a K preservation n-dimensional DLUT preparation section for preparing an n-dimensional lookup table for converting the n color values in the first machine-dependent color space into the n color values in the second adjustment-machine-dependent color space with the characteristic of black preserved.

4. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert the n color values in the first machine-dependent color space into n color values in a first adjustment-machine-dependent color space with adjusted gradation of a single color in the first machine-dependent color space;

a second TRC preparation section for preparing a color conversion coefficient for each color to convert n color values in a second adjustment-machine-dependent color space with adjusted gradation of a single color in the second machine-dependent color space into the n color values in the second machine-dependent color space;

a K conversion LUT preparation section for preparing a one-dimensional lookup table for converting the value of black in the first adjustment-machine-dependent color space into the value of black in the second adjustment-machine-dependent color space with the characteristic of the value of black preserved; and an n-dimensional DLUT preparation section for preparing an n-dimensional lookup table for converting the n color values in the first adjustment-machine-dependent color space into the (n−1) color values except for black in the second adjustment-machine-dependent color space.

5. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color except black to convert the (n−1) color values except for black in the first machine-dependent color space into (n−1) color values except for black in a first adjustment-machine-dependent color space with adjusted gradation of a single color in the first machine-dependent color space;

a second TRC preparation section for preparing a color conversion coefficient for each color to convert n color values in a second adjustment-machine-dependent color space with adjusted gradation of a single color in the second machine-dependent color space into the n color values in the second machine-dependent color space;

a K conversion LUT preparation section for preparing a one-dimensional lookup table for converting the value of black in the first machine-dependent color space into the value of black in the second adjustment-machine-dependent color space with the characteristic of the value of black preserved; and an n-dimensional DLUT preparation section for preparing an n-dimensional lookup table for converting the (n−1) color values except for black in the first adjustment-machine-dependent color space and the value of black in the first machine-dependent color space into the (n−1) color values except for black in the second adjustment-machine-dependent color space.

6. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert the n color values in the first machine-dependent color space into n color values in a first adjustment-machine-dependent color space with adjusted gradation of a single color in the first machine-dependent color space;

a K conversion LUT preparation section for preparing a one-dimensional lookup table for converting the value of black in the first adjustment-machine-dependent color space into the value of black in the second machine-dependent color space with the characteristic of the value of black preserved; and an n-dimensional DLUT preparation section for preparing an n-dimensional lookup table for converting the n color values in the first adjustment-machine-dependent color space into the (n−1) color values except for black in the second machine-dependent color space.

7. A color conversion coefficient preparation apparatus for preparing color conversion coefficients to convert n color values including black in a first machine-dependent color space into n color values including black in a second machine-dependent color space, the color conversion coefficient preparation apparatus comprising a first TRC preparation section for preparing a color conversion coefficient for each color except black to convert the (n−1) color values except for black in the first machine-dependent color space into (n−1) color values except for black in a first adjustment-machine-dependent color space with adjusted gradation of a single color in the first machine-dependent color space;

a K conversion LUT preparation section for preparing a one-dimensional lookup table for converting the value of black in the first machine-dependent color space into the value of black in the second machine-dependent color space with the characteristic of the value of black preserved; and an n-dimensional DLUT preparation section for preparing an n-dimensional lookup table for converting the (n−1) color values except for black in the first adjustment-machine-dependent color space and the value of black in the first machine-dependent color space into the (n−1) color values except for black in the second machine-dependent color space.

8. A color conversion coefficient preparation apparatus for preparing color conversion coefficients to convert n color values including black in a first machine-dependent color space into n color values including black in a second machine-dependent color space, the color conversion coefficient preparation apparatus comprising:

a first TRC preparation section for preparing a color conversion coefficient for each color to convert n color values in a second adjustment-machine-dependent color space with adjusted gradation of a single color in the second machine-dependent color space into the n color values in the second machine-dependent color space;

a K conversion LUT preparation section for preparing a one-dimensional lookup table for converting the value of black in the first machine-dependent color space into the value of black in the second adjustment-machine-dependent color space with the characteristic of the value of black preserved; and an n-dimensional DLUT preparation section for preparing an n-dimensional lookup table for converting the n color values in the first machine-dependent color space into the (n−1) color values except for black in the second adjustment-machine-dependent color space.

9. The color conversion coefficient preparation apparatus according to claim 4, wherein the K conversion LUT preparation section prepares a one-dimensional lookup table for converting from the value of black in the first machine-dependent color space or the first adjustment-machine-dependent color space into the value of black in the second machine-dependent color space; and the second TRC preparation section prepares a color conversion coefficient for each color of the (n−1) colors except black.

10. The color conversion coefficient preparation apparatus according to claim 1, wherein the K preservation n-dimensional DLUT preparation section comprises:

a color specification value prediction section for predicting a color specification vector in a machine-independent color space from the n color values in the first machine-dependent color space or the first adjustment-machine-dependent color space;

a K conversion section for converting the value of black in the first machine-dependent color space or the first adjustment-machine-dependent color space into the value of black in the second machine-dependent color space or the second adjustment-machine-dependent color space with the characteristic of the value of black preserved; and an (n−1) color prediction section for predicting (n−1) color values except for black in the second machine-dependent color space or the second adjustment-machine-dependent color space from the color specification vector in the machine-independent color space predicated by the color specification value prediction section and the value of black provided by the K conversion section.

11. A color conversion coefficient preparation apparatus for preparing color conversion coefficients to convert n color values including black in a first machine-dependent color space into n color values including black in a second machine-dependent color space, the color conversion coefficient preparation apparatus comprising a K preservation n-dimensional DLUT preparation section for preparing an n-dimensional lookup table for converting the n color values in the first machine-dependent color space into the n color values in the second machine-dependent color space with the characteristic of black preserved, wherein the K preservation n-dimensional DLUT preparation section comprises:

a color specification value prediction section for predicting a color specification vector in a machine-independent color space from the n color values in the first machine-dependent color space;

a K conversion section for converting the value of black in the first machine-dependent color space into the value of black in the second machine-dependent color space with the characteristic of the value of black preserved; and an (n−1) color prediction section for predicting (n−1) color values except for black in the second machine-dependent color space from the color specification vector in the machine-independent color space predicated by the color specification value prediction section and the value of black provided by the K conversion section.

12. The color conversion coefficient preparation apparatus according to claim 10, wherein the K conversion section comprises:

a first K characteristic calculation section for calculating a relationship with lightness, reflectivity, or density corresponding to the single color of black in the first machine-dependent color space or the first adjustment-machine-dependent color space;

a second K characteristic calculation section for calculating a relationship with lightness, reflectivity, or density corresponding to the single color of black in the second machine-dependent color space or the second adjustment-machine-dependent color space;

a K preservation K conversion LUT preparation section for preparing a one-dimensional lookup table for converting the value of black in the first machine-dependent color space or the first adjustment-machine-dependent color space into the value of black in the second machine-dependent color space or the second adjustment-machine-dependent color space having a characteristic equal to or similar to that of the value of black by using the relationship calculated by the first K characteristic calculation section and the relationship calculated by the second K characteristic calculation section; and a K preservation K conversion LUT application section for converting the value of black in the first machine-dependent color space or the first adjustment-machine-dependent color space into the value of black in the second machine-dependent color space or the second adjustment-machine-dependent color space by using the one-dimensional lookup table prepared in the K preservation K conversion LUT preparation section.

13. The color conversion coefficient preparation apparatus according to claim 12, wherein the K conversion section further comprises a K correction section for correcting the value of black provided by the K preservation K conversion LUT application section based on the n color values in the second machine-dependent color space or the second adjustment-machine-dependent color space.

14. The color conversion coefficient preparation apparatus according to claim 10, wherein the K conversion section comprises a K correction section for correcting the value of black in the first machine-dependent color space or the first adjustment-machine-dependent color space based on the n color values in the second machine-dependent color space or the second adjustment-machine-dependent color space to provide the corrected value of black as the value of black in the second machine-dependent color space or the second adjustment-machine-dependent color space.

15. The color conversion coefficient preparation apparatus according to claim 4, wherein the K conversion LUT preparation section comprises:

a first K characteristic calculation section for calculating a relationship with lightness, reflectivity, or density corresponding to the single color of black in the first machine-dependent color space or the first adjustment-machine-dependent color space;

a second K characteristic calculation section for calculating the relationship with lightness, reflectivity, or density corresponding to the single color of black in the second machine-dependent color space or the second adjustment-machine-dependent color space; and a K preservation K conversion LUT preparation section for preparing a one-dimensional lookup table for converting the value of black in the first machine-dependent color space or the first adjustment-machine-dependent color space into the value of black in the second machine-dependent color space or the second adjustment-machine-dependent color space having a characteristic equal to or similar to that of the value of black by using the relationship calculated by the first K characteristic calculation section and the relationship calculated by the second K characteristic calculation section.

16. The color conversion coefficient preparation apparatus according to claim 1, wherein the second TRC preparation section prepares a one-dimensional lookup table for executing inverse conversion to conversion from the values in the second machine-dependent color space to values in the second adjustment-machine-dependent color space for each of the n color values or the (n−1) color values except for black.

17. The color conversion coefficient preparation apparatus according to claim 1, wherein the first TRC preparation section, the second TRC preparation section, or the K preservation n-dimensional DLUT preparation section prepares a one-dimensional lookup table or an n-dimensional lookup table as the color conversion coefficient so that the under color of paper becomes white.

18. The color conversion coefficient preparation apparatus according to claim 1 further comprising n-dimensional DLUT reset section for forcibly replacing with predetermined values, data of n colors, (n−1) colors, (n−2) colors, or (n−m) colors that a specific grid point, grid points on a specific line, grid points on a specific plane, or grid points on a specific in-dimensional area of the n-dimensional lookup table prepared by said K preservation n-dimensional DLUT preparation section have.

19. The color conversion coefficient preparation apparatus according to claim 18, wherein the n-dimensional DLUT reset section forcibly sets to all 0, the data of the n colors that the grid point with the n color values being all 0 corresponding to address data of the n-dimensional lookup table has.

20. The color conversion coefficient preparation apparatus according to claim 18, wherein the n-dimensional DLUT reset section forcibly sets to all 0, the data of black that the grid point with the value of black being 0 corresponding to address data of the n-dimensional lookup table has.

21. The color conversion coefficient preparation apparatus according to claim 18, wherein the n-dimensional DLUT reset section forcibly sets to all 0, the data of the (n−1) colors except black that the grid point with the values of the (n−1) colors except black being all 0 corresponding to address data of the n-dimensional lookup table has.

22. The color conversion coefficient preparation apparatus according to claim 18, wherein the n-dimensional DLUT reset section forcibly sets to all 0, the data of the (n−1) colors other than a specific color that the grid point with the values of the (n−1) colors except the specific color other than black being 0 corresponding to address data of the n-dimensional lookup table has.

23. The color conversion coefficient preparation apparatus according to claim 18, wherein the n-dimensional DLUT reset section forcibly sets to all 0, the data of two colors that the grid point of secondary color with the values of the two colors being 0 corresponding to address data of the n-dimensional lookup table has.

24. The color conversion coefficient preparation apparatus according to claim 18 further comprising a user interface for enabling a user to set an item to be reset by the n-dimensional DLUT reset section.

25. The color conversion coefficient preparation apparatus according to claim 18, wherein the n-dimensional DLUT reset section ftirther makes a re-determination so that data of any other color except for the color forcibly replaced with the predetermined value becomes roughly equivalent to representation color before forcible replacement with the predetermined value.

26. The color conversion coefficient preparation apparatus according to claim 25, wherein the n-dimensional DLUT reset section forcibly sets to all 0, the data of black that the grid point with the value of black being 0 corresponding to address data of the n-dimensional lookup table has; and the n-dimensional DLUT reset section makes a re-determination so that data of any other color than black becomes roughly equivalent to representation color before the value of black is set to 0.

27. The color conversion coefficient preparation apparatus according to claim 25, wherein the n-dimensional DLUT reset section forcibly sets to all 0, the data of the (n−1) colors except black that the grid point with the values of the (n−1) colors except black being all 0 corresponding to address data of the n-dimensional lookup table has; and the n-dimensional DLUT reset section makes a re-determination so that black becomes roughly equivalent to representation color before the values of the (n−1) colors except black are set to 0.

28. The color conversion coefficient preparation apparatus according to claim 25, wherein the n-dimensional DLUT reset section forcibly sets to all 0, the data of the (n−1) colors other than a specific color that the grid point with the values of the (n−1) colors except the specific color other than black being all 0 corresponding to address data of the n-dimensional lookup table has; and the n-dimensional DLUT reset section makes a re-determination so that data of the specific colors other than black becomes roughly equivalent to representation color before the values of the (n−1) colors are set to 0.

29. The color conversion coefficient preparation apparatus according to claim 25, wherein the n-dimensional DLUT reset section forcibly sets to all 0, the data of two colors that the grid point of secondary color with the values of the two colors being 0 corresponding to address data of the n-dimensional lookup table has; and the n-dimensional DLUT reset section makes a re-determination so that data of (n−2) colors other than the two colors whose values are forcibly set to all 0 becomes roughly equivalent to representation color before the data of the two colors are forcibly set to all 0.

30. The color conversion coefficient preparation apparatus according to claim 1, wherein the first TRC preparation section, the second TRC preparation section, and the K preservation n-dimensional DLUT preparation section use colorimetric values of color charts printed by a first machine and a second machine.

31. The color conversion coefficient preparation apparatus according to claim 1, wherein the first TRC preparation section, the second TRC preparation section, and the K preservation n-dimensional DLUT preparation section use color values prepared from conversion definition previously prepared corresponding to a first machine and a second machine.

32. The color conversion coefficient preparation apparatus according to claim 1 wherein at least the K preservation n-dimensional DLUT preparation section or the n-dimensional DLUT preparation section uses colorimetric values of color charts printed by a first machine and color values prepared from conversion definition previously prepared corresponding to a second machine.

33. The color conversion coefficient preparation apparatus according to claim 1, wherein at least the K preservation n-dimensional DLUT preparation section or the n-dimensional DLUT preparation section uses color values prepared from conversion definition previously prepared corresponding to a first machine and colorimetric values of color charts printed by a second machine.

34. The color conversion coefficient preparation apparatus according to claim 1, wherein the n colors are four colors of black, cyan, magenta, and yellow.

35. A computer-readable storage medium storing a program for:

preparing a color conversion coefficient for each color to convert n color values in a first machine-dependent color space into n color values in a first adjustment-machine-dependent color space with adjusted gradation of a single color in the first machine-dependent color space;

preparing a color conversion coefficient for each color as inverse conversion to conversion of n color values in a second machine-dependent color space to n color values in a second adjustment-machine-dependent color space with adjusted gradation of a single color in the second machine-dependent color space; and preparing an n-dimensional lookup table for converting the n color values in the first adjustment-machine-dependent color space into the n color values in the second adjustment-machine-dependent color space with the characteristic of black preserved by using the conversion result from the first machine-dependent color space to the first adjustment-machine-dependent color space and the conversion result from the second machine-dependent color space to the second adjustment-machine-dependent color space.

36. A color conversion system for executing color conversion processing using a one-dimensional lookup table and an n-dimensional lookup table prepared in a color conversion coefficient preparation apparatus according to claim 1, the color conversion system comprising:

a first TRC application section for executing conversion by applying a color conversion coefficient prepared for each color for converting n color values in a first machine-dependent color space into n color values in a first adjustment-machine-dependent color space with adjusted gradation of a single color in the first machine-dependent color space to n color values including black that each pixel of an input color image has;

a K preservation n-dimensional DLUT application section for applying the n-dimensional lookup table for converting the n color values in the first adjustment-machine-dependent color space provided by the first TRC application section into n color values in a second adjustment-machine-dependent color space with the characteristic of black preserved to the n color values in the first adjustment-machine-dependent color space provided by the first TRC application section; and a second TRC application section for executing conversion by applying a color conversion coefficient prepared for each color for converting n color values in the second adjustment-machine-dependent color space with adjusted gradation of a single color in a second machine-dependent color space into n color values in the second machine-dependent color space to the n color values provided by the K preservation n-dimensional DLUT application section.

37. A color conversion system for executing color conversion processing using a one-dimensional lookup table and an n-dimensional lookup table prepared in a color conversion coefficient preparation apparatus according to claim 2, the color conversion system comprising:

a first TRC application section for executing conversion by applying a color conversion coefficient prepared for each color for converting n color values in a first machine-dependent color space into n color values in a first adjustment-machine-dependent color space with adjusted gradation of a single color in the first machine-dependent color space to n color values including black that each pixel of an input color image has; and a K preservation n-dimensional DLUT application section for applying the n-dimensional lookup table for converting the n color values in the first adjustment-machine-dependent color space provided by the first TRC application section into n color values in a second machine-dependent color space with the characteristic of K preserved to the n color values in the first adjustment-machine-dependent color space provided by the first TRC application section.

38. A color conversion system for executing color conversion processing using a one-dimensional lookup table and an n-dimensional lookup table prepared in a color conversion coefficient preparation apparatus according to claim 3, the color conversion system comprising:

a K preservation n-dimensional DLUT application section for applying the n-dimensional lookup table for converting n color values in the first machine-dependent color space into n color values in a second adjustment-machine-dependent color space with the characteristic of K preserved to the n color values including black that each pixel of an input color image has; and a first TRC application section for executing conversion by applying a color conversion coefficient prepared for each color for converting n color values in the second adjustment-machine-dependent color space with adjusted gradation of a single color in a second machine-dependent color space into n color values in the second machine-dependent color space to the n color values provided by the K preservation n-dimensional DLUT application section.

39. A color conversion system for executing color conversion processing using a one-dimensional lookup table and an n-dimensional lookup table prepared in a color conversion coefficient preparation apparatus according to claim 4, the color conversion system comprising:

a first TRC application section for executing conversion by applying a color conversion coefficient prepared for each color for converting n color values in a first machine-dependent color space into n color values in a first adjustment-machine-dependent color space with adjusted gradation of a single color in the first machine-dependent color space to n color values including black that each pixel of an input color image has;

a K conversion LUT application section for applying the one-dimensional lookup table for converting the value of black in the first adjustment-machine-dependent color space into the value of black in a second adjustment-machine-dependent color space with the characteristic of the value of black preserved to the value of black in the first adjustment-machine-dependent color space provided by the first TRC application section;

an n-dimensional DLUT application section for applying the n-dimensional lookup table for converting the n color values in the first adjustment-machine-dependent color space provided by the first TRC application section into (n−1) color values except for black in the second adjustment-machine-dependent color space to the n color values in the first adjustment-machine-dependent color space provided by the first TRC application section; and a second TRC application section for executing conversion by applying a color conversion coefficient prepared for each color for converting n color values in the second adjustment-machine-dependent color space with adjusted gradation of a single color in a second machine-dependent color space into n color values in the second machine-dependent color space to the (n−1) color values except for black provided by the n-dimensional DLUT application section and the value of black provided by the K conversion LUT application section.

40. A color conversion system for executing color conversion processing using a one-dimensional lookup table and an n-dimensional lookup table prepared in a color conversion coefficient preparation apparatus according to claim 5, the color conversion system comprising:

a first TRC application section for executing conversion by applying a color conversion coefficient prepared for each color for converting (n−1) color values except for black in a first machine-dependent color space into (n−1) color values except for black in a first adjustment-machine-dependent color space with adjusted gradation of a single color in the first machine-dependent color space to (n−1) color values except for black of n color values including black that each pixel of an input color image has;

a K conversion LUT application section for applying the one-dimensional lookup table for converting the value of black in the first machine-dependent color space into the value of black in a second adjustment-machine-dependent color space with the characteristic of the value of black preserved to the value of black that each pixel of the input color image has;

an n-dimensional DLUT application section for applying the n-dimensional lookup table for converting the (n−1) color values except for black in the first adjustment-machine-dependent color space and the value of black in the first machine-dependent color space into (n−1) color values except for black in the second adjustment-machine-dependent color space to the (n−1) color values except for black in the first adjustment-machine-dependent color space provided by the first TRC application section and the value of black that each pixel of the input color image has; and a second TRC application section for executing conversion by applying a color conversion coefficient prepared for each color for converting n color values in the second adjustment-machine-dependent color space with adjusted gradation of a single color in a second machine-dependent color space into n color values in the second machine-dependent color space to the (n−1) color values except for black provided by the n-dimensional DLUT application section and the value of black provided by the K conversion LUT application section.

41. A color conversion system for executing color conversion processing using a one-dimensional lookup table and an n-dimensional lookup table prepared in a color conversion coefficient preparation apparatus according to claim 6, the color conversion system comprising:

a first TRC application section for executing conversion by applying a color conversion coefficient prepared for each color for converting n color values in a first machine-dependent color space into n color values in a first adjustment-machine-dependent color space with adjusted gradation of a single color in the first machine-dependent color space to n color values including black that each pixel of an input color image has;

a K conversion LUT application section for applying the one-dimensional lookup table for converting the value of black in the first adjustment-machine-dependent color space into the value of black in a second adjustment-machine-dependent color space with the characteristic of the value of black preserved to the value of black in the first adjustment-machine-dependent color space provided by the first TRC application section; and an n-dimensional DLUT application section for applying the n-dimensional lookup table for converting the n color values in the first adjustment-machine-dependent color space into (n−1) color values except for black in the second machine-dependent color space to the n color values in the first adjustment-machine-dependent color space provided by the first TRC application section.

42. A color conversion system for executing color conversion processing using a one-dimensional lookup table and an n-dimensional lookup table prepared in a color conversion coefficient preparation apparatus according to claim 7, the color conversion system comprising:

a first TRC application section for executing conversion by applying a color conversion coefficient prepared for each color for converting (n−1) color values except for black in a first machine-dependent color space into (n−1) color values except for black in a first adjustment-machine-dependent color space with adjusted gradation of a single color in the first machine-dependent color space to (n−1) color values except for black of n color values including black that each pixel of an input color image has;

a K conversion LUT application section for applying the one-dimensional lookup table for converting the value of black in the first machine-dependent color space into the value of black in a second machine-dependent color space with the characteristic of the value of black preserved to the value of black that each pixel of the input color image has; and an n-dimensional DLUT application section for applying the n-dimensional lookup table for converting the (n−1) color values except for black in the first adjustment-machine-dependent color space and the value of black in the first machine-dependent color space into (n−1) color values except for black in the second machine-dependent color space to the (n−1) color values except for black in the first adjustment-machine-dependent color space provided by the first TRC application section and the value of black that each pixel of the input color image has.

43. A color conversion system for executing color conversion processing using a one-dimensional lookup table and an n-dimensional lookup table prepared in a color conversion coefficient preparation apparatus according to claim 8, the color conversion system comprising:

an n-dimensional DLUT application section for applying the n-dimensional lookup table for converting n color values in the first machine-dependent color space into (n−1) color values except for black in a second adjustment-machine-dependent color space to n color values including black that each pixel of an input color image has;

a K conversion LUT application section for applying the one-dimensional lookup table for converting the value of black in the first machine-dependent color space into the value of black in a second adjustment-machine-dependent color space with the characteristic of the value of black preserved to the value of black that each pixel of the input color image has; and a first TRC application section for executing conversion by applying a color conversion coefficient prepared for each color to convert n color values in the second adjustment-machine-dependent color space with adjusted gradation of a single color in a second machine-dependent color space into n color values in the second machine-dependent color space to the (n−1) color values except for black provided by the n-dimensional DLUT application section and the value of black provided by the K conversion LUT application section.

44. The color conversion system according to claim 39, wherein the K conversion LUT application section applies the one-dimensional lookup table for converting from the value of black in the first machine-dependent color space or the first adjustment-machine-dependent color space into the value of black in the second machine-dependent color space to the value of black that each pixel of the input color image has or the value of black in the first adjustment-machine-dependent color space provided by the first TRC application section; and the second TRC application section executes conversion by applying a color conversion coefficient prepared for each color to convert (n−1) color values except for black in the second adjustment-machine-dependent color space with adjusted gradation of a single color in the second machine-dependent color space into (n−1) color values except for black in the second machine-dependent color space to the (n−1) color values except for black provided by the n-dimensional DLUT application section.

45. The color conversion coefficient preparation apparatus according to claim 36, wherein the n colors are four colors of black, cyan, magenta, and yellow.

* * * * *